(12) United States Patent
Hamsici

(10) Patent No.: US 9,117,144 B2
(45) Date of Patent: Aug. 25, 2015

(54) PERFORMING VOCABULARY-BASED VISUAL SEARCH USING MULTI-RESOLUTION FEATURE DESCRIPTORS

(71) Applicant: QUALCOMM Incorporated, San Diego, CA (US)

(72) Inventor: Onur C. Hamsici, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/042,576

(22) Filed: Sep. 30, 2013

(65) Prior Publication Data

US 2015/0049943 A1   Feb. 19, 2015

Related U.S. Application Data

(60) Provisional application No. 61/865,835, filed on Aug. 14, 2013.

(51) Int. Cl.
| | | |
|---|---|---|
| *G06K 9/00* | (2006.01) | |
| *G06K 9/62* | (2006.01) | |
| *G06K 9/46* | (2006.01) | |
| *G06T 7/00* | (2006.01) | |

(52) U.S. Cl.
CPC ............ *G06K 9/6202* (2013.01); *G06K 9/4609* (2013.01); *G06K 9/4628* (2013.01); *G06K 9/4642* (2013.01); *G06K 9/4676* (2013.01); *G06K 9/6219* (2013.01); *G06K 9/6256* (2013.01); *G06K 9/6267* (2013.01); *G06K 9/6277* (2013.01); *G06T 7/0081* (2013.01)

(58) Field of Classification Search
USPC ................. 382/170, 181, 191, 103, 218, 220; 345/419; 375/240.11, 240.19; 348/143, 348/152, 700; 702/19, 22, 27; 707/713, 707/737, 964, E17.04; 715/723
See application file for complete search history.

(56) References Cited

U.S. PATENT DOCUMENTS

| | | |
|---|---|---|
| 4,914,019 A | 4/1990 | Chu |
| 6,012,058 A | 1/2000 | Fayyad et al. |
| 6,678,413 B1 | 1/2004 | Liang et al. |
| 7,382,897 B2 | 6/2008 | Brown et al. |
| 7,643,655 B2 | 1/2010 | Liang et al. |

(Continued)

OTHER PUBLICATIONS

Lazebnik et al., "Beyond Bags of Features: Spatial Pyramid Matching for Recognizing Natural Scene Categories," 2006 IEEE Computer Society Conference on Computer Vision and Pattern Recognition, vol. 2, 2006, 8 pp.

(Continued)

*Primary Examiner* — Anh Do
(74) *Attorney, Agent, or Firm* — Shumaker & Sieffert, P.A.

(57) ABSTRACT

In general, techniques are described for performing a vocabulary-based visual search using multi-resolution feature descriptors. A device may comprise one or more processors configured to perform the techniques. The one or more processors may to apply a partitioning algorithm to a first subset of target feature descriptors to determine a first classifying data structure to be used when performing a visual search with respect to a query feature descriptor. The one or more processors may then apply the partitioning algorithm to a second subset of the target feature descriptors to determine a second classifying data structure to be used when performing the visual search with respect to the same query feature descriptor.

56 Claims, 24 Drawing Sheets

(56) References Cited

U.S. PATENT DOCUMENTS

| | | | |
|---|---|---|---|
| 7,711,146 B2* | 5/2010 | Tu et al. | 382/103 |
| 7,852,414 B2* | 12/2010 | Kijak et al. | 348/700 |
| 8,345,979 B2* | 1/2013 | Davis | 382/181 |
| 8,447,107 B1 | 5/2013 | Dhua et al. | |
| 8,676,802 B2* | 3/2014 | Zelevinsky et al. | 707/737 |
| 8,755,837 B2 | 6/2014 | Rhoads et al. | |
| 8,903,803 B1* | 12/2014 | Aly et al. | 707/713 |
| 2003/0179213 A1 | 9/2003 | Liu | |
| 2007/0174268 A1 | 7/2007 | Posse et al. | |
| 2007/0217676 A1 | 9/2007 | Grauman et al. | |
| 2010/0177966 A1 | 7/2010 | Ruzon et al. | |
| 2011/0255781 A1 | 10/2011 | Hamsici et al. | |

OTHER PUBLICATIONS

Grauman et al., "Approximate Correspondences in High Dimensions," Advances in Neural Information Processing Systems, vol. 19, 2007, 8 pp.

Grauman et al., "The Pyramid Match Kernel: Discriminative Classification with Sets of Image Features," In Proceedings of the IEEE International Conference on Computer Vision, vol. 2, Oct. 2005, 8 pp.

Hastie et al., "The elements of statistical learning: data mining, inference, and prediction," 2nd Edition, Springer Verlag, Chapter 7, Sections 7.1, 7.2, 7.3, 2009, 76 pp.

Jegou et al., "Aggregating local descriptors into a compact image representation," In 2010 IEEE Conference on Computer Vision and Pattern Recognition (CVPR), 2010, 8 pp.

Lamrous et al., "Divisive Hierarchical K-Means," International Conference on Computational Intelligence for Modelling, Control and Automation, International Conference on Intelligent Agents, Web Technologies and Internet Commerce, 2006, 6 pp.

Nister et al., "Scalable Recognition with a Vocabulary Tree," IEEE Computer Society Conference on Computer Vision and Pattern Recognition, vol. 2, 2006, 8 pp.

Perronnin et al., "Fisher Kernels on Visual Vocabularies for Image Categorization," In 2007 IEEE Conference on Computer Vision and Pattern Recognition, 2007, 8 pp.

Pham et al., "Selection of K in K-means clustering," Proceedings of the Institution of Mechanical Engineers, Part C: Journal of Mechanical Engineering Science, vol. 219, 2005, 17 pp.

Ravela et al., "Retrieval from Image Databases using Scale-Space Matching," CMPSCI Technical Report UM-CS-95-104, Nov. 1995, 30 pp.

Zhang et al., "Extending Consensus Clustering to Explore Multiple Clustering Views," In Proceedings of the Eleventh SIAM International Conference on Data Mining, 2011, 12 pp.

U.S. Appl. No. 14/042,558 by Onur C. Hamsici, filed Sep. 30, 2013.

Breiman, "Bagging Predictors", Machine Learning, Kluwer Academic Publishers-Plenum Publishers NE, vol. 24, No. 2, Aug. 1, 1996, XP019213305, pp. 123-140.

Li, et al., "K-Means Clustering with Bagging and MapReduce", System Sciences (HICSS), Jan. 2011 44th Hawaii International Conference on, IEEE, XP031981185, 8 pp.

International Search Report and Written Opinion—PCT/US2014/050879—ISA/EPO—Oct. 28, 2014, 10 pp.

Girod et al., "Mobile Visual Search", IEEE Signal Processing Magazine, IEEE Service Center, Piscataway, NJ, US, vol. 28, No. 4, Jul. 1, 2011, XP011367629, pp. 61-76.

Grossberg, et al., "Multiresolution Histograms and Their Use for Recognition", IEEE Transactions on Pattern Analysis and Machine Intelligence, IEEE Computer Society. USA, vol. 26, No. 7, Jul. 1, 2004, pp. 831-847.

\* cited by examiner

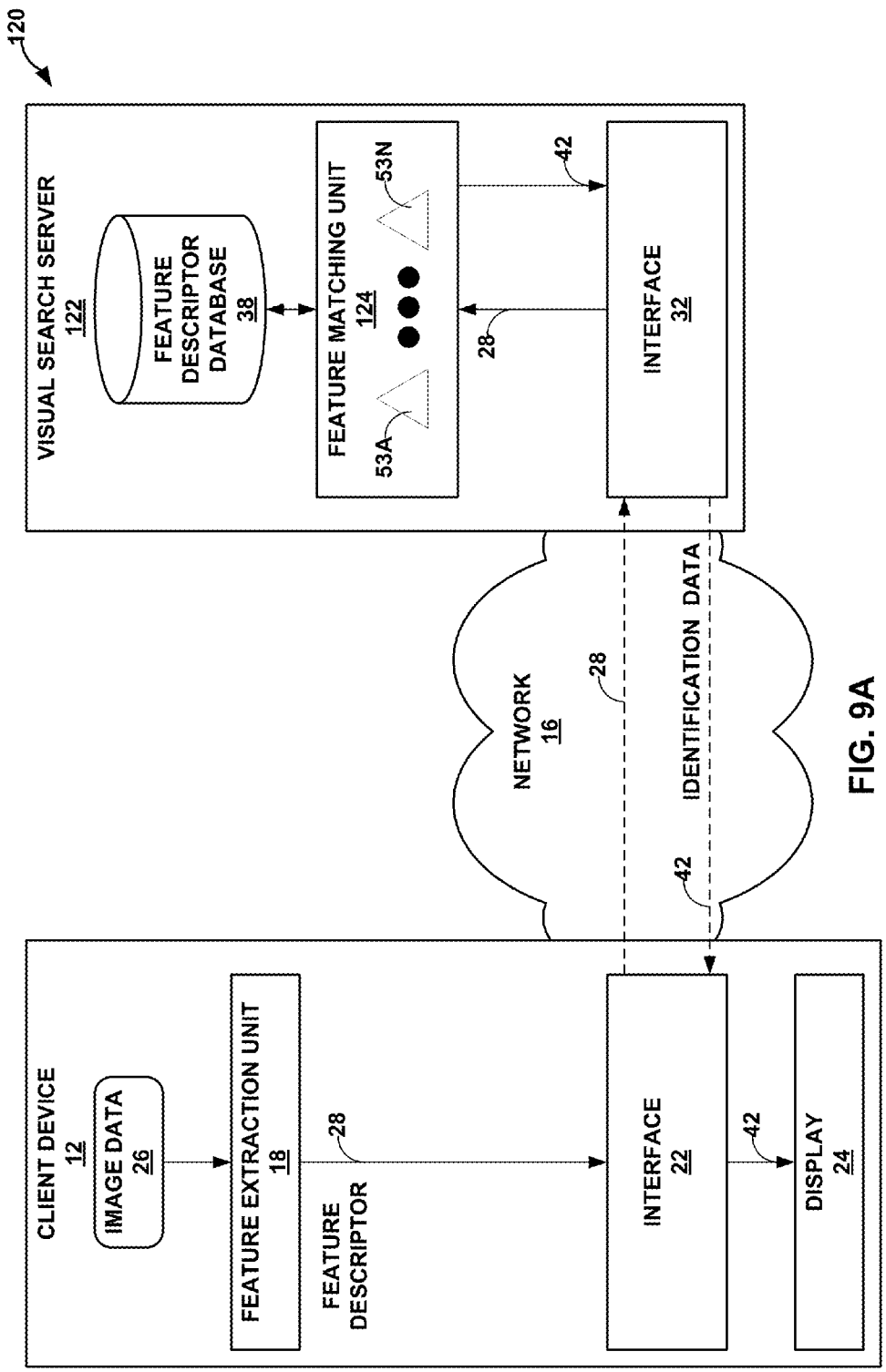

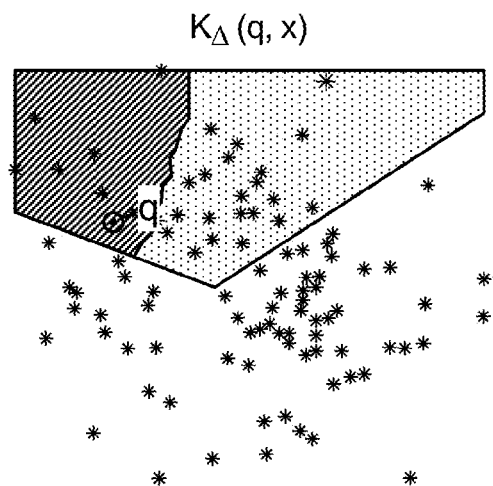
FIG. 21A
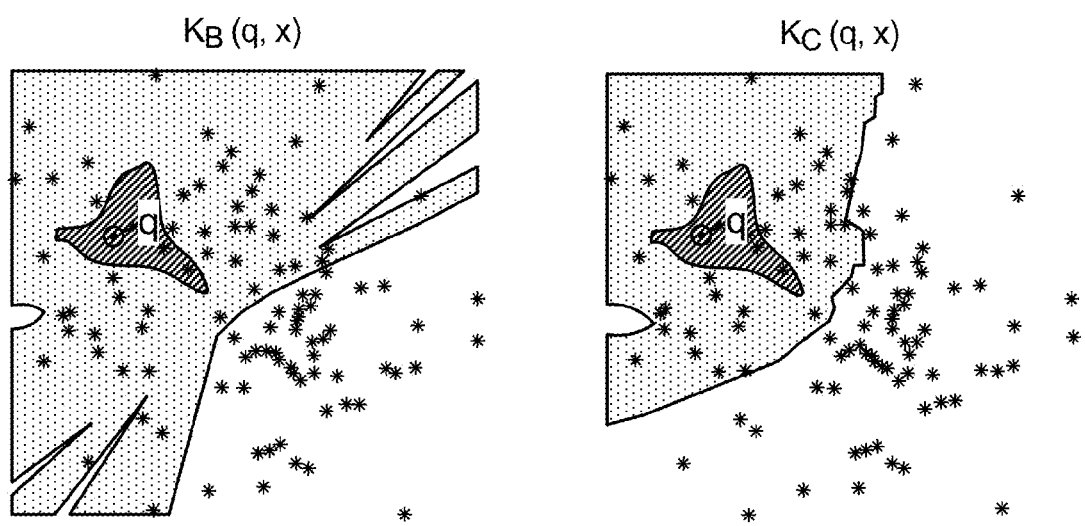
FIG. 21B  FIG. 21C

PERFORMING VOCABULARY-BASED VISUAL SEARCH USING MULTI-RESOLUTION FEATURE DESCRIPTORS

This application claims the benefit of U.S. Provisional Application No. 61/865,835, filed Aug. 14, 2013.

TECHNICAL FIELD

This disclosure relates to image processing and pattern recognition systems and, more particularly, performing visual searches with image processing and pattern recognition systems

BACKGROUND

Visual search in the context of computing devices or computers refers to techniques that enable a computer or other devices to perform a search for objects and/or features among other objects and/or features within one or more images.

SUMMARY

In general, this disclosure describes techniques for performing visual search and/or pattern recognition.

In one aspect, a method comprises generating a hierarchically arranged data structure to be used when classifying one or more objects included within a query image based on multi-resolution query feature descriptor extracted from the query image at a first scale space resolution and a second scale space resolution, wherein the hierarchically arranged data structure represents a first query feature descriptor of the multi-resolution feature descriptor extracted at the first scale space resolution and a second corresponding query feature descriptor of the multi-resolution feature descriptor extracted at the second scale space resolution hierarchically according to the first scale space resolution and the second scale space resolution, and perform a visual search based on the generated data structure.

In another aspect, a device comprises one or more processors configured to generate a hierarchically arranged data structure to be used when classifying one or more objects included within a query image based on multi-resolution query feature descriptor extracted from the query image at a first scale space resolution and a second scale space resolution, wherein the hierarchically arranged data structure represents a first query feature descriptor of the multi-resolution feature descriptor extracted at the first scale space resolution and a second corresponding query feature descriptor of the multi-resolution feature descriptor extracted at the second scale space resolution hierarchically according to the first scale space resolution and the second scale space resolution, and perform a visual search based on the generated data structure.

In another aspect, a device comprises means for generating a hierarchically arranged data structure to be used when classifying one or more objects included within a query image based on multi-resolution query feature descriptor extracted from the query image at a first scale space resolution and a second scale space resolution, wherein the hierarchically arranged data structure represents a first query feature descriptor of the multi-resolution feature descriptor extracted at the first scale space resolution and a second corresponding query feature descriptor of the multi-resolution feature descriptor extracted at the second scale space resolution hierarchically according to the first scale space resolution and the second scale space resolution, and means for performing a visual search based on the generated data structure.

In another aspect, a non-transitory computer-readable storage medium has stored thereon instructions that, when executed cause one or more processors to generate a hierarchically arranged data structure to be used when classifying one or more objects included within a query image based on multi-resolution query feature descriptor extracted from the query image at a first scale space resolution and a second scale space resolution, wherein the hierarchically arranged data structure represents a first query feature descriptor of the multi-resolution feature descriptor extracted at the first scale space resolution and a second corresponding query feature descriptor of the multi-resolution feature descriptor extracted at the second scale space resolution hierarchically according to the first scale space resolution and the second scale space resolution, and perform a visual search based on the generated data structure.

In another aspect, a method comprises applying a partitioning algorithm to a first subset of target feature descriptors to determine a first classifying data structure to be used when performing a visual search with respect to a query feature descriptor, and applying the partitioning algorithm to a second subset of the target feature descriptors to determine a second classifying data structure to be used when performing the visual search with respect to the same query feature descriptor.

In another aspect, a device comprises one or more processors configured to apply a partitioning algorithm to a first subset of target feature descriptors to determine a first classifying data structure to be used when performing a visual search with respect to a query feature descriptor, and apply the partitioning algorithm to a second subset of the target feature descriptors to determine a second classifying data structure to be used when performing the visual search with respect to the same query feature descriptor.

In another aspect, a device comprises means for applying a partitioning algorithm to a first subset of target feature descriptors to determine a first classifying data structure to be used when performing a visual search with respect to a query feature descriptor, and means for applying the partitioning algorithm to a second subset of the target feature descriptors to determine a second classifying data structure to be used when performing the visual search with respect to the same query feature descriptor.

In another aspect, a non-transitory computer-readable storage medium has stored thereon instructions that, when executed, cause one or more processors to apply a partitioning algorithm to a first subset of target feature descriptors to determine a first classifying data structure to be used when performing a visual search with respect to a query feature descriptor, and apply the partitioning algorithm to a second subset of the target feature descriptors to determine a second classifying data structure to be used when performing the visual search with respect to the same query feature descriptor.

In another aspect, a method comprises traversing at least a portion of a first classifying data structure and a second classifying data structure based on a query feature descriptor to determine a first representation of the query feature descriptor and a second representation of the same query feature descriptor, and performing a visual search based on the first representation of the query feature descriptor and a second representation of the same query feature descriptor.

In another aspect, a device comprises one or more processors configured to traverse at least a portion of a first classifying data structure and a second classifying data structure based on a query feature descriptor to determine a first representation of the query feature descriptor and a second representation of the same query feature descriptor, and perform a visual search based on the first representation of the query feature descriptor and a second representation of the same query feature descriptor.

In another aspect, a device comprises means for traversing at least a portion of a first classifying data structure and a second classifying data structure based on a query feature descriptor to determine a first representation of the query feature descriptor and a second representation of the same query feature descriptor, and means for performing a visual search based on the first representation of the query feature descriptor and a second representation of the same query feature descriptor.

In another aspect, a non-transitory computer-readable storage medium has stored thereon instructions that, when executed, cause one or more processors to traverse at least a portion of a first classifying data structure and a second classifying data structure based on a query feature descriptor to determine a first representation of the query feature descriptor and a second representation of the same query feature descriptor, and perform a visual search based on the first representation of the query feature descriptor and a second representation of the same query feature descriptor.

In another aspect, a method for performing a visual search, the method comprises applying a normalized bagging kernel to a query sample so as to determine a normalized similarity between the query sample and a target sample, and based on the measured similarity, determining whether the query sample represents a version of an object to which the target sample corresponds.

In another aspect, a device comprises one or more processors configured to apply a normalized bagging kernel to a query sample so as to determine a normalized similarity between the query sample and a target sample, and based on the measured similarity, determine whether the query sample represents a version of an object to which the target sample corresponds.

In another aspect, a device comprises means for applying a normalized bagging kernel to a query sample so as to determine a normalized similarity between the query sample and a target sample, and means for determining, based on the measured similarity, whether the query sample represents a version of an object to which the target sample corresponds.

In another aspect, a non-transitory computer-readable storage medium has stored thereon instructions that, when executed, cause one or more processors to apply a normalized bagging kernel to a query sample so as to determine a normalized similarity between the query sample and a target sample, and determine, based on the measured similarity, whether the query sample represents a version of an object to which the target sample corresponds.

The details of one or more examples are set forth in the accompanying drawings and the description below. Other features, objects, and advantages will be apparent from the description and drawings, and from the claims.

BRIEF DESCRIPTION OF DRAWINGS

FIGS. 9A and 9B are block diagrams illustrating different variations of the image processing system shown in the example of FIG. 1A that implement various aspects of the techniques described in this disclosure.

FIGS. 21A-21C are diagrams illustrating various plots of the feature descriptor space.

DETAILED DESCRIPTION

Figure 1A:
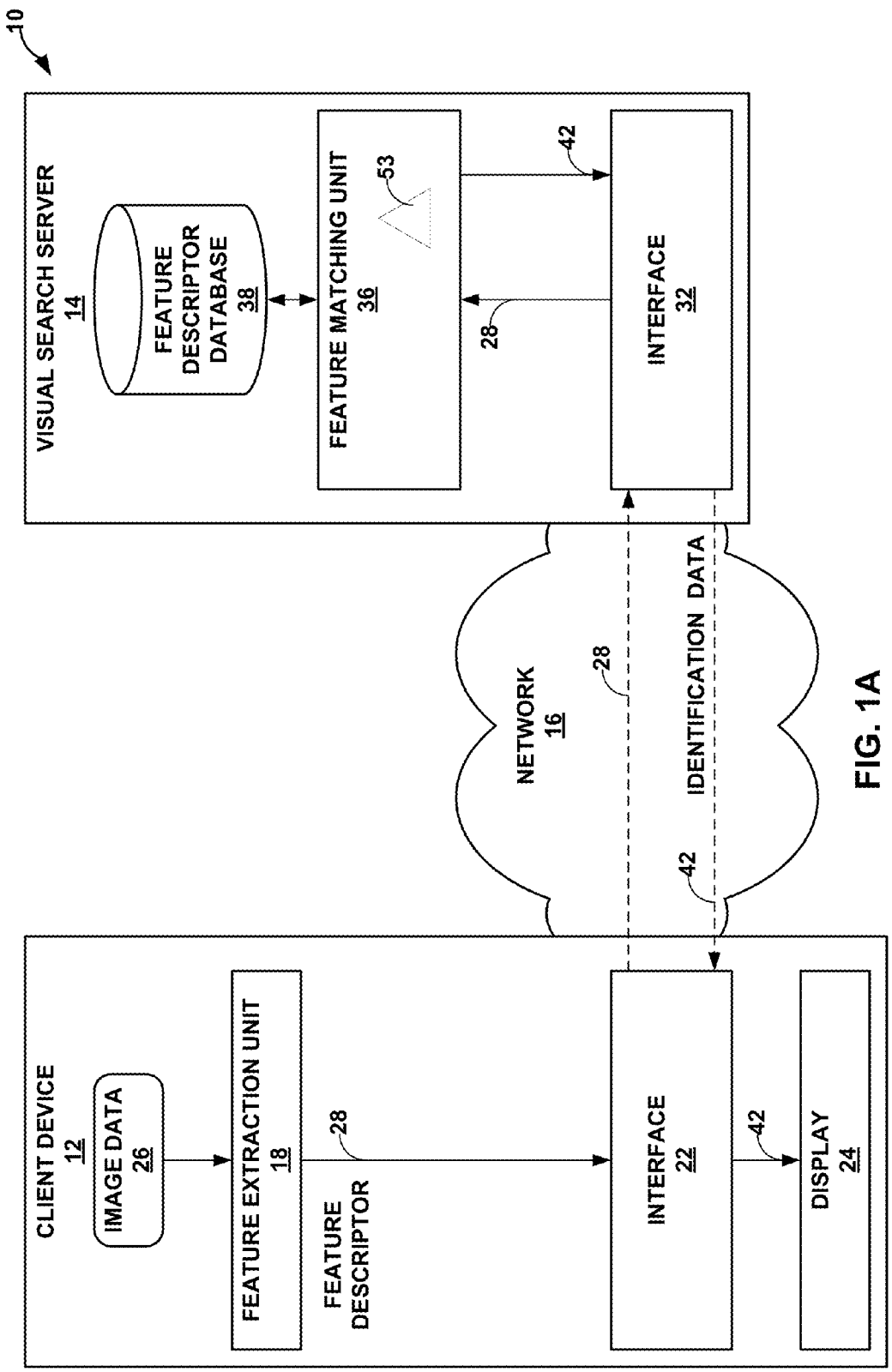
FIGS. 1A and 1B are block diagrams illustrating variations of an image processing system 10 that may implement various aspects of the techniques described in this disclosure.

Local descriptor based image representations have been used successfully for image based applications such as object detection/recognition. One of the main limitations of this representation is the size of the database, which scales linearly with the number of descriptors and images. To address this problem, vocabulary based image representations have been applied. In this case, the collection of local descriptors from an image is represented with the frequency of the corresponding visual words in the dictionary. The dictionary is typically defined by the regions of the descriptor space (visual words) that are commonly occupied by descriptors in the dataset. And the frequency of the visual words in an image is obtained by classifying and counting the number of descriptors in the image to the visual dictionary.

In classification step, if the query descriptors are obtained from perspectively deformed images, corresponding descriptors from training and query images are classified to different words. This may result in problems, as most of the query images have a degree of perspective deformation. The problem gets worse, when a tree classifier is used for fast visual word assignment. In this case, the error at the higher levels of the tree propagates as the query is traced down to leaf node. Because of this error, the visual search server or other device performing the visual search may end up with a very different dictionary representation of the same labeled query and target images.

In this disclosure, various aspects of the techniques may address this problem by designing tree classifiers with multi-resolution descriptors that are robust to descriptor deformations. The techniques may extract descriptors from multiple levels of the scale space. This hierarchical representation may be coupled with the hierarchical tree classifier. The techniques may provide improved robustness to viewpoint variations over conventional descriptor based approaches. While the low resolution descriptors may be robust and stable against viewpoint deformations, the high resolution descriptors may provide high frequency discriminant information of the descriptor. Ordering the classifying tree in this manner may reduce the incorrect classification of the descriptor at the high levels of the tree and potentially provide the discriminant required in the lower levels.

Moreover, the vocabulary based image representations may be, as noted above, based on building histogram of local image features. The bins of the histograms are typically defined by a tree classifier due to potential speed advantages in performing the visual search. In addition, some tree classifiers provide classification results at multiple levels. This may allow multi-level histograms and, as a result, approaches that may provide a more accurate similarity between descriptors, e.g., Pyramid Match Kernel, vocabulary guided histograms, and hierarchical vocabulary trees. However, due to possible high variance in these types of tree classifier, the samples that are close to classification boundaries may be misclassified. This misclassification results because two tree classifiers that are learned with the same dataset may generate very different partitioning of the space. These different ways of partitioning the space may generate misclassification of the local features to the bins, where this problem is generally known as the high variance problem.

Various aspects of the techniques may provide for an approach to handle this high variance problem. The various aspects of the techniques may provide for a form of "bagging" to potentially reduce the variance of hierarchical k-means classifiers or any other type of classifier. The techniques may provide for better classification of the images. While described below with respect to "bagging," the techniques may also provide for other approaches similar to bagging, such as boosting and/or bootstrapping.

In general, the techniques may provide for a system that is based on a vocabulary tree, where the vocabulary tree partitions the space of descriptors into several regions (words). Descriptors from each image are represented with a histogram, where each bin stores the number of descriptors that are classified to a word. These histograms are then used to calculate the image similarities between query and target images. The major source of potential error in these systems is due to classification error generated by the vocabulary tree. Specifically, this error may be due to misclassification of the corresponding descriptors from target and query images to different words. The techniques may address this problem by using multi-resolution mobile object recognition engine (MORE) descriptors and/or bagging decision trees instead of using a single tree.

Furthermore, as noted above, local image descriptors may be considered robust to imaging variations and have been used in a large number of applications. Descriptors are typically converted to histograms for efficient representation and kernels are generally used to calculate the similarity between the histograms. Because the histogram bins are defined by classification rules, kernels may not sustain the original robustness and matching accuracy. In this disclosure, various aspects of the techniques may provide for a bootstrap aggregating (bagging) kernel to address this lack of sustained robustness and matching accuracy. Multiple histograms may be calculated from bootstrap samples of the training set and the kernel values between multiple histograms may be aggregated to obtain the bagging kernel. While a bagging kernel may significantly improve the accuracy, this kernel may provide biased similarities when data-dependent classifiers are used to build the histograms. To reduce this bias, the techniques described in this disclosure may provide for a normalized bagging kernel. This kernel may be positive semi-definite with the use of certain types of classifiers. In the context of an image recognition application, the techniques may, by using a normalized bagging kernel, significantly improve the accuracy of classifying perspectively deformed local image descriptors to their corresponding un-deformed target originals.

FIG. 1A is a block diagram illustrating an image processing system 10 that implements various aspects of the techniques described in this disclosure. In the example of FIG. 1A, the image processing system 10 includes a client device 12, a visual search server 14 and a network 16. The client device 12 represents in this example a mobile device, such as a laptop, a so-called netbook, a personal digital assistant (PDA), a cellular or mobile phone or handset (including so-called "smartphones"), a global positioning system (GPS) device, a digital camera, a digital media player, a game device, or any other mobile device capable of communicating with the visual search server 14. While described in this disclosure with respect to a mobile client device 12, the techniques of described in this disclosure should not be limited in this respect to mobile client devices. Instead, the techniques may be implemented by any device capable of communicating with visual search server 14 via network 16 or any other communication medium.

The visual search server 14 represents a server device that accepts connections typically in the form of transmission control protocol (TCP) connections and responds with its own TCP connection to form a TCP session by which to receive query data and provide identification data. The visual search server 14 may represent a visual search server device in that the visual search server 14 performs or otherwise implements a visual search algorithm to identify one or more features or objects within an image. In some instances, the visual search server 14 may be located in a base station of a cellular access network that interconnects mobile client devices to a packet-switched or data network.

The network 16 represents a public network, such as the Internet, that interconnects the client device 12 and the visual search server 14. Commonly, the network 16 implements various layers of the open system interconnection (OSI) model to facilitate transfer of communications or data between the client device 12 and the visual search server 14. The network 16 typically includes any number of network devices, such as switches, hubs, routers, servers, to enable the transfer of the data between the client device 12 and the visual search server 14. While shown as a single network, the network 16 may comprise one or more sub-networks that are interconnected to form the network 16. These sub-networks may comprise service provider networks, access networks, backend networks or any other type of network commonly employed in a public network to provide for the transfer of data throughout the network 16. While described in this example as a public network, the network 16 may comprise a private network that is not generally accessible by the public.

As shown in the example of FIG. 1A, the client device 12 includes a feature extraction unit 18, an interface 22 and a display 24. Feature extraction unit 18 represents a unit that performs feature extraction in accordance with a feature extraction algorithm, such as a compressed histogram of gradients (CHoG) algorithm or any other feature description extraction algorithm that extracts features in the form of a histogram. Generally, the feature extraction unit 18 operates on image data 26, which may be captured locally using a camera or other image capture device (not shown in the example of FIG. 1A) included within the client device 12. Alternatively, the client device 12 may store the image data 26 without capturing this image data itself by way of downloading this image data 26 from the network 16, locally via a wired connection with another computing device or via any other wired or wireless form of communication.

While described in more detail below, the feature extraction unit 18 may, in summary, extract one or more feature descriptors 28 by Gaussian blurring the image data 26 to generate two consecutive Gaussian-blurred images. Gaussian blurring generally involves convolving the image data 26 with a Gaussian blur function at a defined scale. The feature extraction unit 18 may incrementally convolve the image data 26, where the resulting Gaussian-blurred images are separated from each other by a constant in the scale space. The feature extraction unit 18 then stacks these Gaussian-blurred images to form what may be referred to as a "Gaussian pyramid". The feature extraction unit 18 then compares two successively stacked Gaussian-blurred images to generate difference of Gaussian (DoG) images or a "difference of Gaussian pyramid.". The DoG images may form what is referred to as a "DoG space."

Based on this DoG space, the feature extraction unit 18 may detect keypoints, where a keypoint refers to a region or patch of pixels around a particular sample point or pixel in the image data 26 that is potentially interesting from a geometrical perspective. Generally, the feature extraction unit 18 identifies keypoints as local maxima and/or local minima in the constructed DoG space. The feature extraction unit 18 then assigns these keypoints one or more orientations, or directions, based on directions of a local image gradient for the patch in which the keypoint was detected. To characterize these orientations, the feature extraction unit 18 may define the orientation in terms of a gradient orientation histogram. The feature extraction unit 18 then defines the one or more feature descriptors 28 as a location and an orientation (e.g., by way of the gradient orientation histogram). After defining the feature descriptor 28, the feature extraction unit 18 outputs this feature descriptor 28 to the interface 22. The feature extraction unit 18 may output a set of feature descriptors 28 using this process.

The interface 22 represents any type of interface that is capable of communicating with the visual search server 14 via the network 16, including wireless interfaces and wired interfaces. The interface 22 may represent a wireless cellular interface and include the necessary hardware or other components, such as antennas, modulators and the like, to communicate via a wireless cellular network with the network 16 and via the network 16 with the visual search server 14. In this instance, although not shown in the example of FIG. 1A, the network 16 includes the wireless cellular access network by which the wireless cellular interface 22 communicates with the network 16. The display 24 represents any type of display unit capable of displaying images, such as the image data 26, or any other types of data. The display 24 may, for example, represent a light emitting diode (LED) display device, an organic LED (OLED) display device, a liquid crystal display (LCD) device, a plasma display device or any other type of display device.

The visual search server 14 includes an interface 32, a feature matching unit 36 and a feature descriptor database 38. The interface 32 may be similar to the interface 22 in that the interface 32 may represent any type of interface capable of communicating with a network, such as the network 16. The feature matching unit 36 represents a unit that performs feature matching to identify one or more features or objects in the image data 26 based on the feature descriptors 28. The feature matching unit 36 may access the feature descriptor database 38 to perform this feature identification, where the feature descriptor database 38 stores data defining feature descriptors and associating at least some of these feature descriptors with identification data identifying the corresponding feature or object extracted from the image data 26. Upon successfully identifying the feature or object extracted from the image data 26 based on the feature descriptors 28, the feature matching unit 36 returns this identification data as the identification data 42.

Initially, a user of the client device 12 interfaces with the client device 12 to initiate a visual search. The user may interface with a user interface or other type of interface presented by the display 24 to select the image data 26 and then initiate the visual search to identify one or more features or objects that are the focus of the image stored as the image data 26. For example, the image data 26 may specify an image of a digital video disc (DVD) box cover. The user may have captured this image using an image capture unit (e.g., a camera) of the client device 12 or, alternatively, downloaded this image from the network 16 or, locally, via a wired or wireless connection with another computing device. In any event, after selecting the image data 26, the user initiates the visual search to, in this example, search for the DVD online and retrieve information relevant to the DVD (e.g., the cast, movie reviews, etc.).

In response to initiating the visual search, the client device 12 invokes the feature extraction unit 18 to extract at least one feature descriptor 28 describing one of the so-called "keypoints" found through analysis of the image data 26. The feature extraction unit 18 forwards this feature descriptor 28 to the interface 22, which forwards the at least one feature descriptor 28 via the network 16 to the visual search server 14.

The interface 32 of the visual search server 14 receives the at least one feature descriptor 28. In response to receiving the feature descriptor 28, the visual search server 14 invokes the feature matching unit 36. The feature matching unit 36 receives the feature descriptor 28 and performs feature matching based on the feature descriptors 28. The feature matching unit 36 performs feature matching by accessing the feature descriptor database 38 and traversing feature descriptors stored by the feature descriptor database 38 to identify one or more substantially matching feature descriptors. Upon successfully identifying the feature extracted from the image data 26 based on the feature descriptors 28, the feature matching unit 36 outputs the identification data 42 associated with the feature descriptors stored in the feature descriptor database 38 that matches to some extent (often expressed as a threshold) the feature descriptors 28. The interface 32 receives this identification data 42 and forwards the identification data 42 via the network 16 to the client device 12.

The interface 22 of the client device 12 receives this identification data 42 and presents this identification data 42 via the display 24. That is, the interface 22 forwards the identification data 42 to the display 24, which then presents or displays this the identification data 42 via a user interface, such as the user interface used to initiate the visual search for the image data 26. In this instance, the identification data 42 may comprise a name of the movie. In some instances, the interface 22 forwards the identification data to a visual search application executing within the client device 12, which then uses this identification data (e.g., by presenting this identification data via display 24). The user may confirm that this identification data is correct, and the visual search application may then initiate a search of the Internet or other publically accessible server to retrieve information regarding the identified and confirmed movie name.

While various components, modules, or units are described in this disclosure to emphasize functional aspects of devices configured to perform the disclosed techniques, these units do not necessarily require realization by different hardware units. Rather, various units may be combined in a hardware unit or provided by a collection of inter-operative hardware units, including one or more processors as described above, in conjunction with suitable software and/or firmware stored to computer-readable mediums. In this respect, reference to units in this disclosure is intended to suggest different functional units that may or may not be implemented as separate hardware units and/or hardware and software units.

When preparing the feature descriptor database 38, the feature descriptors corresponding to each of the training images (which may also be referred to as "target images") are defined in a feature descriptor space. This space may then be partitioned into n partitions, where each of the n partitions may be further partitioned into n sub-partitions and so on. Often, the sub-partitioning is performed until some threshold partitioning level L is reached.

This partitioning may be done to enable the feature descriptors to be represented as a hierarchical n-dimensional tree, which may further be reduced so that each training image may be represented as a histogram of feature descriptors. The root node of the tree may have n child nodes, each of which may have n child nodes and so on for L levels. Each feature descriptor may then be stored to one of the leaves of the hierarchical n-dimensional tree. The number of feature descriptors from each image may then be stored to the leaves of the hierarchical tree. These leaves may be thought of as an $n^L$ length array of a histogram of feature descriptors. Each entry in this array stores the number of feature descriptors from a training image.

Figure 3:
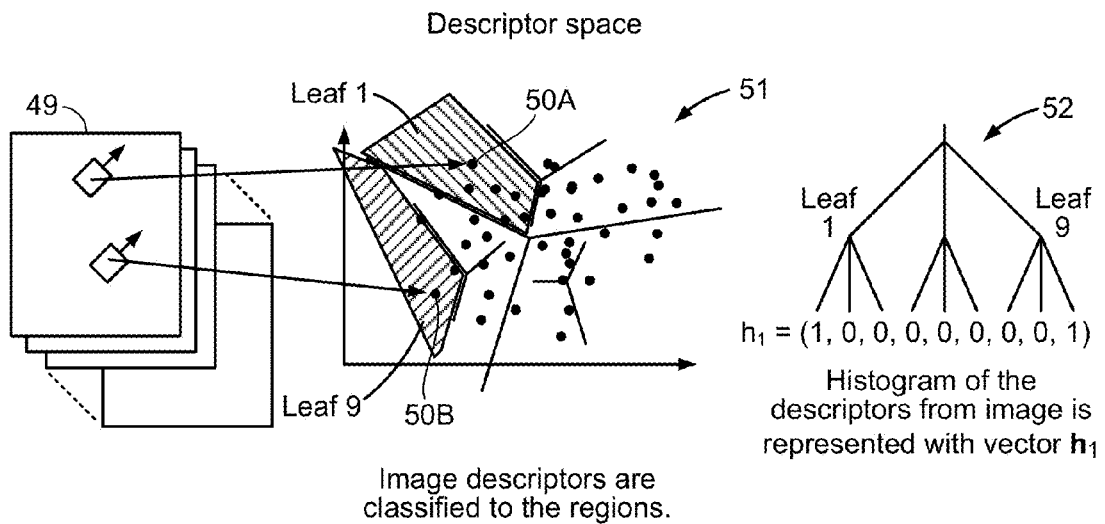
FIG. 3 is a diagram illustrating partitioning of a feature descriptor space and subsequent conversion of the feature descriptors to histogram representations.

To illustrate consider FIG. 3, where the training images correspond to DVD covers. In the example of FIG. 3, two feature descriptors 50A and 50B ("feature descriptors 50") are extracted from a first training image 49. A feature descriptor space 51 is formed, and these two extracted feature descriptors 50 are identified in the feature descriptor space 51. The feature descriptor space 51 is partitioned in the manner shown in the middle of FIG. 3. This partitioning may be reflected by the tree 52 on the right having n equal to three and a level equal to two (inclusive of zero, which denotes the leaf level). Accordingly, the number of leaf nodes equals $3^2$ or nine. As shown in the feature descriptor space 51, the feature descriptors 50 of the first training image are stored in leaf 1 and leaf 9 of the tree 52. As a result, a histogram $h_1$ may be defined for the first training image that is equal to (1, 0, 0, 0, 0, 0, 0, 0, 1) to denote that the first training image includes one feature descriptor 50A stored to the first leaf and feature descriptor 50B stored to the ninth leaf of the tree 52. Each of the plurality of training images may be defined using a similarly constructed histogram.

Given that most training images typically only include a very few of the total number of feature descriptors, the histogram may be sparse in the sense that each histogram includes only a small number of non-zeros relative to the number of zeros (as shown above in the example of FIG. 3). These histograms may then be stored using inverted files, which is a way by which to only store non-zero elements of each histogram, thereby compressing the histogram (or, in other words, the representation of the training images) even further. These inverted files may then be stored to the database 38 (referring back to FIG. 1A).

In this respect, one of the potential advantages of vocabulary based representations over descriptor based recognition systems is memory savings and fast similarity measure (e.g., when inverted files are used). Assume, for purposes of example, in average each of N images in the database have n descriptors with each of these descriptors occupying d bytes. In total Nnd8 bits of total storage may be required. n may vary depending on the complexity of the scene (e.g., a number of keypoints) and a size of the image. Assume, again for purposes of example, a maximum 512 for DVD covers. And further assume that d=128 bytes for a commonly used scale invariant feature transform (SIFT) descriptor. Under these assumptions a space of 65536 bytes may be required when using a kd-tree to store the descriptors of a single image.

On the other hand, for a vocabulary tree with k children at each node and depth D there are in total $(1-k^{D+1})/(1-k)$ nodes which is in the order of $O(k^D)$ (where this notation refers to big-O notation, which is a mathematical notation used to describe a limiting behavior of a function). Consider a vocabulary tree having k=8 and D=4, where in total approximately (only the leaves) 4096 (exactly 4681 nodes) dimensional multi-resolution histogram representation are stored for each image. Assuming further that maximum number of descriptors per image is 512, each image can be represented with 4096-dimensional vector with 4096 bytes. This vocabulary tree may result in a factor of 10 savings in terms of memory consumption.

In addition, the multi-resolution histogram vector may be very sparse, which allows for the use of inverted files to store the image indices with respect to nonzero entries only. By using inverted files, the techniques may provide for even less memory consumption. For example, assuming each image has 512 descriptors and the vocabulary tree has 4096 leaf nodes, the worst case is that all 512 descriptors may be at a single leaf node. Even in this worst case, the amount of storage to store the inverted files for this image may be 512*log(N)*log(512) bits if there are N images in the dataset.

Overall, for N images with n descriptors per image, the worst case index storage may be log(n)*n*log(N)*N bits, where log(n) bits may be sufficient to store the number of descriptors per image (n) in the node, log(N) bits may be required to store the label of the image, and this is done in n inverted files in the worst case. On the other hand, a kd-tree based approach to store the n descriptors of each d bytes from N images in total of 8ndN bits.

The inverted files may allow for fast calculation of the indices of target images that have maximum number of intersecting histograms with the query. As the $L_1$ distance may be proportional to the negative of the histogram intersections for normalized vectors, the inverted files may allow sorting of the closest training images with respect to their $L_1$ distance from the query in a fast manner in comparison to other approaches.

After forming the database 38, the visual search server 14 may then receive features descriptors, such as feature descriptor 28, extracted from the image data 26 by the client device 12. The feature matching unit 36 may include the tree data structure 52 for purposes of classifying the received feature descriptors 28. The feature matching unit 36 may traverse (often, partially, meaning that not all nodes of the tree are traversed) the tree data structure 52 based on the received feature descriptors 28 to generate a histogram representation of the feature descriptors 28. After determining what may be referred to as a "query histogram representation" or "query histogram," the feature matching unit 36 may apply some form of kernel to identify a similarity between the query histograms and the training histograms (or what may be otherwise referred to as the "target histograms") stored to the feature descriptor database 38.

That is, the visual search server 14, which may represent a descriptor-based recognition system, may perform feature descriptor matching and hypothesis refinement (which may select a single one of the list using confidence assessment processes) to classify the object or objects present in the query image data 26. To perform this feature descriptor matching, the visual search server 14 may store all feature descriptors extracted from all the objects in the training set to the database 38. Hence, the size of the database 38 may scale linearly with the number of descriptors in the training set. This may limit the number of images that can be stored in the database. Alternatively, as summarized above, objects may be compactly represented with the histogram of feature descriptors (or, what may in other words be referred to as a vocabulary-based representation). The recognition follows efficient comparison of these sparse histograms using inverted files. The visual search server 14 may either provide the list of possible matches as identification data 42 that classifies the objects or perform a hypothesis refinement on a small number of possible matches to classify the object or objects present in the query image, thereby providing identification data 42 that classifies the objects.

Various issues may arise with the above system 10 when the objects are captured from perspectives that are off-axis such that the objects in the captured image data 26 exhibit perspective or other geometrical deformations. The perspective deformations of objects may result in query feature descriptors 28 that are in different portions of the feature space than the corresponding target feature descriptors (that would have identified the object had the object been captured from an on-axis angle). To illustrate, consider the following example of this perspective deformation issue shown in FIG. 4.

Figure 4:
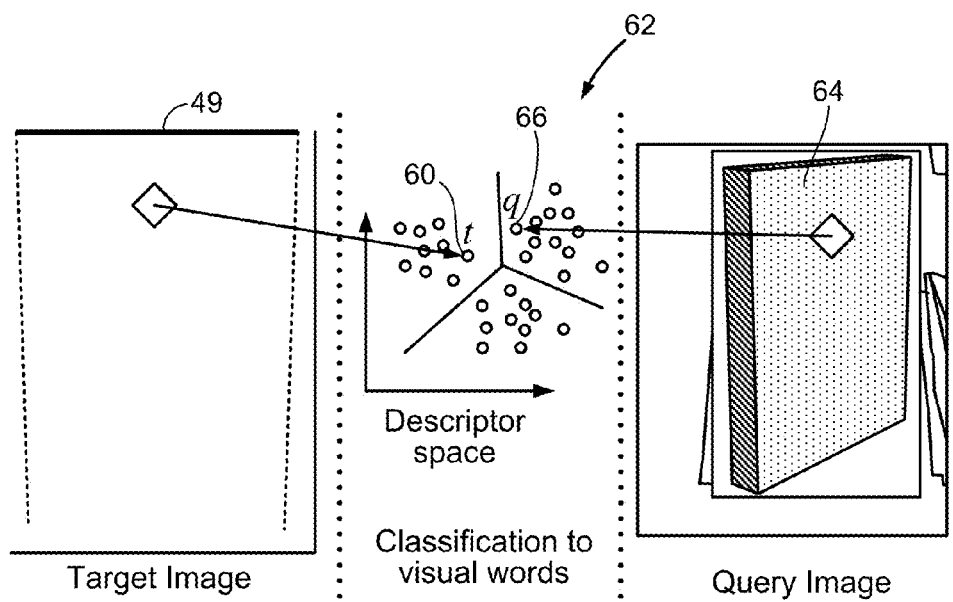
FIG. 4 is a diagram illustrating how perspective deformations in image data may result in improper classification of objects in the image data.

FIG. 4 is a diagram illustrating how perspective deformations in image data, such as the image data 26 of FIG. 1A, may result in improper classification of objects in the image data 26. In the example of FIG. 4, the target image 49 used during preparation of the database is taken on-axis, resulting in the t feature descriptor 60 being located in what may be referred to as the first of three partitions of the feature descriptor space 62. The query image 64, however, was captured off-axis, resulting in skew of the same object from which the t feature descriptor 60 was extracted. The query feature descriptor 66 (denoted as q in FIG. 3) extracted from this object is located in the second of the three partitions of the feature descriptor space 62. When attempting to identify the object from which the query feature descriptor 66 was extracted, the feature matching unit 36 may identify feature descriptors in the second partition (due to the way by which feature descriptors are matched using a sum of distances approach) as matching the query feature descriptor 66. As a result, the feature matching unit 36 may identify the object to which the query feature descriptor 66 corresponds incorrectly due to the perspective deformation of the object in the image data 26.

Figure 5:
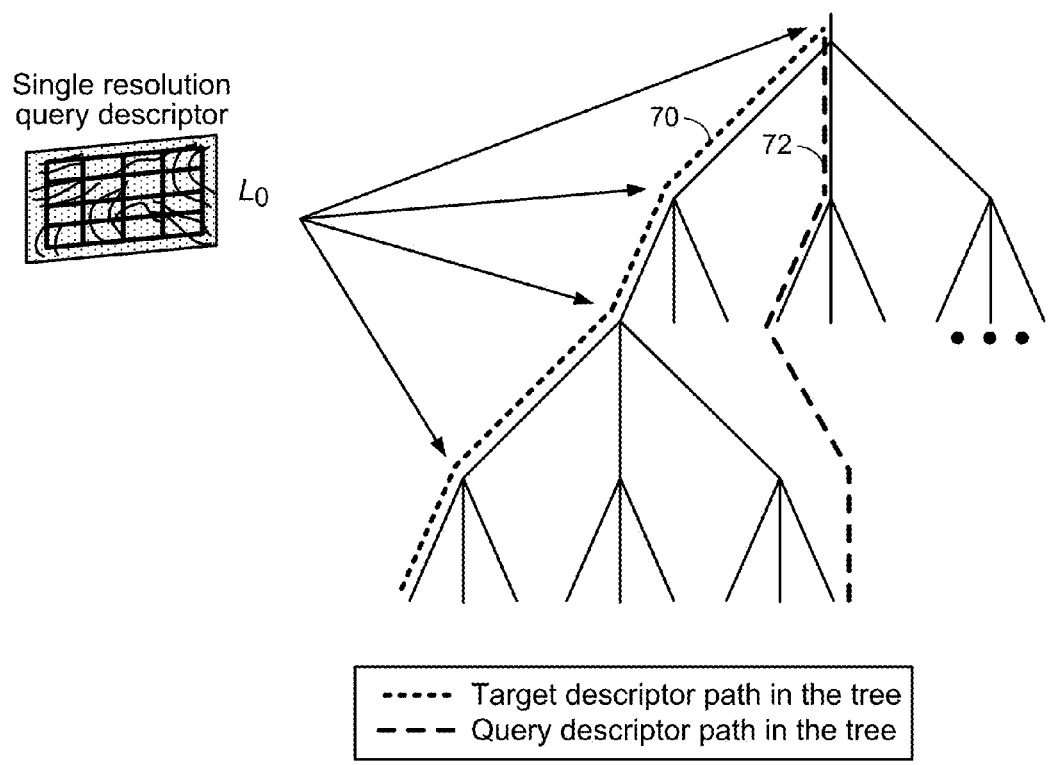
FIG. 5 is a diagram illustrating traversal of a classification tree when a query feature descriptor has been extracted from perspectively deformed image patch.

In other words, as illustrated in FIG. 5, classification to the single-resolution hierarchical tree may result in large distances between the histograms of the matching descriptors, because the mismatch occurs lower in the tree (or closer to the root). As shown in FIG. 5, a line 70 may represent the target descriptor path, while a line 72 may represent the query descriptor path. This results in large distances between the multi-resolution histograms of the descriptors (histograms obtained at multiple levels of the hierarchical tree) of the matching images, since the matching target and query descriptors result in significantly different paths (e.g., represented by lines 70 and 72).

In accordance with various aspects of the techniques described in this disclosure, the visual search server 14 may generate a hierarchically arranged data structure to be used when classifying one or more objects included within a query image based on multi-resolution query feature descriptors extracted from the query image at a first scale space resolution and a second scale space resolution. In some examples, the feature matching unit 36 may generate this hierarchically arranged data structure. In other examples, a different computing device may generate this hierarchically arranged data structure, where this computing device may be different from the visual search server 14. Regardless of the device that generates this hierarchically arranged data structure, the feature matching unit 36 may store the hierarchically arranged data structure, where this hierarchical data structure is denoted as hierarchical tree 53 in the example of FIG. 1A.

The hierarchical tree 53 may be similar to the tree 52 shown in the example of FIG. 3, except that the tree 53 represents a first query feature descriptor of the multi-resolution feature descriptor extracted at the first scale space resolution and a second corresponding query feature descriptor of the multi-resolution feature descriptor extracted at the second scale space resolution arranged hierarchically according to the first scale space resolution and the second scale space resolution. The scale space resolution and scale space are described below in more detail with respect to FIGS. 18-20. In any event, the visual search server 14 may then perform a visual search based on the generated data structure 53.

In this respect, the techniques may provide for the generation a data structure, such as the n-dimensional hierarchical tree 53, that may be constructed from feature descriptors extracted at multiple scale space resolutions. Rather than identify feature descriptors at certain scale space resolutions from target images, the techniques described in this disclosure may extract feature descriptors for the same keypoint at multiple scale space resolutions. When constructing the hierarchical tree 53, the feature descriptors may be arranged within the tree according to their respective levels with higher level scale space resolutions (which correspond to a more highly smoothed patch of image data identified by a keypoint)

being closer to the root of the hierarchical tree and lower level scale space resolution (which correspond to a less highly smoothed patch of the image data identified by the keypoint) being closer to the leaves. By using multi-resolution feature descriptors and arranging them in this manner to form the hierarchical tree, the techniques may facilitate identification of objects in images having perspective deformations.

The techniques may be more resilient to or tolerant of perspective deformations by virtue of constructing a multi-resolution hierarchical tree 53 arranged such that target feature descriptors extracted from more highly smoothed patches are used for classification closer to the root of the tree and target feature descriptors extracted from less highly smoothed patches are used closer to the leaves of the tree. Analysis of single-resolution hierarchical trees (which may refer to trees constructed from feature descriptors extracted from patches of target images processed at a single scale space resolution) may show that the distance between higher level feature descriptors extracted from patches of a target image and patches of a corresponding query image is smaller than the distance between corresponding lower level feature descriptors.

Given that these distances are smaller, partitioning algorithms used when partitioning the feature descriptor space are more likely to group these higher level feature descriptors in the same partition, increasing the match rate at the root and subsequent levels of the tree. These distances, at low level scale space resolutions, are increased as perspective deformations are introduced in the captured image, which may further decrease the likelihood of successfully identifying the objects in the target image (or at least result in substantially more delay in identifying the objects in the target image). The techniques may therefore be more resilient to or tolerant of perspective deformations by virtue of constructing a multi-resolution hierarchical tree 53 such that target feature descriptors extracted from more highly smoothed patches are used for classification closer to the root of the tree (and thus are more likely to correctly match query feature descriptors due to the greater level of smoothing) and target feature descriptors extracted from less highly smoothed patches are used closer to the leaves of the tree (to further refine the comparison as less smoothing is applied to these patches).

In this way, the techniques may provide for the use of multi-resolution descriptors to build multi-resolution histograms from hierarchical vocabulary trees. The techniques may provide for robust results due possibly to stability of low resolution descriptors to keypoint localization errors and local viewpoint deformations. The classifiers at the higher levels of the vocabulary tree, which have lower variance, may then be used to partition the descriptor space with the low resolution components of the descriptors. On the other hand, the lower levels with high classification power may be used to partition the high resolution components of the descriptors. The techniques may therefore improve the recognition of the images represented with hierarchical vocabulary trees. In addition, given the advantages of vocabulary trees, such as small memory occupation and fast similarity measurement, the techniques may enable the building of real-time recognition applications with large number of training images in mobile platforms.

Figure 1B:
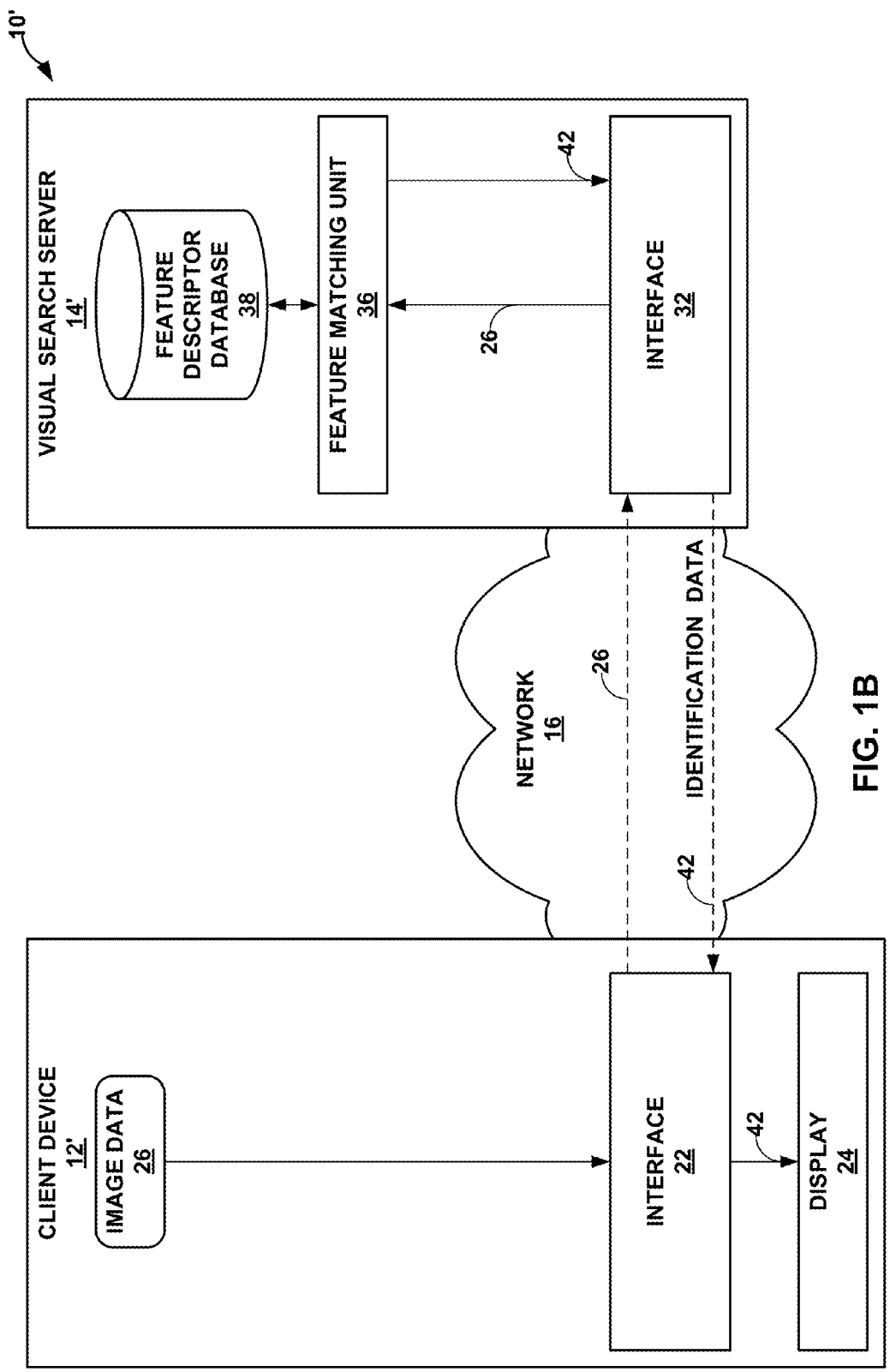

FIG. 1B is a block diagram illustrating a different variation of the image processing system 10 shown in the example of FIG. 1A that implements various aspects of the techniques described in this disclosure. The variation of the image processing system 10 is denoted as an image processing system 10' in the example of FIG. 1B. The image processing system 10' include a client device 12' and a visual search server 14', each of which may be substantially the same as the client device 12 and the visual search server 14 of FIG. 1A, respectively, except that client device 12' does not include a feature extraction unit 18. Instead, the client device 12' transmits the image data 26 via the interface 22 and the network 16 to the visual search server 14'. In response to receiving the image data 26, the feature matching unit 36 of the visual search server 14' perform the feature extraction in addition to the feature matching described above to determine the identification data 42.

Figure 2:
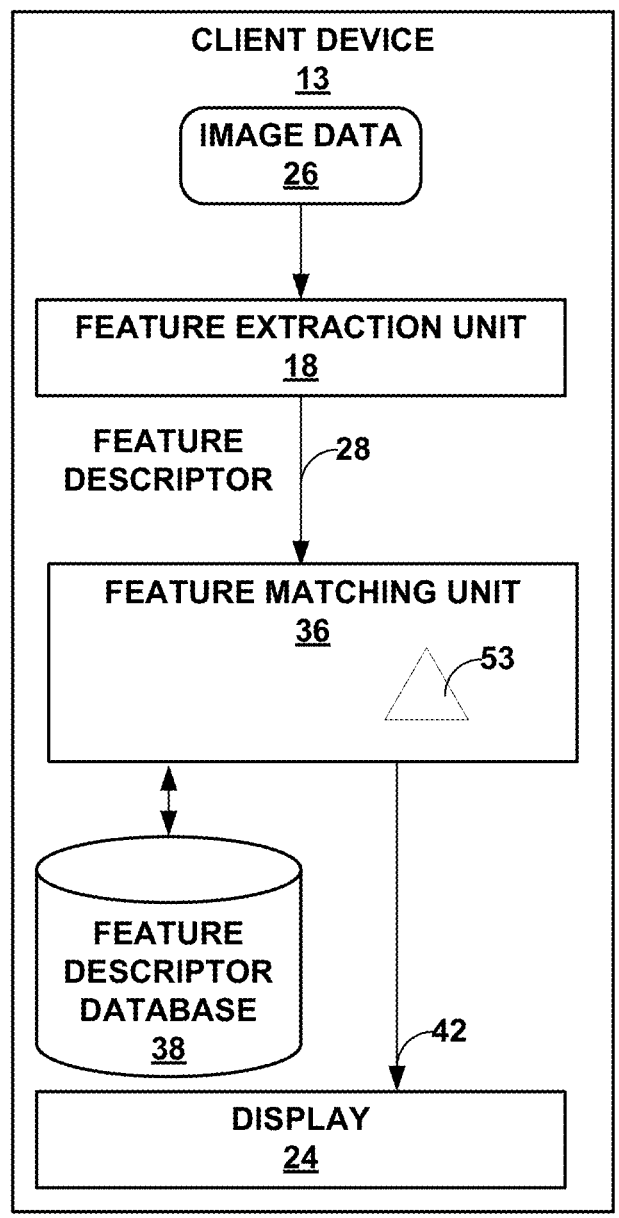
FIG. 2 is a block diagram illustrating a client device that may implement various aspects of the techniques described in this disclosure.

FIG. 2 is a block diagram illustrating a client device 13 that may implement various aspects of the techniques described in this disclosure. Client device 13 may be similar to the client device 12 of FIG. 1A or the client device 12' of FIG. 1B, except that client device 13 also includes modules or units of the visual search server 14 or the visual search server 14' so as to perform the visual search without potentially having to access or otherwise communicate with the visual search server 14 or the visual search server 14'. That is, client device 13 may include the feature matching unit 36 and the feature descriptor database 38 so as to generate identification data 42 without potentially having to access or otherwise communicate with the visual search server 14 or the visual search server 14'. Accordingly, the techniques should not be limited in this respect to requiring a visual search server, but may be performed by a single computing device, such as client device 13.

Figure 6:
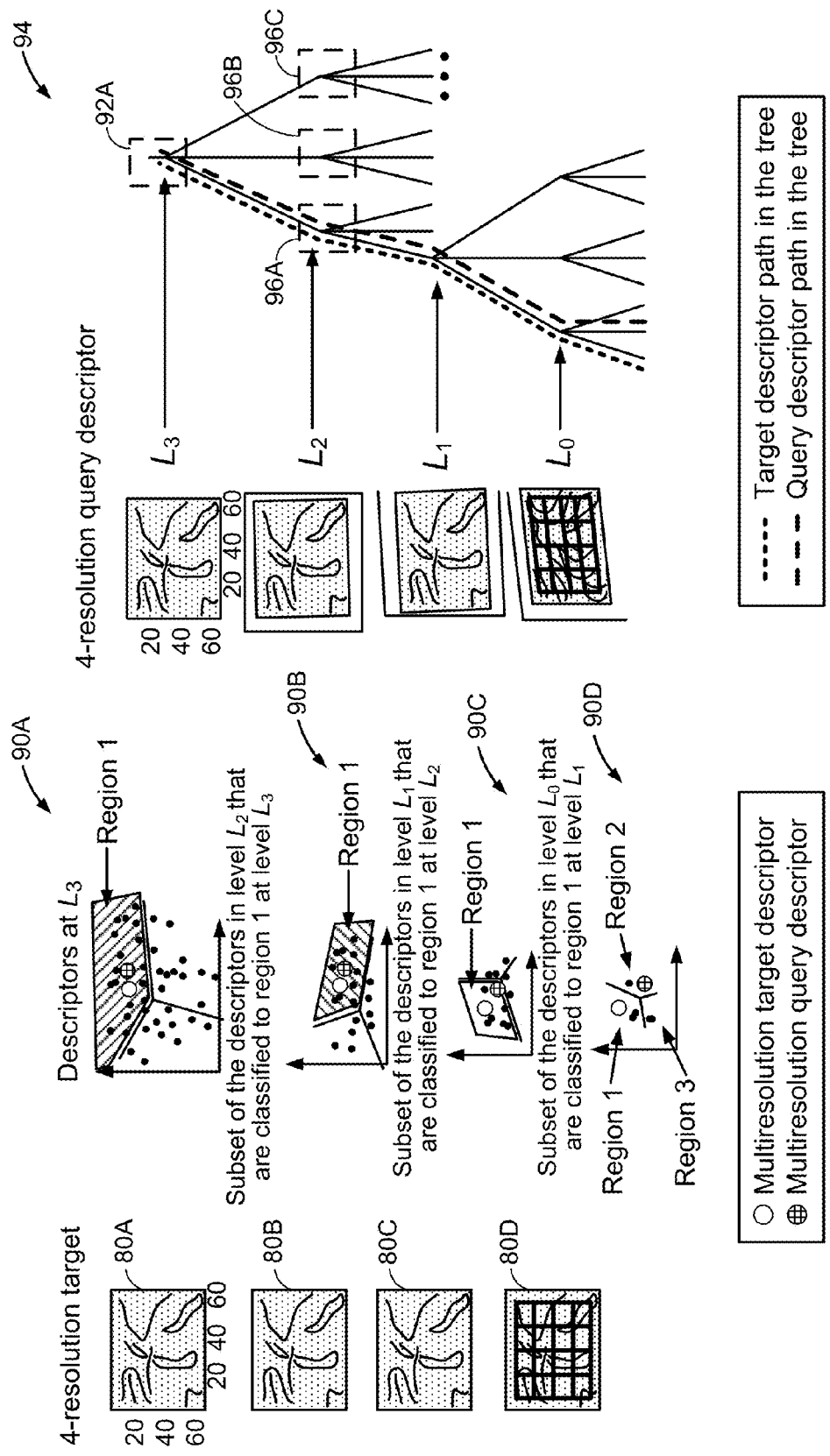
FIG. 6 is a diagram illustrating an example extraction of multi-resolution feature descriptors in accordance with various aspects of the techniques described in this disclosure.

FIG. 6 is a diagram illustrating an example extraction of multi-resolution feature descriptors in accordance with various aspects of the techniques described in this disclosure. In the example of FIG. 6, images 80A-80D represent the keypoint and surrounding image data (which may be referred to as a "patch") having been processed at a first scale space resolution (level 3 or $L_3$), a second scale space resolution ($L_2$), a third scale space resolution ($L_1$) and a fourth scale space resolution ($L_0$), respectively. The scale space resolution generally refers to the level or size of the smoothing kernel applied to the patch with a higher level generally resulting in more smoothing and a lower level resulting in less smoothing, respectively, as can be seen by images 80A-80D (which may also be referred to as "patches 80A-80D" and collectively as either "images 80" or "patches 80").

Initially, each of the patches from each of the target images (e.g., the patch 80A) are processed in this manner to generate $L_3$ target patches from which $L_3$ feature descriptors are extracted to form feature descriptor space 90A shown in the middle of FIG. 6. These $L_3$ feature descriptors are represented by a root portion 92A of a hierarchical tree 94, where this L3 feature descriptor space 90A is then partitioned to form three regions, as shown in the feature descriptor space 90A (with only Region 1 identified for ease of illustration purposes). Rather than continually partition this $L_3$ feature descriptor space to form the hierarchical tree 94, a computing device that performs the techniques described in this disclosure may consider each of the partitions (which are referred to as regions in FIG. 6) in turn. In the example of FIG. 6, the computing device considers region 1, identifying all of the $L_3$ feature descriptors located in region 1. The computing device then replaces all of the $L_3$ feature descriptors located in region 1 with the corresponding $L_2$ feature descriptors (e.g., from patch 80B) to form a $L_2$ feature descriptor space 90B for region 1. The computing device then partitions this $L_2$ feature descriptor space for region 1 to form the branches from a first child node 96A (corresponding to the region 1 portion of the $L_2$ feature descriptor space 90B) of the root node 92A. These child nodes 96A-96C may correspond to each region of the $L_2$ feature descriptor space 90B. The computing device repeats this for the two remaining branches (which themselves correspond to regions 2 and 3 that are not shown in the example of FIG. 6 for ease of illustration purposes).

This above process is then repeated at the $L_1$ and $L_0$ scale space resolutions, resulting in $L_1$ feature descriptor space 90C and $L_0$ feature descriptor space 90D. That is, each region of the $L_2$ feature descriptor space is considered in turn, where the computing device replaces all of the $L_2$ feature descriptors located in a particular region with the corresponding $L_1$ feature descriptors to form the $L_1$ feature descriptor space 90C for the corresponding $L_2$ region. The computing device then partitions the $L_1$ feature descriptors space 90C, updating the tree with additional branches to reflect these partitions. The same is performed for each of the $L_1$ regions to form a $L_0$ feature descriptor space 90D corresponding to each of the $L_1$ regions. The $L_0$ regions are then partitioned and the one or more $L_0$ feature descriptors in each partition are stored to a corresponding leaf node in the hierarchical tree, thereby generating what may be referred to as a "multi-resolution n dimensional hierarchical tree" or a "multi-resolution hierarchical tree." While described with respect to a tree data structure, other types of data structures may be used, where such other data structures may be referred to as "multi-resolution data structures."

In any event, this multi-resolution hierarchical tree may be reduced in the manner described above to inverted files, effectively storing a scale and rotation invariant representation of each of the target images that is also, as shown below, tolerant to perspective deformation.

In this manner, the techniques may enable a computing device (such as the visual search server 14) to extract a first plurality of feature descriptors from a plurality of patches from one or more images, each of the plurality of patches processed at a first scale space resolution prior to extracting the first plurality of feature descriptors. Moreover, the visual search server 14 may perform the techniques to extract a second plurality of feature descriptors from the plurality of patches, each of the plurality of patches processed at a second scale space resolution prior to extracting the second plurality of feature descriptors. As noted above, the first scale space resolution may be greater than the second scale space resolution. The visual search server 14 may then generate a data structure, such as the above noted multi-resolution hierarchical tree data structure 94, to be used when classifying objects included within query images based on the first plurality of feature descriptors and the second plurality of feature descriptors such that the first plurality of feature descriptors and the second plurality of feature descriptors are represented in the data structure hierarchically according to the first scale space resolution and second scale space resolution.

More specifically, the techniques may enable the visual search server 14 to form this data structure 94 by, as one example, arranging the first plurality of feature descriptors in first scale space resolution feature descriptor space and partitioning the first scale space resolution feature descriptor space into two or more first scale space resolution partitions. The visual search server 14 may, as described above, generate a first scale space resolution portion of a tree data structure that represents each of the two or more first scale space resolution partitions as first scale space resolution child nodes 96A-96C of the tree data structure 94. For each of the two or more first scale space resolution partitions, the computing device may replace each of the first plurality of feature descriptors located in each of the two or more first scale space resolution partitions with a corresponding one of the second plurality of feature descriptors to form a second scale space resolution feature descriptor space 90B for each of the two or more first scale space resolution partitions. The computing device may then partition each of the second scale space resolution feature descriptor spaces into two or more second scale space resolution partitions, and generate a second scale space resolution portion of the tree data structure that represents each of the two or more second scale space resolution partitions as second scale space resolution child nodes from corresponding first scale space resolution child nodes of the tree data structure.

The computing device (which may generally refer to either the visual search server 14 or the client device 12) storing the multi-resolution hierarchical tree data structure 94 constructed in accordance with the techniques described in this disclosure may then be used to classify objects in images. To use this multi-resolution hierarchical tree 94, the visual search server 14 may receive an image and extract multi-resolution query feature descriptors (which may refer to a plurality of feature descriptors extracted from the same patch of a query image with each of the plurality of feature descriptors being extracted from the patch when processed at different scale space resolutions). Alternatively, the client device 12 may extract the multi-resolution query feature descriptors and send these feature descriptors 28 to the server.

Regardless of which device extracts the multi-resolution feature descriptors, the computing device (which is assumed for purposes of illustration to be the visual search server 14) then generates a multi-resolution histogram by classifying the multi-resolution feature descriptors 28 to multiple levels of the multi-resolution hierarchical tree 53. That is, the visual search server 14 may select a first portion of the multi-resolution hierarchical tree 53 representative of feature descriptors extracted at a first scale space resolution based on a first one of the plurality of query feature descriptors forming one of the multi-resolution feature descriptors 28 extracted at the corresponding first scale space. The visual search server 14 may compare these feature descriptors to compute a sum of differences, selecting one of the branches of the tree 53.

The visual search server 14 may then select the next portion of the multi-resolution hierarchical tree 53 representative of the target feature descriptors extracted at a second scale space resolution based on a second one of the plurality of query feature descriptors 28 extracted at the corresponding second scale space resolution. The visual search server 14 may select one of the branches of the tree 53 based on the sum of differences in a manner similar to that described above. This process may continue for the various resolutions until a leaf node of the tree 53 is selected that includes a non-zero entry for each of the images that have at least one descriptor.

The visual search server may then compare the multi-resolution histograms of descriptors between multi-resolution query feature descriptors 28 and multi-resolution target feature descriptors 28 to identify an object that corresponds to the query.

In other words, a potential goal in vocabulary based image representation is to convert the collection of local descriptors from an image to a single vector. Each dimension of this vector corresponds to the frequency of the descriptors in the image that belongs to the corresponding word of the vocabulary, e.g. the vector represents the histogram of descriptors over the bags of words.

The words of the vocabulary are typically defined with a classification algorithm that specifies a region of the space with similar descriptors. To define these words, classification trees are used because these classification trees generally provide a fast assignment of the query to the corresponding word. The approximation to optimal bijective matching (the minimum sum of distances between two sets of descriptors)

may be obtained by calculating the similarity between the images using hierarchical vocabulary representations. Pyramid match kernel (PMK) may be defined to measure the similarity between the collection of two sets of descriptors. Formally, the similarity between two images y and z represented with a set of local descriptors may be given by the intersection between the multiresolution histograms. The multiresolution histograms maybe obtained either by partitioning the space with a set of coarse-fine overlapping grids or by using a hierarchical tree.

For example, let $\Phi(y)$ and $\Phi(z)$ represent the multiresolution histograms with $\Phi(y)=(H_{-1}(y), H_0(y), \ldots, H_L(y))$ and $H_l(y)$ is the histogram at level l, the similarity between the images may be given by the following equation:

$$K_\Delta(\Phi(y), \Phi(z)) = \sum_{i=0}^{L} \frac{1}{2^i} \{I(H_i(y), H_i(z)) - I(H_{i-1}(y), H_{i-1}(z))\}$$

where the intersection function $I(H_i(y), H_i(z))=\sum_{j=1}^{r} \min(H_{i,j}(y), H_{i,j}(z))$ measures the overlap of the histogram bins of descriptors at tree level I and the difference between the intersection at consecutive tree levels are used in order to measure the amount of overlap at each level. In some instances, the tree level 0 are the leaves and the level L is the root. In some examples, the highest priority may be given to the lowest level of the pyramid by the weight term. This kernel can be seen as counting the overlapping number of descriptors in multi-resolution partitions of the descriptor space and adding these with a weight proportional to the size of the bins (and ideally to the probability of overlapping in these regions). In this respect, the kernel may return a measure of similarity between two images in terms of approximate probability of having similar descriptors.

In some instances, a more general positive semi definite kernel can be defined as follows:

$$K_\Delta(\Phi(y), \Phi(z)) = \sum_{i=0}^{L} \sum_{j=1}^{k'} w_{ij} \left\{ I(H_{i,j}(y), H_{i,j}(z)) - \sum_{j=1}^{k^{i-1}} I(H_{i-1,j}(y), H_{i-1,j}(z)) \right\}$$

where $H_{i,j}$ is the histogram at level I and node j, $w_{i,j}$ is the value associated with this histogram and the term on the right corresponds to the amount of intersection in the children of the current node. The immediately forgoing equation can be rewritten as set forth in the following equation (A):

$$K_\Delta(\Phi(y), \Phi(z)) = \sum_{i=0}^{L} \sum_{j=1}^{k'} (w_{ij} - p_{ij}) \{I(H_{i,j}(y), H_{i,j}(z))\} \quad (A)$$

where $p_{ij}$ is the weight of the parent of the histogram i,j and this is a valid kernel if $w_{ij} \geq p_{ij}$. This kernel may represent a more general form of the previous one with $W=\frac{1}{2}^i$, which use the same weight for all nodes j at level i.

The techniques described in this disclosure may enable a computing device to obtain multi-resolution histograms (defined by the vocabulary tree) from multi-resolution descriptors. In this example, it is assumed that the multi-resolution descriptors are $y=(y^0, y^1, \ldots, y^R)$ the set of descriptors extracted at the scale level of the detected keypoint $y^0$, at 1-level up $y^1$ and R levels up by $y^R$. The techniques further provide for a multi-resolution histogram representation that is defined by the vocabulary tree expressed mathematically as follows:

$$\Phi(y)=(H_{0,1}(y^{j_0}), \ldots H_{0,K^L}(y^{j_0}), H_{1,1}(y^{j_1}), \ldots, H_{1,K^{L-1}}(y^{j_1}), \ldots, H_{L,1}(y^{j_L})),$$

where $l_i$ represents the resolution of the descriptor that is used to classify the descriptors at level i of the tree, K represents the number of children per node and L is the depth of the tree. In some instances, the condition between the resolutions at different levels of the tree is $l_{i-1} \leq l_i$. In other words, the descriptors extracted from lower resolutions of the scale-space are used for generating the histogram bins at the higher levels of the tree.

In some examples, the multi-resolution histogram based representation of the set of descriptors is normalized to unit $L_1$ norm. This normalization is performed to potentially eliminate small deviations in the number of descriptors. The distance between the query and target images may be measured by $L_1$ metric, which may be understood to mean $d(y,z) = \|\Phi(y)-\Phi(z)\|_1$. When the representation is normalized, the histogram intersection may simply to calculating the $L_1$ distance as follows:

$$I(H(y), H(z)) = 1 - \frac{1}{2}\|H(y) - H(z)\|_{L_1}$$

if $$\|H(y)\|_1 = \|H(z)\|_1 = 1.$$

That is, the same performance may be achieved as that of the similarity kernel set forth above in equation (A) when normalizing the multi-resolution weighted histograms.

The hierarchical tree classifiers set forth in this disclosure may be organized from top to bottom as smooth to wiggly classifiers, meaning that various levels of the tree may underfit the training set (represent smooth classifiers) and various levels of the tree may overfit the training set (represent wiggly classifiers). The classifiers at the top of the tree may represent weak classifiers with consistent results. This means these may only generate robust classification for samples with not many variations, such as low resolution descriptors. The low resolution descriptors may be extracted from higher levels of the Gaussian scale space (GSS) with respect to the level of the keypoint. Hence, these classifiers may correspond to smooth descriptors that are robust to deformations. Moving toward the leaves of the tree, the classifiers and the corresponding regions may become smaller, potentially requiring more descriptor resolution for accurate classification. This arrangement may be performed by the high resolution descriptors that are extracted from GSS level closer to the keypoint.

In operation, a device comprising one or more processors may be configured to generate a hierarchically arranged data structure to be used when classifying one or more objects included within a query image based on multi-resolution query feature descriptor extracted from the query image at a first scale space resolution and a second scale space resolution, wherein the hierarchically arranged data structure represents a first query feature descriptor of the multi-resolution feature descriptor extracted at the first scale space resolution and a second corresponding query feature descriptor of the multi-resolution feature descriptor extracted at the second scale space resolution hierarchically according to the first scale space resolution and the second scale space resolution, and perform a visual search based on the generated data structure.

In some examples, the first feature descriptor is extracted from a patch of the query image, the patch being processed at the first scale space resolution prior to extracting the first feature descriptor, and the second feature descriptor is extracted from the patch of the query image, the patch being processed at the second scale space resolution prior to extracting the second feature descriptor.

In some examples, the one or more processors are further configured to apply a space partitioning algorithm to a feature descriptor space including target multi-resolution feature descriptors processed at the first scale space resolution to generate a first scale space resolution portion of a tree data structure, and apply the space partition algorithm to the feature descriptor space including corresponding target multi-resolution feature descriptors processed at the second scale space resolution to generate a second scale space resolution portion of the tree data structure.

In some examples, the one or more processors are further configured to apply a space partitioning algorithm to a feature descriptor space including target multi-resolution feature descriptors processed at the first scale space resolution to generate a first scale space resolution portion of a tree data structure and apply the space partition algorithm to the feature descriptor space including corresponding target multi-resolution feature descriptors processed at the second scale space resolution to generate a second scale space resolution portion of the tree data structure. Also, the one or more processors may be further configured to, when generating the data structure, traverse at least a portion of the tree data structure based on the multi-resolution query feature descriptor to determine a multi-resolution histogram representation of the multi-resolution query feature descriptor.

In some instances, the one or more processors are further configured to convert the multi-resolution histogram representation of the multi-resolution query feature descriptor into an inverted file.

In some examples, the one or more processors are further configured to apply a space partitioning algorithm to a feature descriptor space including target multi-resolution feature descriptors processed at the first scale space resolution to generate first scale space resolution portions of a plurality of different tree data structures, and apply the space partition algorithm to the feature descriptor space including corresponding target multi-resolution feature descriptors processed at the second scale space resolution to generate second scale space resolution portions of the different tree data structures. In these instances, the one or more processors may further be configured to, when generating the data structure, traverse at least a portion of each of the different tree data structures based on the multi-resolution query feature descriptor to determine a plurality of multi-resolution histogram representations of the multi-resolution query feature descriptor.

In some examples, the one or more processors are further configured to, when performing the visual search, compute, for each of the plurality of multi-resolution histogram representations of the multi-resolution query feature descriptor, a distance from target multi-resolution histogram representations of the target multi-resolution feature descriptors generated by traversing the corresponding one of the plurality of tree data structures, aggregate a minimum one of the distances computed for each of the plurality of multi-resolution histogram representations of the multi-resolution query feature descriptor to determine a similarity between the multi-resolution histogram representation and the target multi-resolution histogram representations, and determine identification data based on the similarity, the identification data associated with one or more of the target multi-resolution histogram representations from which the minimum distance was computed, the identification data classifying the one or more objects included within the query image. In these instances, the one or more processors are further configured to transmit the identification data to a client device that provided the multi-resolution feature descriptor.

In some examples, the one or more processors are further configured to, when performing the visual search, apply a normalized bagging kernel to the multi-resolution histogram representation of the multi-resolution query feature descriptor and the multi-resolution target histogram representations to determining a normalized similarity between the multi-resolution histogram representation of the multi-resolution query feature descriptor and the multi-resolution target histogram representations.

In some examples, the one or more processors are further configured to, when performing the visual search, transmit the data structure to a visual search device, receive identification data from the visual search device in response to transmitting the data structure, the identification data classifying the one or more objects included within the query image.

In some examples, the one or more processors are further configured to, when performing the visual search, compare the data structure to one or more target data structures to identify identification data, the identification data classifying the one or more objects included within the query image. In these examples, the one or more processors are further configured to transmit the identification data to a client device that provided the multi-resolution feature descriptor.

Moreover, the techniques may enable a device comprising one or more processors to traverse at least a portion of a first classifying data structure and a second classifying data structure based on a query feature descriptor to determine a first representation of the query feature descriptor and a second representation of the same query feature descriptor, and perform a visual search based on the first representation of the query feature descriptor and a second representation of the same query feature descriptor.

In some examples, the first classifying data structure is determined by, at least in part, applying a partitioning algorithm to a first subset of target feature descriptors. In these and other examples, the second classifying data structure is determined by, at least in part, applying the partitioning algorithm to a second subset of the target feature descriptors.

In some examples, the first classifying data structure comprises a first multi-resolution tree data structure that includes a first portion for classifying feature descriptors extracted at a first scale space resolution and a second portion for classifying feature descriptors extracted at a second scale space resolution. In these and other examples, the second classifying data structure comprises a second multi-resolution tree data structure that includes a first portion for classifying the feature descriptors extracted at the first scale space resolution and a second portion for classifying the feature descriptors extracted at the second scale space resolution.

In some examples, the query feature descriptor comprises a multi-resolution query feature descriptor that includes 1) a first feature descriptor extracted from a patch of a query image, the patch being processed at a first scale space resolution prior to extracting the first feature descriptor, and 2) a second feature descriptor extracted from the same patch of the query image, the patch being processed at a second scale space resolution prior to extracting the second feature descriptor.

In some examples, the one or more processors are further configured to, when performing the visual search, apply a normalized bagging kernel to the first representation of the query feature descriptor and the second representation of the same query feature descriptor to determine a normalized similarity between the first and second representations of the query feature descriptors and representation of target feature descriptors determined through application of the first and second classification data structure to the target feature descriptors.

In some examples, the first representation of the query feature descriptor comprises a first multi-resolution histogram. In these and other examples, the second representation of the query feature descriptor comprises a second multi-resolution histogram.

In some examples, the first representation of the query feature descriptor comprises a first multi-resolution histogram. In these and other examples, the second representation of the query feature descriptor comprises a second multi-resolution histogram.

In some examples, the one or more processors are further configured to, when performing the visual search, perform the visual search based on the first representation of the query feature descriptor and a second representation of the same query feature descriptor to identify identification data, the identification data classifying one or more objects of a query image from which the query feature descriptor was extracted.

In some examples, the one or more processors are further configured to transmit the identification data to a client device that provided either the query image or the query feature descriptor for use in performing the visual search.

In this way, the visual search server 14 may use the multi-resolution hierarchical tree data structure 53 to identify an object corresponding to query multi-resolution feature descriptors 28, where the query multi-resolution feature descriptors 28 comprises a first query feature descriptor extracted from a query patch of a query image processed at the first scale space resolution and a second query feature descriptor extracted from the query patch processed at the second scale space resolution. In some instances, the visual search server 14 may search a first portion of the data structure 53 that represents the first plurality of feature descriptors based only on the first query feature descriptor and search a second portion of the data structure that represents the second plurality of feature descriptors based only on the second query feature descriptor. To illustrate how the techniques described in this disclosure may facilitate perspective deformation tolerant visual search, consider the following FIG. 7.

Figure 7:
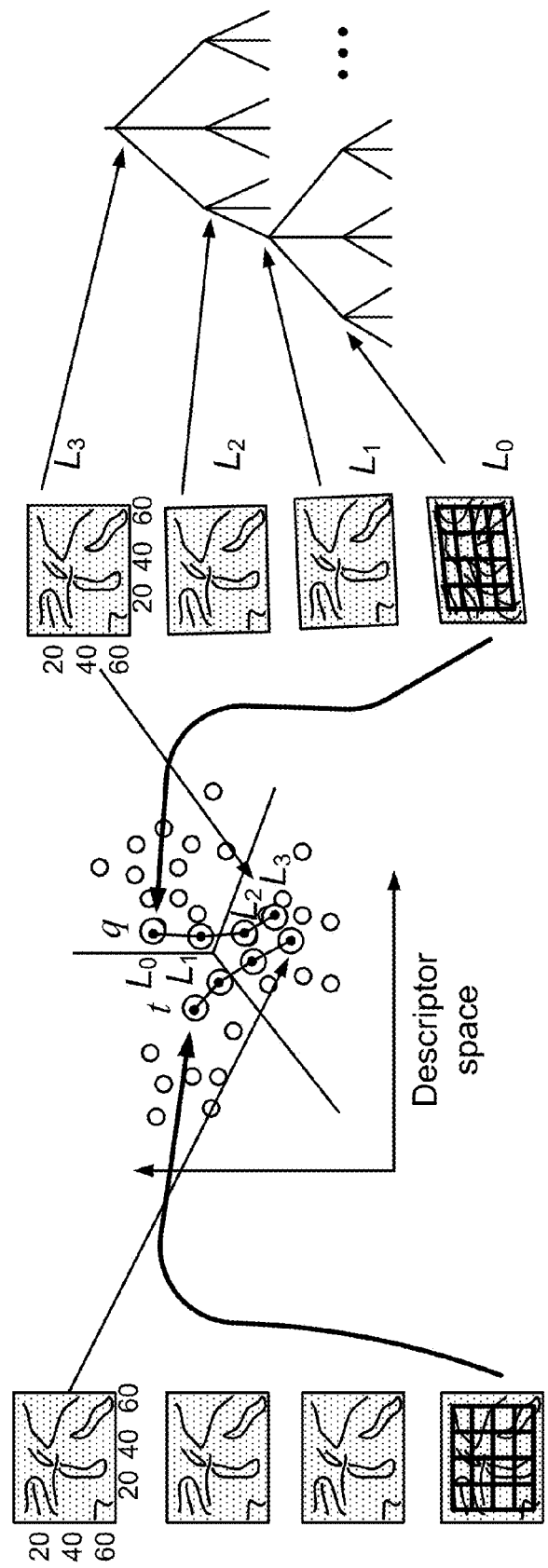
FIG. 7 is a diagram illustrating how a feature descriptor extracted from an image patch processed at an L3 scale space resolution (the lowest dot of the line denoted with a t) may reside in the same partition as the query feature descriptor extracted from a perspective deformed but similar image patch processed at the same L3 scale space resolution.

FIG. 7 is a diagram illustrating how a feature descriptor extracted from an image patch processed at an L3 scale space resolution (the lowest dot of the line denoted with a t) may reside in the same partition as the query feature descriptor extracted from a perspective deformed but similar image patch processed at the same L3 scale space resolution. At each successively lower scale space resolution (meaning that the image patch is smoothed less at each lower level and therefore includes more detail), the divergence between the target and query feature descriptors (denoted as feature descriptors t and q, respectively) increases where the query feature descriptor processed at the L0 scale space resolution resides in an entirely separate partition from the target feature descriptor processed at the same L0 scale space resolution due in part to the way in which partitioning algorithms may partition the feature descriptor space. This divergence results in increased accuracy in matching the histogram of descriptors.

The techniques described in this disclosure overcome the divergence by ordering the multi-resolution hierarchical tree such that target feature descriptors extracted at the L3 scale space resolution are ordered nearest the root with each successively more detailed target feature descriptor ordered lower in the hierarchical tree. By ordering the multi-resolution target feature descriptors in this manner, the techniques may facilitate matching of query feature descriptors and better tolerate query feature descriptors extracted from images that feature perspective deformation.

In other words, low resolution descriptors may be robust to perspective deformations, while high resolution descriptors may be discriminative. By using the low resolution components of the descriptors at the top levels of the vocabulary tree (which may be another name for the multi-resolution tree data structure) and high resolution at the lower levels (meaning closer to the leaf nodes of the tree), the techniques may provide for less classification errors at the top of the tree and, as a result, potentially more robust image representation.

Figure 8:
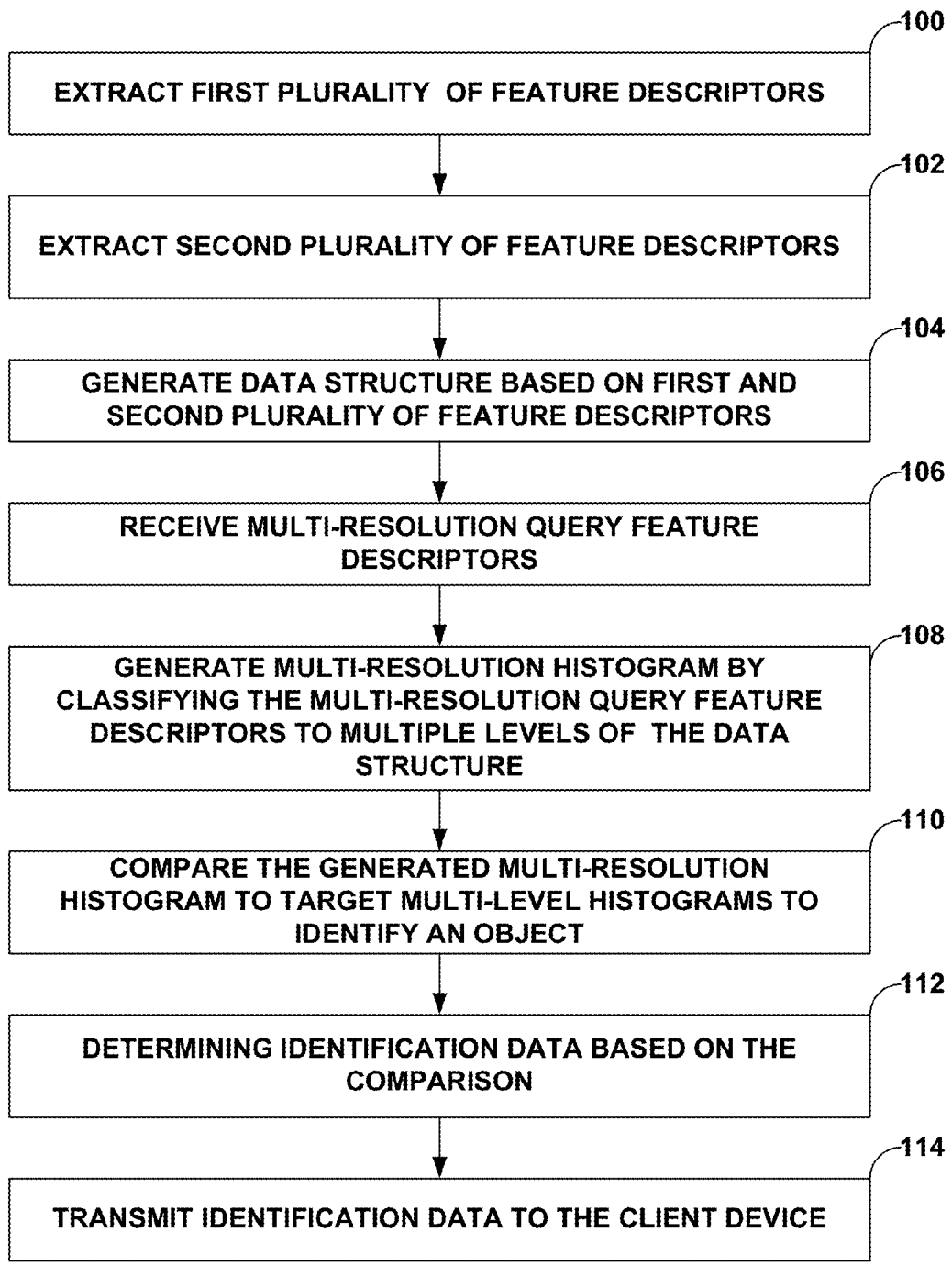
FIG. 8 is a flowchart illustrating exemplary operation of a visual search server in performing various aspects of the techniques described in this disclosure.

FIG. 8 is a flowchart illustrating exemplary operation of a visual search server in performing various aspects of the techniques described in this disclosure. While described below with respect to the visual search server 14 shown in the example of FIG. 1A, the techniques may be performed by any computing device, including the client device 12 shown in the example of FIG. 1A or any other type of computing device capable of determining multi-resolution feature descriptors and/or multi-resolution hierarchically arranged data structures.

Initially, the visual search server 14 may extract a first plurality of feature descriptors from a plurality of patches from one or more images (100), each of the plurality of patches processed at a first scale space resolution prior to extracting the first plurality of feature descriptors. Moreover, the visual search server 14 may perform the techniques to extract a second plurality of feature descriptors from the plurality of patches (102), each of the plurality of patches processed at a second scale space resolution prior to extracting the second plurality of feature descriptors. As noted above, the first scale space resolution may be greater than the second scale space resolution. The visual search server 14 may then, as described in more detail above, generate a data structure, such as the above noted multi-resolution hierarchical tree data structure 94, to be used when classifying objects included within query images based on the first plurality of feature descriptors and the second plurality of feature descriptors such that the first plurality of feature descriptors and the second plurality of feature descriptors are represented in the data structure hierarchically according to the first scale space resolution and second scale space resolution (104).

The visual search server 14 storing the multi-resolution hierarchical tree data structure 94 constructed in accordance with the techniques described in this disclosure may then be used to classify objects in images. To use this multi-resolution hierarchical tree 94, the visual search server 14 may receive multi-resolution query feature descriptors (which may refer to a plurality of feature descriptors extracted from the same patch of a query image with each of the plurality of feature descriptors being extracted from the patch when processed at different scale space resolutions) (106). Alternatively, the visual search server 14 may receive an image and extract the multi-resolution query feature descriptors, as shown in the example of FIG. 1B.

Regardless of which device extracts the multi-resolution feature descriptors, the computing device (which is assumed for purposes of illustration to be the visual search server 14) then generates a multi-resolution histogram by classifying the multi-resolution feature descriptors 28 to multiple levels of the multi-resolution hierarchical tree 53 (108). That is, the visual search server 14 may select a first portion of the multi-resolution hierarchical tree 53 representative of feature descriptors extracted at a first scale space resolution based on a first one of the plurality of query feature descriptors forming one of the multi-resolution feature descriptors 28 extracted at the corresponding first scale space. The visual search server 14 may compare these feature descriptors to compute a sum of differences, selecting one of the branches of the tree 53.

The visual search server 14 may then select the next portion of the multi-resolution hierarchical tree 53 representative of the target feature descriptors extracted at a second scale space resolution based on a second one of the plurality of query feature descriptors 28 extracted at the corresponding second scale space resolution. The visual search server 14 may select one of the branches of the tree 53 based on the sum of differences in a manner similar to that described above. This process may continue for the various resolutions until a leaf node of the tree 53 is selected that includes a non-zero entry for each of the images that have at least one descriptor.

The visual search server 14 may then compare the multi-resolution histograms of descriptors between multi-resolution query feature descriptors 28 and multi-resolution target feature descriptors 28 to identify an object that corresponds to the query (110). When identifying the object, the visual search server 14 may generate or otherwise determine identification data 42 based on this comparison (112), which the visual search server 14 then sends to the client device 12 in response to the query feature descriptors 28 (114).

FIG. 9A is a block diagram illustrating a different variation of the image processing system 10 shown in the example of FIG. 1A that implements various aspects of the techniques described in this disclosure. In the example of FIG. 9A, this variation of the image processing system 10 is denoted image processing system 120, which includes a visual search server 122 that may be substantially similar to the visual search server 14 of FIG. 1A except that the feature matching unit 124 includes multiple multi-resolution hierarchically arranged tree data structures 53A-53N ("multi-resolution hierarchically arranged tree data structures 53" or "multi-resolution hierarchically arranged trees 53").

As noted in detail above, there are various issues that may arise when a query image is captured off-axis such that the query image exhibits perspective deformations. These perspective deformations may result in query feature descriptors that are located in different portions of the feature descriptor space than the corresponding target feature descriptors. As a result, the partitioning algorithm may, due to the nature of partition algorithms, partition the feature descriptor space such that the target and corresponding query feature descriptors are located in different partitions. This effectively results in a longer traversal of the hierarchical tree due to misclassification at higher levels in the tree.

Various aspects of the techniques described above may reduce the likelihood of misclassification at the higher levels of the tree through use of a single multi-resolution hierarchical tree 53 in conjunction with multi-resolution query feature descriptors 28. Another way to reduce the likelihood of misclassification is to construct multiple different hierarchical trees 53 (which may be single resolution or multi-resolution) using different subsets of the training set for the partition algorithm. In other words, the feature descriptor space may be partitioned in different ways by initializing the partitioning algorithms using different subsets of the training set, resulting in the construction of multiple different hierarchical trees. Example partition algorithms may include a k-means clustering algorithm. The visual search server 122 may then store each of these multiple different hierarchical trees and descriptors or their indices classified to each of the leaf nodes.

When attempting to identify an object based on query feature descriptors, the visual search server 122 may then search these multiple different hierarchical trees 53 (either successively or to some extent concurrently) in an attempt to overcome the variance introduced into the search as a result of the perspective deformation between the query and target objects and the partitioning algorithm. The visual search device 122 may then compute or otherwise generate similarity scores by comparing multiresolution histograms of query and target descriptors with multiple different hierarchical trees 53 may then be aggregated and used to identify a successful match. This approach may be referred to as bootstrap aggregation or bagging multiple trees.

The selection of the subsets may effect the generalization performance of the recognition algorithm. Hence, in a training phase, the subset selection may be optimized using cross-validation techniques, such as k-fold cross validation.

In operation, the visual search server 122 (or any other type of computing device, including client device 12) may perform this second aspect of the techniques to, after initializing a partioning algorithm with a subset of the training set, perform the partioning algorithm to partition a feature descriptor space comprised of target feature descriptors into multiple first portions. The visual search server 122 may then generate a first data structure, e.g., the tree data structure 53A, to store the feature descriptors based on the multiple first portions. After initializing the partitioning algorithm with a second subset of the training set, the visual search server 122 may perform the partitioning algorithm to partition the feature descriptor space into multiple second portions. The visual search server 122 may generate a second data structure, e.g., the tree data structure 53N, to store the feature descriptors based on the multiple second portions, wherein the first and second data structures are to be employed when performing a visual search with respect to the same query feature descriptor. The visual search server 122 may then store these multiple data structures 53, which may include the above described multi-resolution hierarchical tree.

In any event, the visual search server 122 may store the first data structures generated based on the multiple first portions and storing the second data structures generated based on the multiple second portions. The visual search server 122 may then traverse (or partially traverse) both of the first data structure and the second data structure based on the same query feature descriptor to identify an object represented by the multiresolution histogram of query feature descriptors (which may include the multi-resolution feature descriptor noted above), providing identification data 42 upon identifying the object to the client device 12 in the manner described above.

In this way, the techniques may enable a device comprising one or more processors to apply a partitioning algorithm to a first subset of target feature descriptors to determine a first classifying data structure to be used when performing a visual search with respect to a query feature descriptor, and apply the partitioning algorithm to a second subset of the target feature descriptors to determine a second classifying data structure to be used when performing the visual search with respect to the same query feature descriptor.

In some examples, the partitioning algorithm comprises a k-means clustering algorithm.

In some examples, the one or more processors are further configured to, when applying the partitioning algorithm to the first subset of the target feature descriptors, apply the partition algorithm to a first subset of multi-resolution target feature descriptors, each of the multi-resolution target feature descriptors having two or more target feature descriptors extracted from the same patch with the patch being processed at different scale space resolution before extraction.

In some examples, the one or more processors are further configured to, when applying the partitioning algorithm to the second subset of the target feature descriptors, apply the partition algorithm to a second subset of multi-resolution target feature descriptors, each of the multi-resolution target feature descriptors having two or more target feature descriptors extracted from the same patch with the patch being processed at different scale space resolution before extraction.

In some examples, the one or more processors are further configured to, when applying the partitioning algorithm to the first subset of the target feature descriptors, apply the partition algorithm to a first subset of multi-resolution target feature descriptors, each of the multi-resolution target feature descriptors having two or more target feature descriptors extracted from the same patch with the patch being processed at different scale space resolution before extraction. In these examples, the one or more processors are further configured to, when applying the partitioning algorithm to the second subset of the target feature descriptors, apply the partition algorithm to a second subset of multi-resolution target feature descriptors, each of the multi-resolution target feature descriptors having two or more target feature descriptors extracted from the same patch with the patch being processed at different scale space resolution before extraction.

In some examples, the one or more processors are further configured to install the first classifying data structure and the second classifying data structure in a visual search device.

In some examples, the one or more processors are further configured to perform a visual search to identify an object described by one or more query feature descriptors using the first classifying data structure and the second classifying data structure.

Figure 9B:
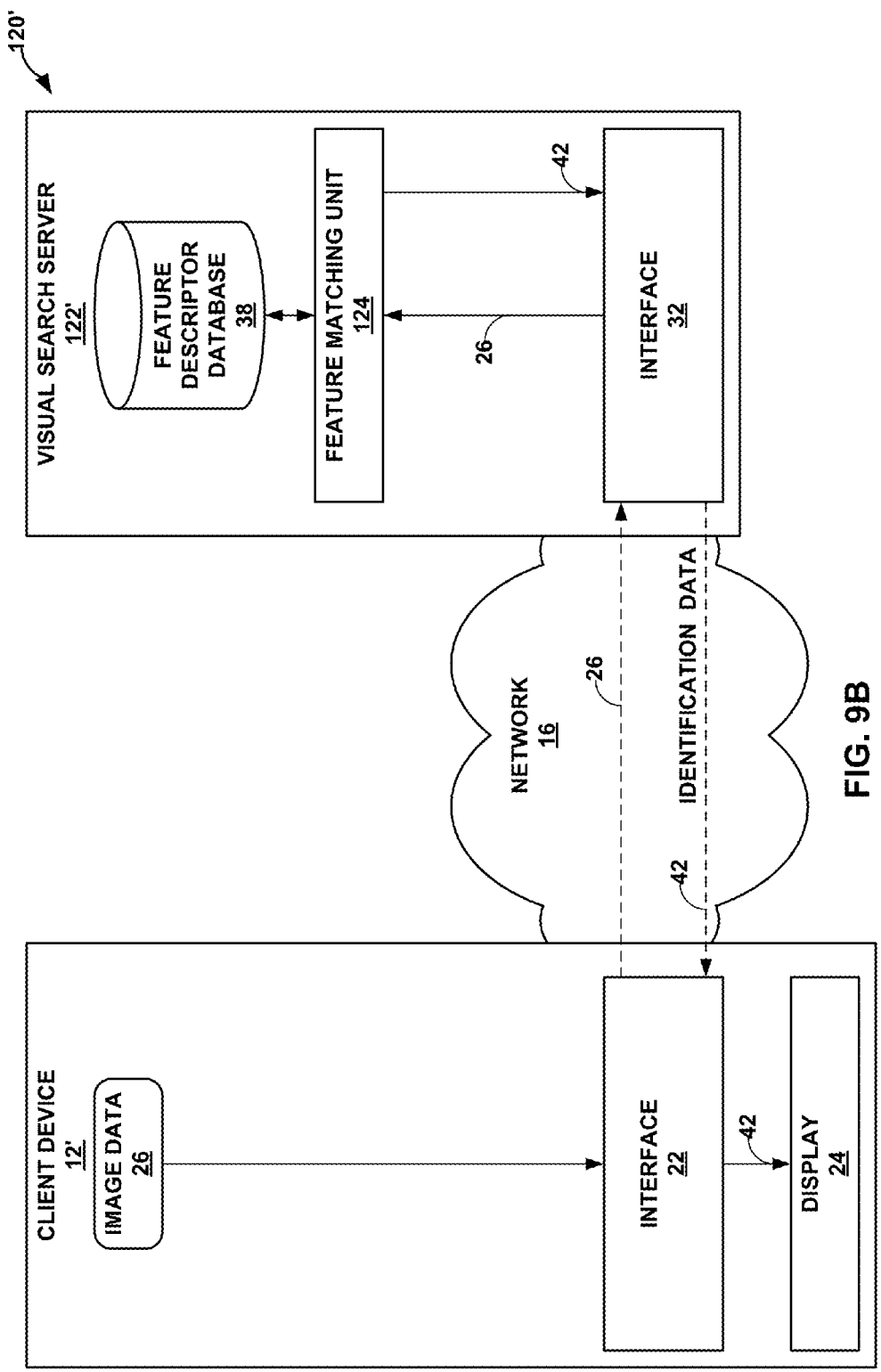

FIG. 9B is a block diagram illustrating a different variation of the image processing system 120 shown in the example of FIG. 1A that implements various aspects of the techniques described in this disclosure. The variation of the image processing system 120 is denoted as an image processing system 120' in the example of FIG. 9B. The image processing system 120' include a client device 12' and a visual search server 122', each of which may be substantially the same as the client device 12 and the visual search server 122 of FIG. 9A, respectively, except that client device 12' does not include a feature extraction unit 18. Instead, the client device 12' transmits the image data 26 via the interface 22 and the network 16 to the visual search server 122'. In response to receiving the image data 26, the feature matching unit 124 of the visual search server 122' performs the feature extraction in addition to the feature matching described above to determine the identification data 42.

Figure 10:
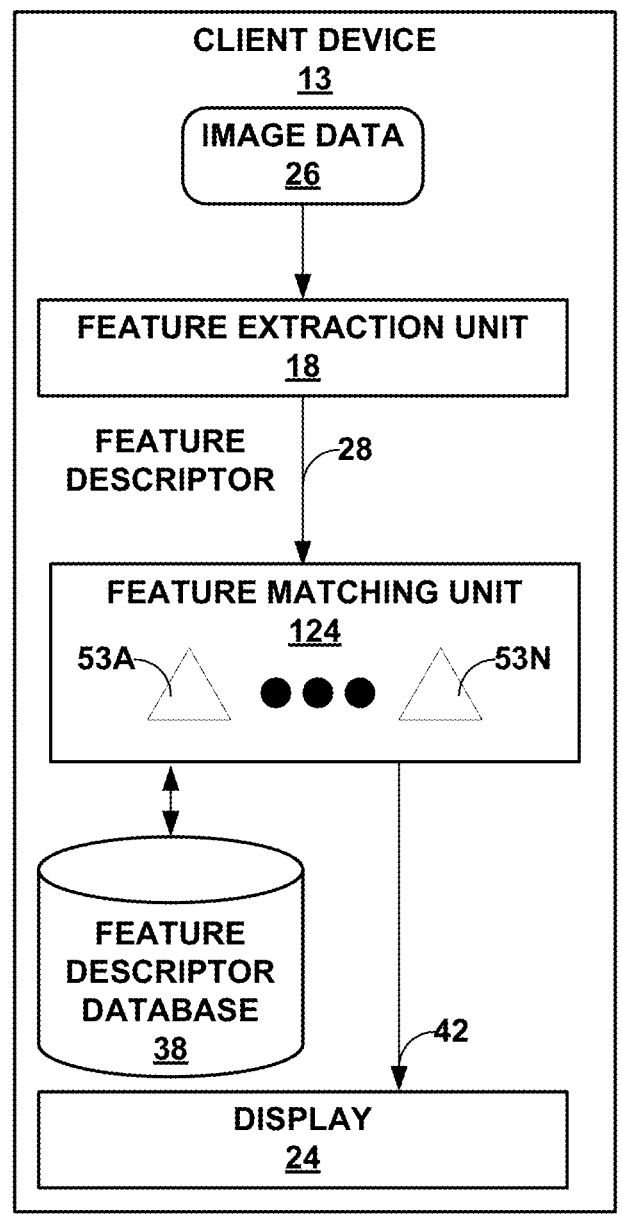
FIG. 10 is a block diagram illustrating a different variation of the client device shown in the example of FIG. 2 that implements various aspects of the techniques described in this disclosure.

FIG. 10 is a block diagram illustrating a client device 13' that may implement various aspects of the techniques described in this disclosure. Client device 13' may be similar to the client device 12 of FIG. 9A or the client device 12' of FIG. 9B, except that client device 13' also includes modules or units of the visual search server 122 or the visual search server 122' so as to perform the visual search without potentially having to access or otherwise communicate with the visual search server 122 or the visual search server 122'. That is, client device 13' may include the feature matching unit 124 and the feature descriptor database 38 so as to generate identification data 42 without potentially having to access or otherwise communicate with the visual search server 122 or the visual search server 122'. Accordingly, the techniques should not be limited in this respect to requiring a visual search server, but may be performed by a single computing device, such as client device 13'.

Figure 11:
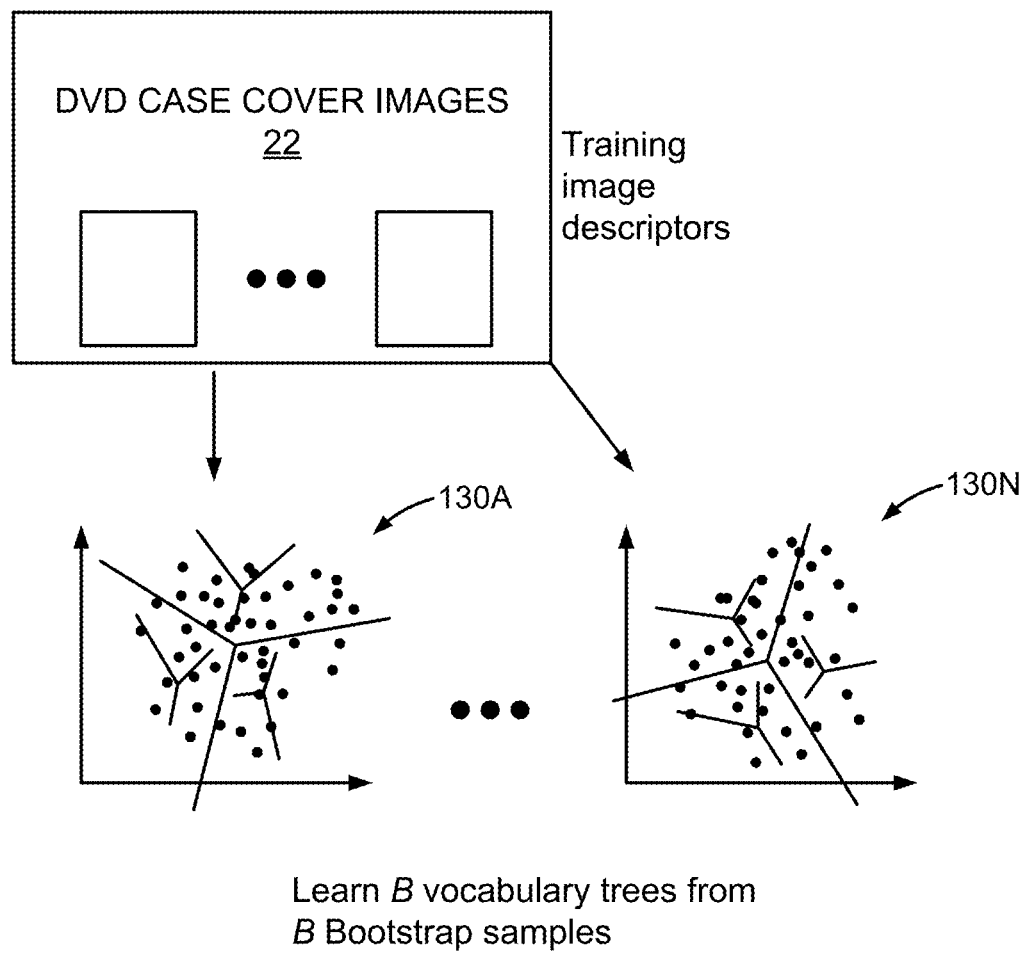
FIG. 11 is a diagram illustrating the construction and partitioning of a plurality of feature descriptor spaces based on a set of target feature descriptors extracted from digital video disc (DVD) case cover images.

FIG. 11 is a diagram illustrating the construction and partitioning of a plurality of feature descriptor spaces 130A-130N based on a set of target feature descriptors extracted from digital video disc (DVD) case cover images 132. As shown in the example of FIG. 11, each of the feature descriptor spaces 130A-130N ("feature descriptor spaces 130") are seeded with a different non-zero subset of feature descriptors, which are illustrated as dots in the two feature descriptor spaces 130A and 130N shown in the example of FIG. 11. The difference in the non-zero subset of feature descriptors can be seen by the varying dot patterns in the feature descriptor spaces 130A and 130N. As a result, the partitioning algorithm may partition each of these feature descriptor spaces 130 differently, as also shown in the example of FIG. 11 in that the partitions denoted by the lines are different for each of the feature descriptor spaces 130A and 130N.

As a result, the classification trees (which may be another way to refer to the single or multi-resolution tree data structures) may have high variance. For instance, trees that are trained on the same dataset with different initializations may result in significantly different partitioning of the space. Moreover, the descriptors that have even small variations (e.g., due to perspective deformations) may be classified to different bins (or partitions). To reduce this variance, the techniques provide the above described bootstrap aggregation. In this regard, the techniques may, for each training image j calculate i=1, . . . , B histograms of descriptors $h_{ji}$. The similarity S between query q and a target image j is given by aggregating (which may refer to averaging) the similarity scores in accordance with the following equation:

$$S = \frac{1}{B}\sum_{i=1}^{B} I(h_{qi}, h_{ji}),$$

where $I(h_{qi}, h_{ji})$ represents a histogram intersection kernel.

Moreover, inference from visual data may requires robustness to variations of imaging conditions, such as perspective deformations and illumination changes. Local feature descriptors that may be robust to these deformations have been used in several applications. For potentially efficient representation and matching, descriptors are commonly converted to histograms and kernels are then used to calculate the similarity between these descriptors. Because the histograms may be obtained by classifying the descriptors to the histogram bins, the kernels may not provide the robustness of the original descriptors. For instance, query samples that are usually extracted from deformed images generate histogram representations that may not either accurately match to its correspondence in the database or return a large number of false positive matches. This problem is illustrated in FIG. 11A. In this example, we use the histograms and a kernel to obtain approximate near neighbors to the query.

In some example, the techniques may provide for the use of histograms and a kernel to obtain approximate near neighbors to the query feature descriptors. The samples (which may refer to the image data 26 or the query feature descriptors 28) may be converted to histograms by classifying the samples to the leaves of a decision tree. Kernels may then be used to measure the similarity between the histograms. The baseline kernel, $K_A(q,x)$, may measure the similarity between the histograms obtained from a single tree. This kernel may be prone to accept a large number of false positives.

Various aspects of the technqiue smay provide for a so-called bagging kernel to address the above noted problem. The kernel provided in accoredance with the tehcnqiues described in this disclousre may be defined using the similarities between multiple histograms that are built with multiple classification rules learned from bootstrap samples of the training set. All training samples and the query sample may be represented with these histograms, as described above, and the similarity between them may be obtained by aggregating the individual kernel values that measure the similarity between histograms, which may be commonly referred to as a "bootstrap aggregating (bagging) kernel."

When one uses data dependent rules to estimate the classifiers that specify the histogram bins, such as decision trees, the bagging kernel is biased to the dense regions of the data distribution, i.e. the dense regions are consistently selected by the learning procedure. This results in a bias on the similarity scores for samples in the dense regions. Hence, the similarity between these samples are measured more accurately than the ones in sparse regions. However, accurately matching the samples in the sparse regions is critical for correctly classifying the images, as these samples are more distinctive than the ones in dense regions. To address this problem, we propose normalized bagging kernels that normalize the bias of the bagging kernel with respect to another kernel that has a higher bias on the similarity scores. FIG. 11B shows that the bagging kernel $K_B(q, x)$ applied in accordance with the techniques described in this disclosure may provide better localization with fewer false positives than $K_A(q,x)$, i.e. FIG. 11B shows a smaller dark region than FIG. 11A as one example.

When useing data dependent rules to potentially estimate the classifiers that specify the histogram bins, such as decision trees, the bagging kernel may be biased to the dense regions of the data distribution, e.g. the dense regions are consistently selected by the learning procedure. This may result in a bias on the similarity scores for samples in the dense regions. As a result, the similarity between these samples may be measured more accurately than the ones in sparse regions. However, accurately matching the samples in the sparse regions may be critical for correctly classifying the images, as these samples may be more distinctive than the ones in dense regions. To address this problem, the techniques may provide for normalized bagging kernels that potentially normalize the bias of the bagging kernel with respect to another kernel that has a higher bias on the similarity scores. This normalized bagging kernel may be defined by $K_C(q,x)$ and may provide better localization, e.g. the white region in FIG. 11C is smaller than in FIG. 11B.

Bootstrap sampling and aggregating (bagging) may reduce the generalization error of high variance inference algorithms. For example, bagging may be commonly applied in Random Forests to build robust classification and regression trees. Each tree in the forest may be built on randomized classification rules on bootstrap samples from a training set and fully grown until one sample is left at each leaf node. This may return trees with low bias and high variance error. Aggregating may reduce the variance, while potentially keeping the aggregate bias at the same value as the low bias of an individual tree. This may result in low bias and low variance estimation rules. However, a large number of decision trees may be needed to compensate for the high variance of the random decision trees.

Similarly, a set of decision rules may be used to approximate the similarity between the samples. Locality Sensitive Hashing (LSH) may be applied to find approximate near neighbors of a query sample and/or approximately match sets of vectors. Relaxation of finding exact nearest neighbor to approximate near neighbors may introduce large space and time efficiencies. There may exist a family of hash functions (classifiers) that possibly estimates the similarity between two samples by the probability of having the same hash codes. This may result in an efficient way to obtain a measure of similarity between two samples by at least generating a large number of hash codes and efficiently calculating the Hamming distance between these codes. LSH may also be used to approximate Earth Movers' Distance (EMD) between two normalized histograms. EMD may be embedded to $L_1$ space with the potential help of a multi-resolution grid that partitions the input space.

LSH may be used for fast approximate matching of the input samples represented in this space. A pyramid match kernel (PMK) may be used to approximate the distance with weighted histogram intersection kernels rather than the $L_1$ distance between these histograms. PMK may also allow for measuring of similarity between two unnormalized histograms and, as a result, partial matching between groups of vectors may be possible. However, similar to random forests, there does not appear to be any consideration of the specific data distribution while building the space partitioning rules and, specifically, rules that are based on high variance and low bias classifiers. Using a vocabulary guided image pyramid may generate more accurate similarity estimates than comparing sets of vectors. These approaches may only provide robust matching results, when most of the descriptors in a set are closer to the centers of the dense regions.

When the similarity between individual samples may be needed, these approaches generate errors as illustrated in FIG. 11A. Additional errors may occur when the descriptors are close to the borders of dense regions, meaning close to sparse regions, although the samples in the sparse regions may be distinctive and it is potentially more important to correctly match them than the ones in dense regions. The bagging kernels defined in accordance with the techniques of this disclousre that are based on multiple decision trees, where these trees may be learned from the data distribution, may provide less false positives and be less sensitive to the distinctiveness of the samples in the sparse regions.

The techniques of this dislcousre may then be considered to provide a data dependent solution that may generate bias to the dense regions of the data distribution. This may cause the similarity between the samples in the dense regions to be measured more accurately than the ones in sparse regions. Many of the various approaches proposed to address this bias are generally computationally expensive to do for each query. The techniques may provide for a normalized bagging kernel to address the unequal bias of the decision trees that favors dense to sparse regions. The normalized bagging kernel may adjust the similarity score according to a bagging kernel that uses coarser histogram bins to provide an estimate of the bias in the neighborhood of the samples.

Histogram based representations of samples may be commonly obtained with decision trees. Trees may have high variance error and this may result in inaccurate kernel values that calculate the similarity between the histograms of a deformed sample and the histograms of non-deformed training samples. This may be observed even when trees are shallow and node classifiers have low variance error, such as k-means classifiers. The technqieus provide for bagging kernels that may address this problem.

To potentially reduce the large variance error of the decision trees that classify the samples to histogram bins, the techniques may learn B trees from bootstrap samples of the training set X. The $b^{th}$ bootstrap samples $X^{*b}$ may be obtained by randomly sampling P % of the training set with replacement. Decision trees with k-means classifier at each node are learned using each set of the bootstrap samples. The classifiers are learned with k-means clustering algorithm that estimates k mean locations to minimize the total within cluster scatter variances, $$\underset{\mu_j}{\operatorname{argmin}} \sum_{\forall j} \sum_{\forall i \in c_j} \|x_i^b - \mu_j\|^2,$$

where $c_j$ are the set of indices for the samples in cluster j and $x^{*b}_i$ is a sample of the $b^{th}$ set of bootstrap samples $X^{*b}$ of the training set. B trees may be trained using this approach. Let $T(x, \Theta_b)$ represent the tree with $\Theta_b$ parameters and trained on the $b^{th}$ bootstrap samples. A sample in the dataset $x_i$ may be classified using these trees $T(x,\Theta_b)$ resulting in following multi-resolution histograms of $\Phi^b(x_i)$, where $$\Phi^b(x_i) = (H_0^b(x_i), \ldots, H_L^b(x_i)).$$

In the above equation, $H_l^b(y) = (h_1^b, h_2^b, \ldots, h_k^b)$ represents the histogram values at level l. When representing a single sample in each of these histograms, only a single bin of the histograms may be nonzero. In practice, the index of the leaf node may be stored for each of the descriptor, instead of the sparse histogram.

The training algorithm may be summarized in the below example Algorithm 1, where such training may depend on several user-defined parameters. (L×k) may represent the depth level L and the number of classes k of a k-means decision tree, B may represent the number of bootstrap sample sets, and P % may define the percentage of samples that are used in each bootstrap sample set with respect to the number of samples in the total set. The training algorithm may return multi-resolution histogram based representations of each sample and the decision trees that may be used to obtain this representation. In general, the k-means decision tree may be replaced with any other classification algorithm.

---

Algorithm 1: Training multiple trees on bootstrap samples

Given the tree size (L × k), number of bootstrap sets B, and percentage of the bootstrap samples P %,
for b = 1 to B do:
1) Randomly sample P % of the training samples X = $(x_1, \ldots, x_N)$ to obtain $X^{*b}$;

2) Use $\underset{\mu_j}{\operatorname{argmin}} \sum_{\forall j} \sum_{\forall i \in c_j} \|x_i^b - \mu_j\|^2$ to learn the parameters $\Theta_b$ of a
hierarchical k-means tree $T(x, \Theta_b)$ using the bootstrap samples of $X^{*b}$; and
3) Generate and store multi-resolution histograms
$\Phi^b(x_i) = (H_0^b(x_i), \ldots, H_L^b(x_i))$ for each sample $x_i$ in the training set.
end for
Return multi-resolution histograms for all the training samples $\Phi^b(x_i)$, and multiple trees learned on bootstrap samples $T(x, \Theta_b)$.

---

The similarity between the histogram based representations of samples may be obtained with a kernel, bagging kernel $K_B$. That is, the techniques may provide for a bagging kernel that may measure the similarity between multiple histograms of samples by aggregating the kernel values of histogram representations obtained by the trees learned from bootstrapped samples. The bagging kernel between the histogram representations of $\Phi^b(x_i)$ and $\Phi^b(x_j)$ may be given by, $$K_B(x_i, x_j) = K_B^L(x_i, x_j) = \frac{1}{B} \sum_{b=1}^{B} K_\Delta^L(\Phi^b(x_i), \Phi^b(x_j)),$$

where the superscript L is dropped to define $K_{\tilde{B}}(x_i, x_j)$ that may use the full size trees, and $K_A^L(\Phi^b(x_i), \Phi^b(x_j))$ may represent a positive semi-definit kernel that measures similarity between histograms. Among popular kernels of this type, such as $\chi^2$ and intersection kernels, the techniques may provide better than the pyramid match kernel. The kernel defined in accordance with the techniques described in this disclosure may measure the weighted histogram intersection between multi-resolution histograms obtained from a decision tree. Formally, the pyramid match kernel may be defined between the multi-resolution histogram representation obtained from a single tree, $$K_\Delta^L(\Phi^b(x_i), \Phi^b(x_j)) = \sum_{l=1}^{L} k^l \{I(H_l^b(x_i)),$$

$$H_l^b(x_j))) - I(H_{l-1}^b(x_i)), (H_{l-1}^b(x_j)))\},$$

where the intersection function $I(H_l^b(x_i), H_l^b(x_j)) = \Sigma_{m=1}^{k^l} \min(h_m^b(x_i), h_m^b(x_j))$ may measure the minimum number of two histogram bin values of descriptors at tree level l, and the difference between the intersection values at consecutive tree levels may be used in order to measure the amount of overlap at each level. In some examples, the tree level 0 is the root node and level L are the leaf nodes. Nonzero histogram intersections obtained at the lower levels may be weighted with a large coefficient by $k^l$. This weighted may be performed because, the smaller the bins, the less probable that the samples have overlapping nonzero bins. This kernel may be a valid positive semi-definit kernel, because this kernel may be based on positive semi-definit histogram intersection kernel.

The positive semi-definitness of individual kernels $K_A^L$ may be a sufficient condition for the positive semi-definitness of the bagging kernel $K_B$. In some examples, when high variance classifiers are used to obtain the histograms, the bagging kernel may always perform better than those kernels that use a single decision tree. The baggin kernel may preform better because the bagging kernel may reduce the variance of error in the individual histogram intersections. The bias error may still exist due to the use of k-means clustering algorithm, which is biased towards the dense regions in the data distribution.

The performance of using a single tree is illustrated in FIG. 11A, where $K_A$ measure the similarity between multi-resolution histograms obtained from a single k-means tree that is trained on the entire training set. As seen in FIG. 11A, $K_A$ may generate several false positives. While the bagging kernel shown in FIG. 11B, returns a compact neighborhood for the vectors that may be similar to the query.

As note above, data dependent decision trees may generate bias to the dense regions of the descriptor distribution. The node classifiers of the tree may be trained by the k-means clustering algorithm, which may find a partition by minimizing the within cluster scattering variances in the neighborhoods of the sample means, $$\underset{\mu_j}{\mathrm{argmin}} \sum_{\forall j} \sum_{\forall i \in c_j} \|x_i^b - \mu_j\|^2.$$

Since a k-means clustering algorithm may be based on minimizing squared distances, this algorithm may be sensitive to the outliers and potentially biased for the selection of dense regions. This bias error may be reflected to the values of $K_B$. The intersection kernel values between histograms of samples that are in the dense regions may be large due to bias of the k-means trees to the dense regions, i.e., in some examples, frequent selection of the same dense regions. This may allow for finding accurate near neighbors of the query vectors in these regions. However, the query vectors that fall into sparse regions may only use few decision trees to measure the similarity to the training samples. This may result to incorrect kernel values between the samples in the sparse regions, although it may be crucial to match them accurately because the samples in the sparse regions may be more distinctive than the ones in the dense regions. The techniques may address this problem by normalizing the bagging kernel with another bagging kernel that is obtained using coarser histograms, $$K_C(x_i, x_j) = \frac{K_B^L(x_i, x_j)}{K_B^{L-1}(x_i, x_j)},$$

where $K_B^l$ may represent the bagging kernel that use the trees up to level l, and $K_C$ values may be normalized to the interval [1, k]. Shorter trees with small l may provide an estimate of the bias to the dense regions, e.g. $K_B^{L-1}$. As a result, the kernel values that have large bias for the dense regions are normalized. On the other hand, when a query descriptor occurs in a sparse region, k-means algorithm may show a large variance in the partitioning of this part of the space, which results in a small kernel value $K_B^{L-1}$ and thereby potentially amplifies the kernel values $K_B^L$. In other words, $K_B^{L-1}$ may provide an estimate of the sparse regions with low bias and adjusts the final kernel values accordingly. Another effect of normalizing the bagging kernel may be illustrated in FIG. 11C, where $K_C$ kernel may effectively suppress the similarity to the regions that are away from the query sample (white area).

Furthermore, when a data dependent solution for the decision trees (such as k-means trees) is used to obtain the histograms, it is often difficult to obtain a proof for the positive semi-definitness of the normalized bagging kernel. Through analysis of various types of kernels that are constructed in a similar way to our approach, it may be possible to show that the normalized bagging kernels are positive semi-definit in this case.

The similarity between two samples can be effeciently approximate, in some examples, by calculating the probability of collision of the samples to the same bins of random grids. Each grid may be defined to partition a 1-dimensional space with a fixed pitch value $\delta$ and shift u that is drawn uniformly from $[0,\delta]$, meaning in some examples that a bin defines an interval $[u+n\delta, u+(n+1)\delta]$. If h(x) and h(y) are assumed to represent the binary histograms for two samples x and y obtained with this grid, then $h(x)^T h(y) = 1$ when x and y may fall into the same bin. The probability of collision may be considered proportional to the distance between the samples $$Pr_u(h(x)^T h(y) = 1 \mid \delta) = \max\left(0, 1 - \frac{|x-y|}{\delta}\right), \text{ if } \delta > |x-y|,$$

which may result in time and space efficient algorithms for finding approximate near neighbors to a given query. This result occurs because the number of operations to evaluate intersections between a set of histograms may be much cheaper than calculating the distance between every pair in a set. In some examples, our bagging kernel uses data dependent multi-resolution histogram bins rather than the random grid bins with a single resolution grid size of $\delta$.

By including random pitch size, it can be shown that one can obtain shift-invariant kernels by integrating over randomized pitch sizes, $$k(|x-y|) = \int_0^\infty \max\left(0, 1 - \frac{|x-y|}{\delta}\right) p(\delta) d\delta.$$

For instance, when $\delta$ follows a Gamma distribution $p(\delta) = \delta \exp(-\delta)$, the kernel corresponds to the shift-invariant Laplacian kernel $k(\Delta) = \exp(-\Delta)$, where $\Delta = |x-y|$. In some examples, the integral in the above equation may have a similar role to the sum in our bagging kernel in $$K_B(x_i, x_j) = K_B^L(x_i, x_j) = \frac{1}{B} \sum_{b=1}^B K_\Delta^L(\Phi^b(x_i), \Phi^b(x_j)).$$

In some examples, $\delta$ may be sampled from an unknown data dependent distribution with the help of bootstrap sampling.

If the distribution of $\delta$ is scaled with a constant scale $1/c$, i.e., sample $\delta$ from a scaled Gamma distribution $p(\delta/c)$ in some examples, then the corresponding Laplacian kernel may also be scaled to $k(\Delta/c) = \exp(-\Delta/c)$. As a result, when the pitch from distributions of scales $c_1$ and $c_2$ is selected, the ratio of kernels that are obtained with this approach may be as follows:

$$\frac{k(\Delta/c_1)}{k(\Delta/c_2)} = \frac{\exp(-\Delta/c_1)}{\exp(-\Delta/c_2)} = \exp\left(-\Delta\left(\frac{1}{c_1} - \frac{1}{c_2}\right)\right),$$

which may be a positive semi-definit kernel as long as $c_1 < c_2$.

The distribution of pitch $\delta$ has a similar role to the level of the decision trees L in our bagging kernels. The depth of the trees may define the number of partitions and hence the size of the regions. The numerator in $$K_C(x_i, x_j) = \frac{K_B^L(x_i, x_j)}{K_B^{L-1}(x_i, x_j)}$$

may be obtained with longer trees that results in smaller bins (meaning, potentailly, a small $c_1$) and the denominator is obtained with shallow trees that results in larger bins (meaning, potentailly, a large $c_2$). If using these grids with random pitches to build the decision trees, the normalized bagging kernels may represent a positive semi-definit kernel.

In this respect, the techniques may enable application of a combination of a plurality of normalized bagging kernels to the multi-resolution to the multi-resolution histogram representation of the multi-resolution query feature descriptor and the multi-resolution target histogram representations to determine one or more normalized similarities between the multi-resolution histogram representation of the multi-resolution query feature descriptor and the multi-resolution target histogram representations.

In some examples, when applying the combination of the plurality of normalized bagging kernels, the device may apply the combination of the plurality of normalized bagging kernels to provide an estimation of a variable based on data that has similar characteristics to visual data. To illustrate, the combination of kernel values may be used in an object detection algorithm, e.g., to estimate the existence and location of an object in an image or video. The combination of kernel values may also be used in segmentation algorithms to segment foreground objects from background objects, as yet another example.

The normalized bagging kernel formed in accordance with the techniques described in this disclosure may improve the performance of most any kernel used to measure the similarity between samples with a data dependent approach. When the bagging kernels depend on the distribution of the data, the space partitions may be biased towards the dense regions. To reduce this effect, the bagging kernels may be normalized with kernels that may have lower variance and higher bias.

In addition, the purpose of using trees to partition the space may be both for advantages of obtaining multiple resolution classifiers and logarithmic time classification of a query sample. However, the space occupied by the vocabulary trees may be large especially when bootstrapping is used.

A single (L×k) tree with depth L and k children at each node holds $(1-k^{L+1})/(1-k)$ nodes, meaning, in some examples, in the order of $O(k^L)$. Each node of a k-means tree in a d-dimensional space may store k d-dimensional vectors. This may result in a storage of $O(k^{L+1}d)$ bytes, assuming that each dimension is stored with byte accuracy. This storage cost may be reduced by learning k-means clustering in k-dimensional subspaces. The subspaces may be obtained by selecting the dimensions that carry the largest variance among the training vectors that fall into the current node. The storage cost may then be reduced to $O(k^{L+1}(k+\log(k)/8))$ where k bytes may store the mean locations in the subspace, and $\log(k)/8$ bytes may store the index of the sparse dimensions that are used in the current node. This sparse tree may not significantly effect the final performance of the system.

In operation, the techniques may enable a device comprising one or more processors to apply a normalized bagging kernel to a query sample so as to determine a normalized similarity between the query sample and a target sample, and based on the measured similarity, determine whether the query sample represents a version of an object to which the target sample corresponds.

In some examples, the one or more processors are further configured to generate a multi-resolution histogram representation of the query sample. In these and other examples, the one or more processors are further configured to, when applying the normalized bagging kernel, apply the normalized bagging kernel to the multi-resolution histogram so as to measure the normalized similarity between the query sample and the target sample.

In some examples, the one or more processors are further configured to generate a first query multi-resolution histogram representation of the query sample using a first classifier, and generate a second query multi-resolution histogram representation of the query sample using a second classifier. In these and other examples, the target sample is represented by a first target multi-resolution histogram generated using the first classifier and by a second target multi-resolution histogram generated using the second classifier. Moreover, in these and other examples, the one or more processors are further configured to, when applying the normalized bagging kernel, apply the normalized bagging kernel to the first and second query multi-resolution histograms so as to measure first and second intermediate similarities between the first and second query multi-resolution histograms and the first and second target multi-resolution histograms, respectively, determine the normalized similarity based on the first and second intermediate similarities.

In some examples, the one or more processors are further configured to generate a multi-resolution histogram representation of the query sample. In these and other examples, the one or more processors are further configured to, when applying the normalized bagging kernel, apply a bagging kernel to the multi-resolution histogram so as to measure a first intermediate similarity between the query sample and the target sample for L levels of the multi-resolution histogram, apply a bagging kernel to the multi-resolution histogram so as to measure a second intermediate similarity between the query sample and the target sample for L minus one levels of the multi-resolution histogram, and determine the normalized similarity based on the first intermediate similarity and the second intermediate similarity.

In some examples, the one or more processors are further configured to generate a query multi-resolution histogram representation of the query sample. In these and other examples, the target sample comprises a target multi-resolution histogram. Moreover, in these and other examples, the one or more processors are further configured to, when applying the normalized bagging kernel, apply a bagging kernel to the query multi-resolution histogram so as to measure a first intermediate similarity between the query multi-resolution histogram and the target multi-resolution histogram for L levels of the query and target multi-resolution histograms, apply a bagging kernel to the query multi-resolution histogram so as to measure a first intermediate similarity between the query multi-resolution histogram and the target multi-resolution histogram for L minus one levels of the query and target multi-resolution histograms, and determine the normalized similarity based on the first intermediate similarity and the second intermediate similarity.

In some examples, the one or more processors are further configured to generate a query multi-resolution histogram representation of the query sample. In these and other examples, the target sample comprises a target multi-resolution histogram. Furthermore, in these and other examples, the one or more processors are further configured to, when applying the normalized bagging kernel, apply a bagging kernel to the query multi-resolution histogram so as to measure a first intermediate similarity between the query multi-resolution histogram and the target multi-resolution histogram for L levels of the query and target multi-resolution histograms, apply a bagging kernel to the query multi-resolution histogram so as to measure a first intermediate similarity between the query multi-resolution histogram and the target multi-resolution histogram for L minus one levels of the query and target multi-resolution histograms, and divide the first intermediate similarity by the second intermediate similarity to determine the normalized similarity.

In some examples, the one or more processors are further configured to determine identification data associated with the target sample based on the normalized similarity, transmit the identification data to a client device that sent the query sample.

In some examples, the query sample comprises a feature descriptor extracted from query image data.

In some examples, the query sample comprises a plurality of feature descriptors extracted from query image data.

Figure 12:
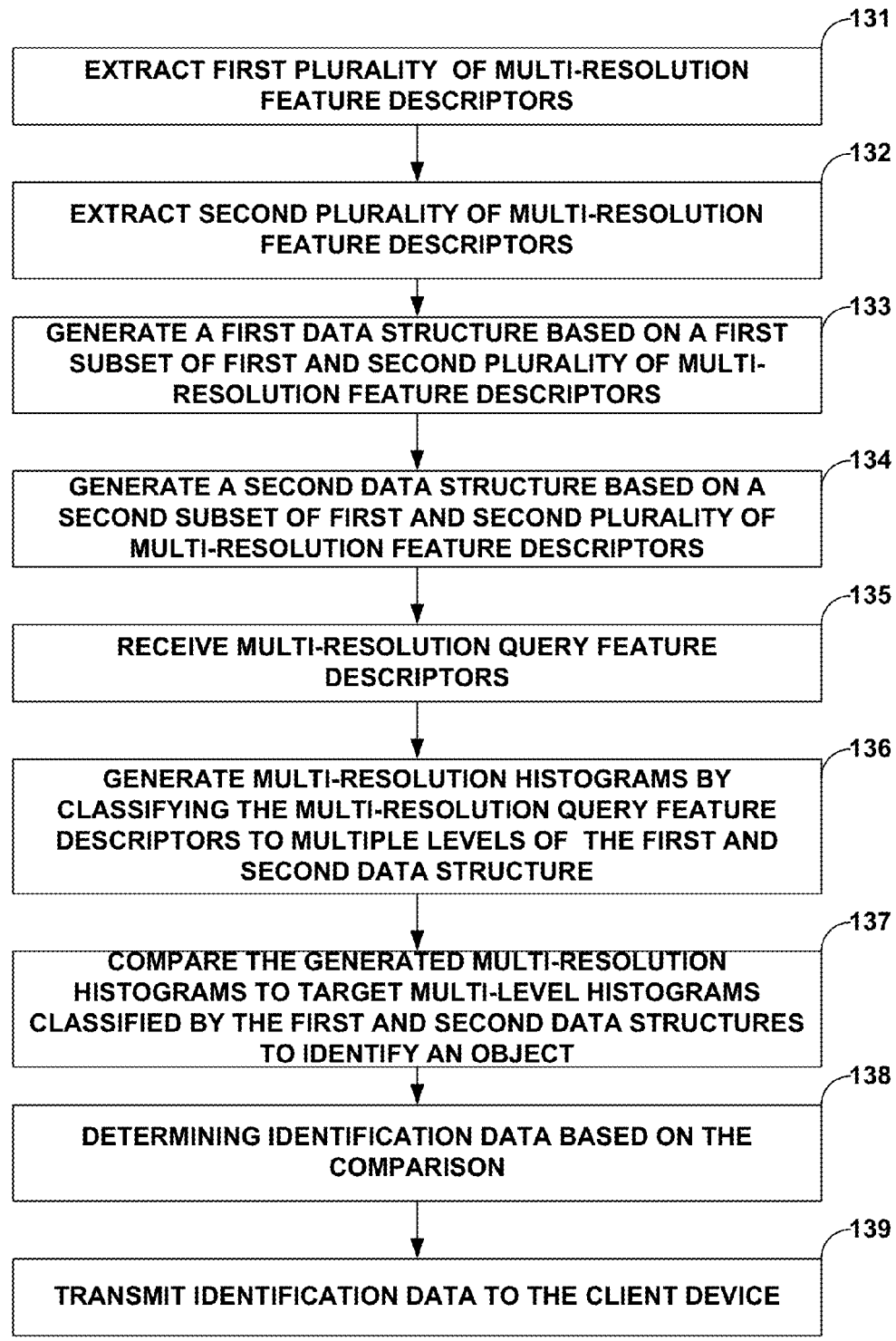
FIG. 12 is a flowchart illustrating exemplary operation of a visual search server in performing various aspects of the techniques described in this disclosure.

FIG. 12 is a flowchart illustrating exemplary operation of a visual search server in performing various aspects of the techniques described in this disclosure. While described below with respect to the visual search server 122 shown in the example of FIG. 9A, the techniques may be performed by any computing device, including the client device 12 shown in the example of FIG. 9A or any other type of computing device capable of determining multi-resolution feature descriptors and/or multi-resolution hierarchically arranged data structures.

Initially, the visual search server 122 may extract a first plurality of multi-resolution feature descriptors from a plurality of patches from one or more training images (131). Moreover, the visual search server 122 may perform the techniques to extract a second plurality of multi-resolution feature descriptors from the plurality of patches (132). The visual search server 122 may then, as described in more detail above, generate multiple data structures, such as the above noted multi-resolution hierarchical tree data structures 53, to be used when classifying objects included within query images. That is, the visual search server 122 may generate a first one of data structures 53 based on a first subset of the first and second plurality of multi-resolution feature descriptors (133). The visual search server 122 may also generate a second one of data structures 53 based on a second subset of the first and second plurality of multi-resolution feature descriptors (134).

The visual search server 122 storing the multi-resolution hierarchical tree data structures 53 constructed in accordance with the techniques described in this disclosure may then be used to classify objects in images. To use this multi-resolution hierarchical trees 53, the visual search server 122 may receive multi-resolution query feature descriptors (which may refer to a plurality of feature descriptors extracted from the same patch of a query image with each of the plurality of feature descriptors being extracted from the patch when processed at different scale space resolutions) (135). Alternatively, the visual search server 14 may receive an image and extract the multi-resolution query feature descriptors, as shown in the example of FIG. 1B.

Regardless of which device extracts the multi-resolution feature descriptors, the computing device (which is assumed for purposes of illustration to be the visual search server 14) then generates a multi-resolution histogram by classifying the multi-resolution feature descriptors 28 to multiple levels of each of the multi-resolution hierarchical trees 53 in the manner described above (136).

The visual search server 14 may then compare the multi-resolution histograms of descriptors between multi-resolution query feature descriptors 28 and multi-resolution target feature descriptors 28 classified using the multiple trees 53 to identify an object that corresponds to the query (137). When identifying the object, the visual search server 122 may generate or otherwise determine identification data 42 based on this comparison (138), which the visual search server 14 then sends to the client device 12 in response to the query feature descriptors 28 (139).

Figure 13A:
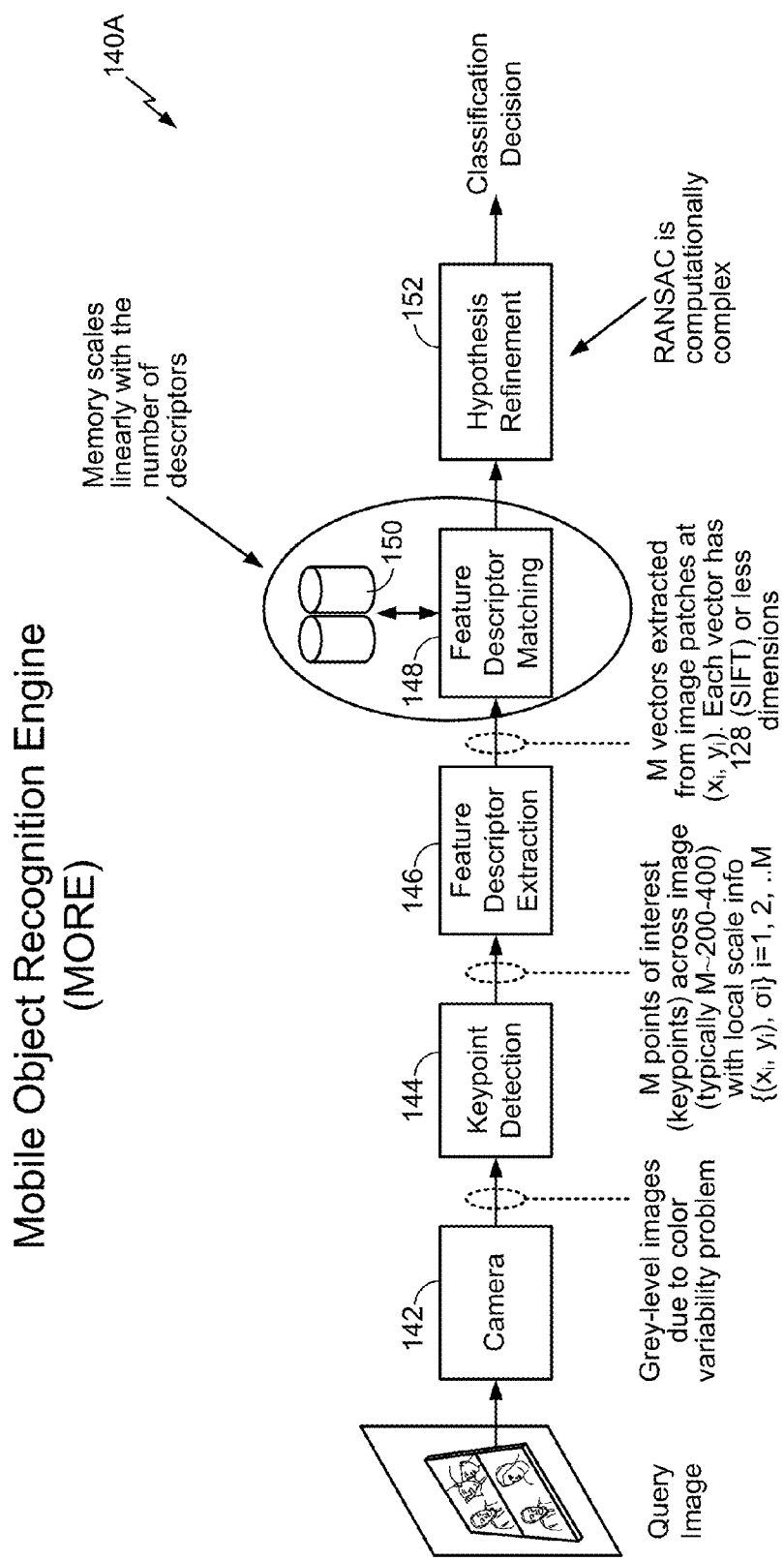
FIGS. 13A and 13B are diagrams illustrating a mobile object recognition engine (MORE) that may be modified to perform the techniques described in this disclosure.
Figure 13B:
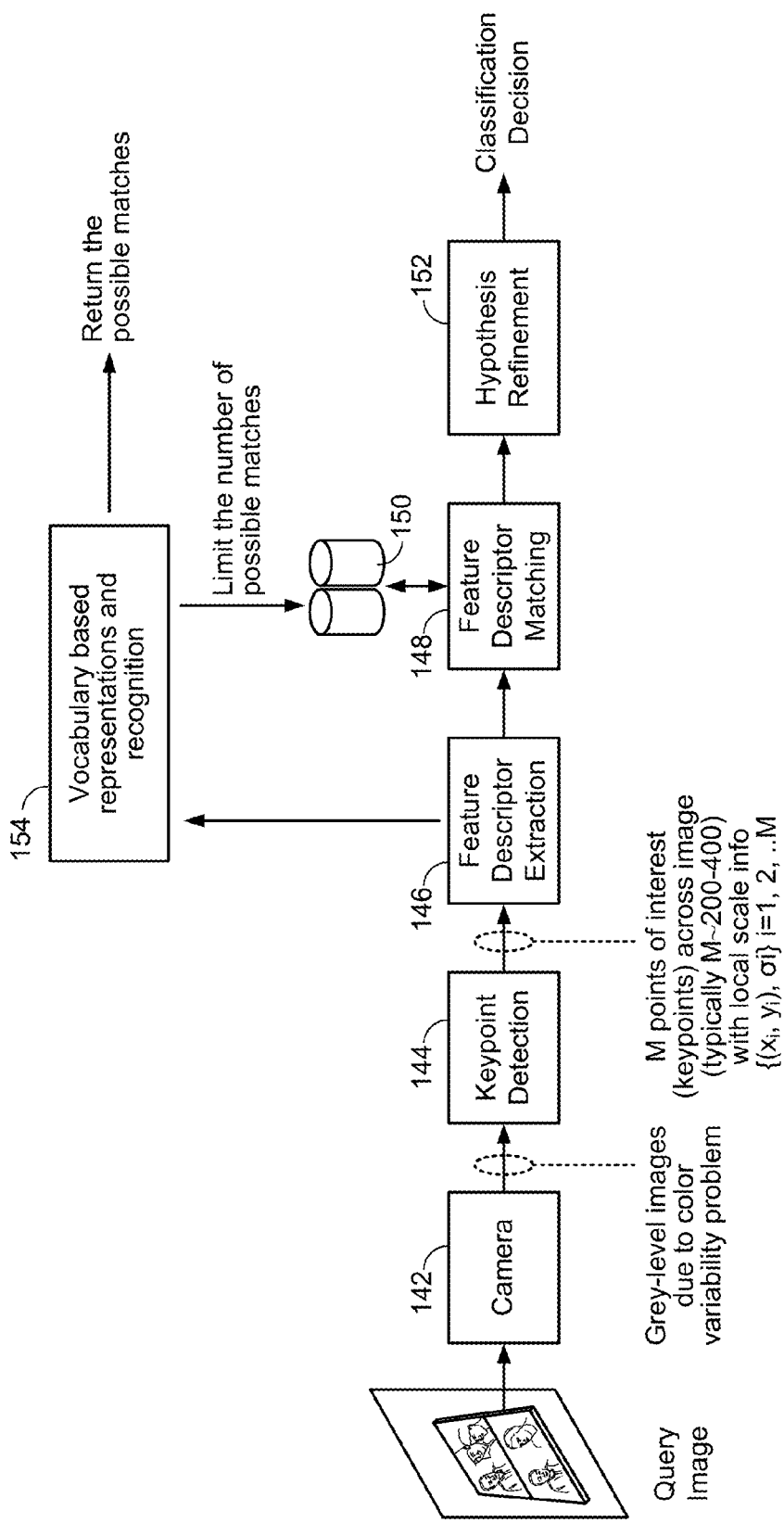

FIGS. 13A and 13B are diagrams illustrating a mobile object recognition engine (MORE) that may be modified to perform the techniques described in this disclosure. In the example of FIG. 13A, the MORE 140A represents a system of one or more devices that includes a camera module 142, a keypoint detection module 144, a feature descriptor extraction module 146, a feature descriptor matching module 148, a database 150 storing training feature descriptors and a hypothesis refinement module 152.

Generally, the MORE 140A may represent either or both of the client device 12 and the visual search server 14 shown in the examples of FIGS. 1, 2, 9 and 10. In any event, the camera module 142 may represent a module by which to capture image data, such as image data 26. The keypoint detection module 148 and the feature descriptor extraction module 146 may perform similar operations to that described above with respect to feature extraction unit 18. The feature descriptor matching module 148 and the hypothesis refinement module 152 may perform operations similar to that described above with respect to feature matching unit 36.

In the example of FIG. 13B, the MORE 140A has been modified to include a vocabulary-based representation and recognition module 154. This modified MORE 140A is denoted as MORE 140B. This module 154 may perform one or more aspects of the techniques described in more detail above.

Figure 14:
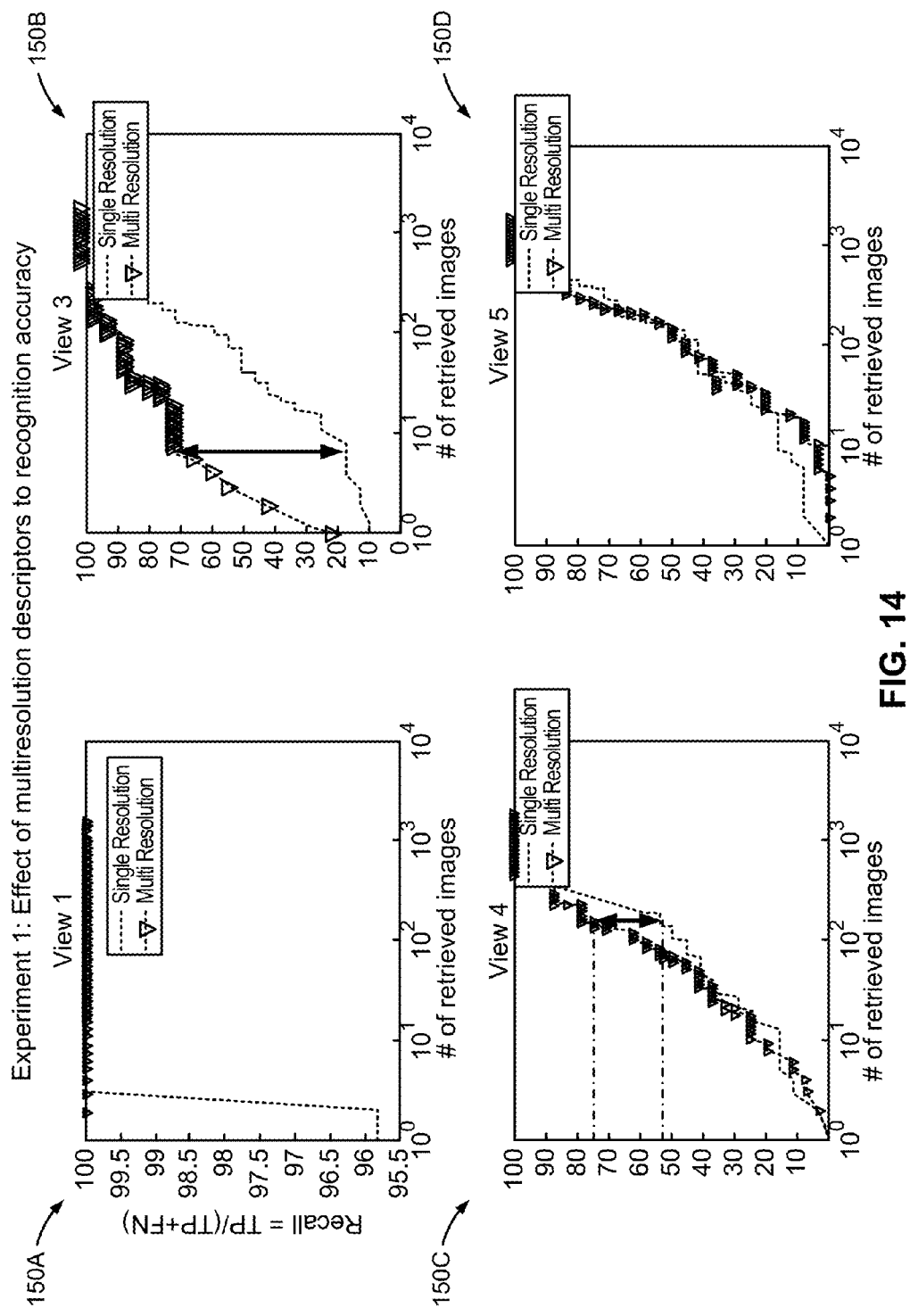
FIG. 14 is a diagram illustrating the effect of multi-resolution descriptors on recognition accuracy.

FIG. 14 is a diagram illustrating the effect of multi-resolution descriptors on recognition accuracy. As shown in the example of FIG. 14, graphs 150A-150D illustrate recall rates obtained using multi-resolution descriptors versus using single resolution descriptors, plotted for each deformed image set from viewpoints of 1 (generally no perspective deformation), 3 (having approximately 38 degrees of perspective deformation), 4 (having approximately 45 degrees of perspective deformation) and 5 (having approximately 61 degrees of perspective deformation, where these viewpoints also have varying distances from the scene. Recall rates is given in graphs 150A-150D by the ration of a number of true positive images to the total number of matches. The y-axis shows the number of matched images.

Figure 15A:
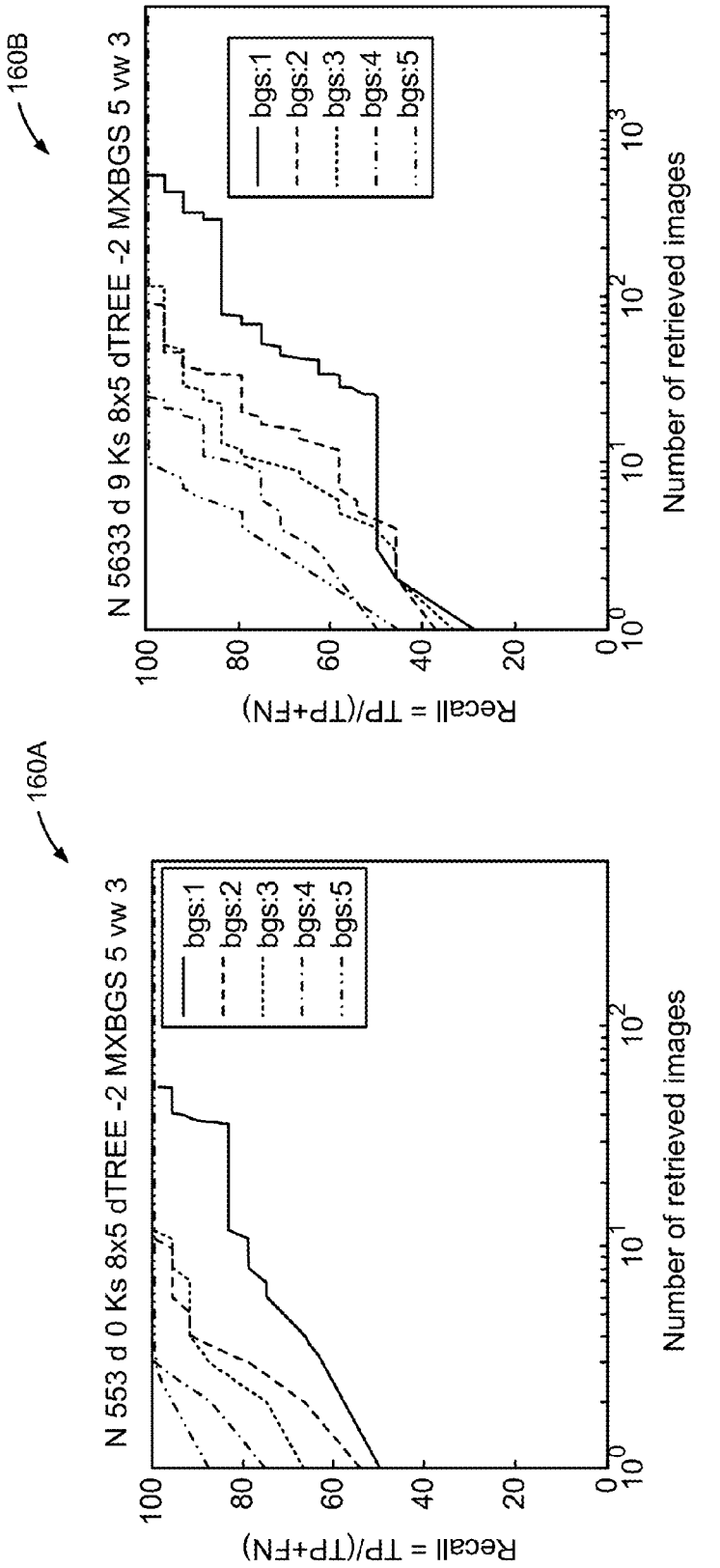
FIGS. 15A and 15B are diagrams illustrating the effect of bagging on recognition accuracy.
Figure 15B:
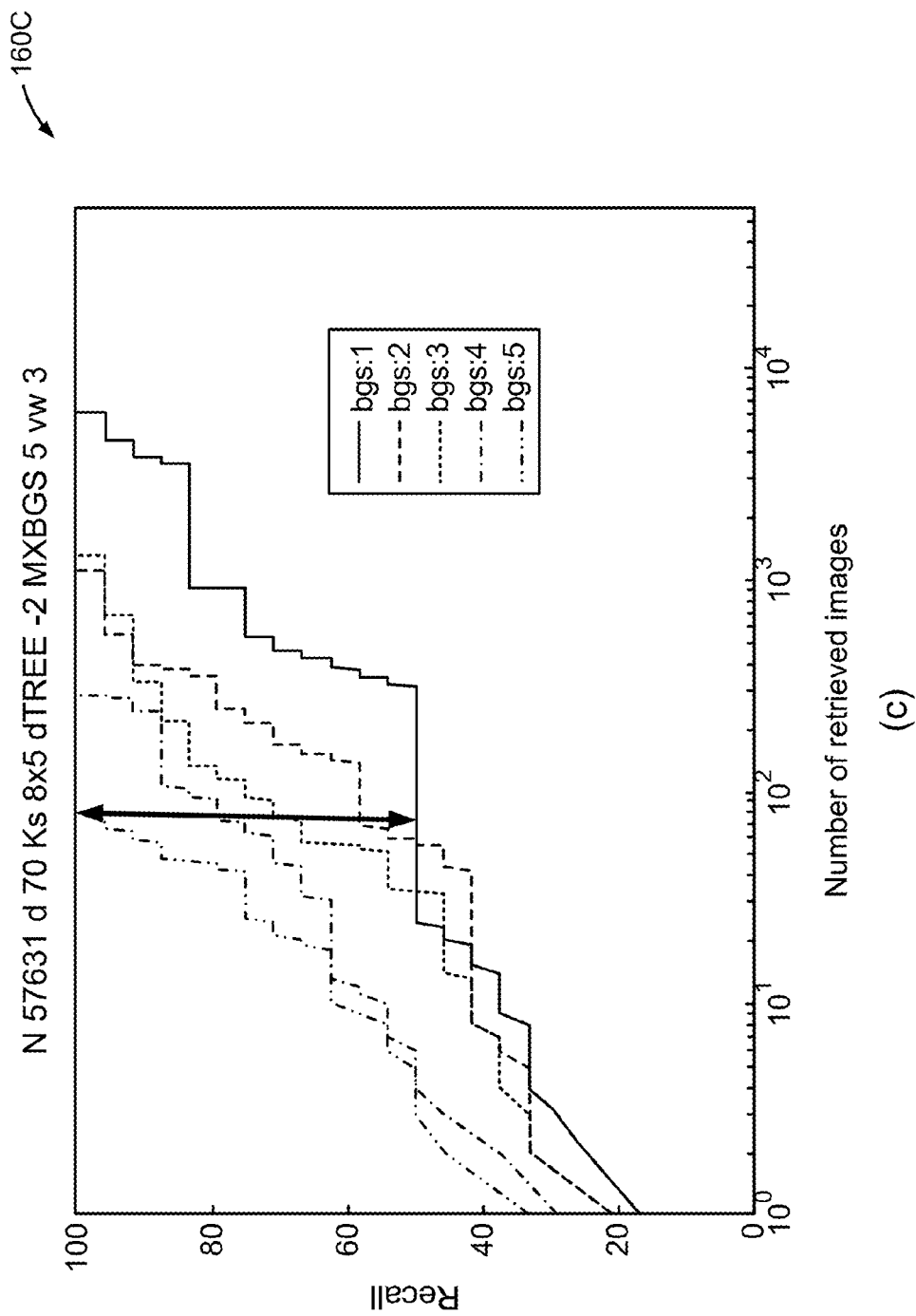

FIGS. 15A and 15B are diagrams illustrating the effect of bagging on recognition accuracy. As shown in the example of FIGS. 15A and 15B, graphs 160A-160C illustrate recall rates versus the number of retrieved images for the database sizes of (a) 553, (b) 5633 and (c) 57631. As shown in graphs 160A-160C, increasing a number of baggins (bgs) may improve the recall rate (often significantly). In each instance, the graphs 160A-160C are generated under the constraint that the vocabulary trees may have 8 child nodes per each parent node and only 5 levels, which are learned in a training stage. The redline 162 included in graph 160C indicates the difference between using a single bag and using five bags, where recall rates may be significantly improved while the number of images retrieved may be significantly reduced.

Figure 16:
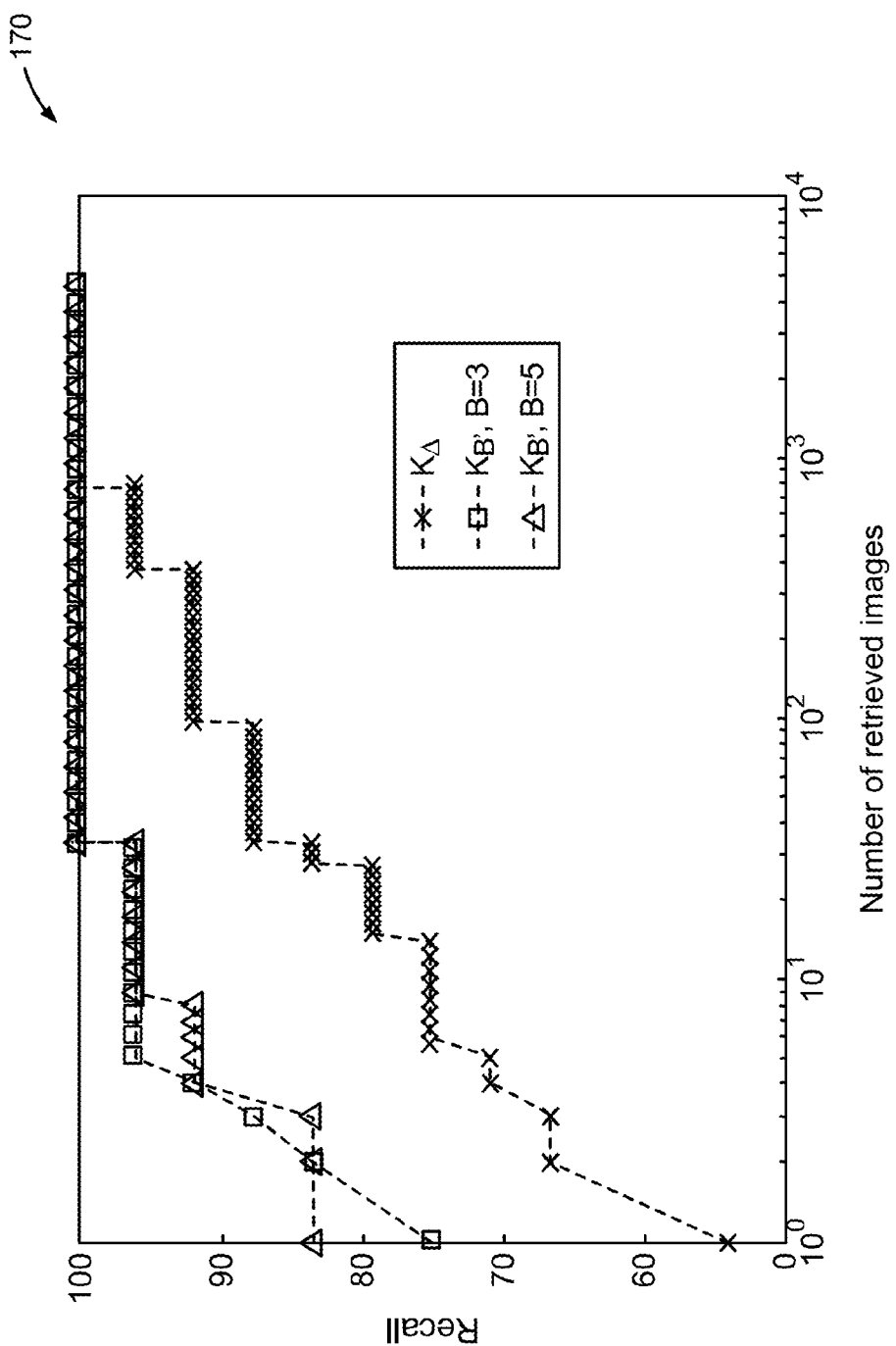
FIG. 16 is a diagram illustrating a graph that shows the image recall rates versus the number of retrieved images when using bagging kernels in accordance with the techniques described in this disclosure.

FIG. 16 is a diagram illustrating a graph 170 that shows the image recall rates versus the number of retrieved images when using bagging kernels in accordance with the techniques described in this disclosure. The collection of descriptors from each image may be represented with histograms and the similarity between the histograms may be obtained by the bagging kernel $K_B$ and $K_A$. The recall rate for 24 perspectively deformed query images is shown in graph 170 to be better with the bagging kernel given the higher recall rates for $K_B$, where B equals 3, and $K_B$, where B equals 5, are better than the $K_A$.

Figure 17A:
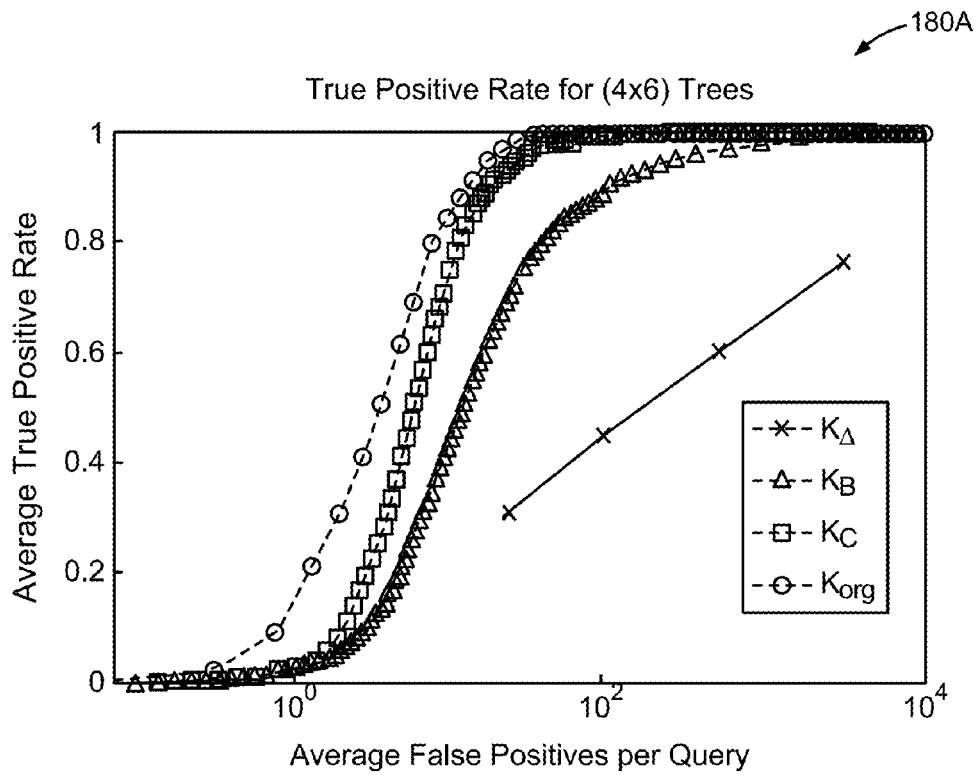
FIGS. 17A and 17B are diagrams illustrating graphs that show the performance of detecting true positive query-training descriptor matches using the kernels of $K_A$, $K_B$, $K_C$ and $K_{org}$.
Figure 17B:
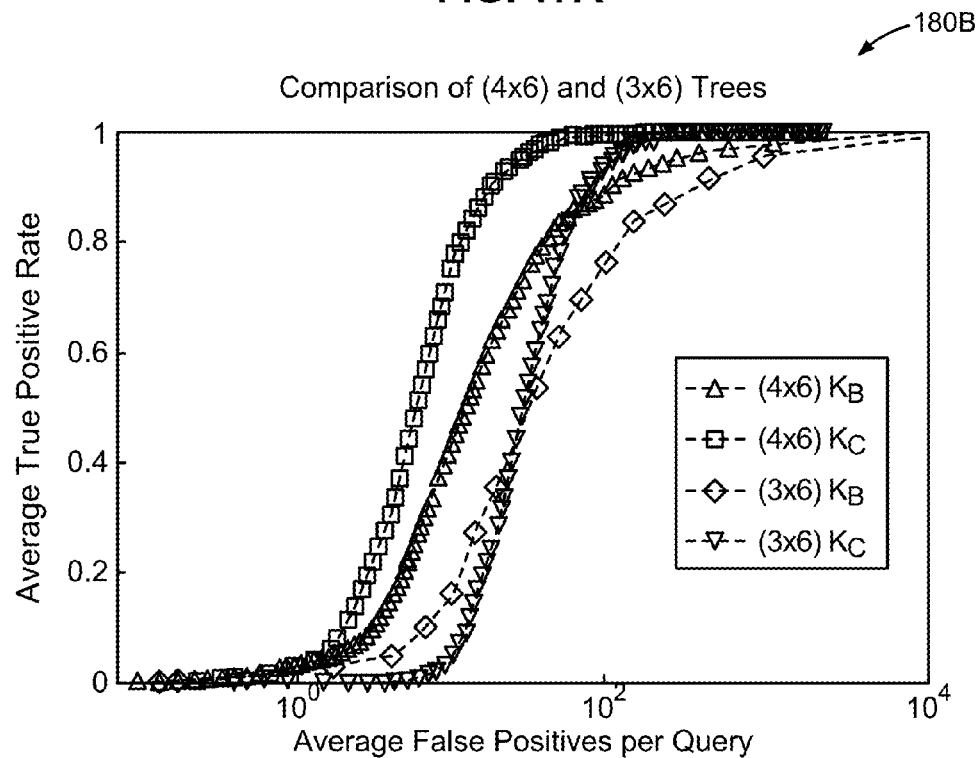

FIGS. 17A and 17B are diagrams illustrating graphs 180A and 180B that shows the performance of detecting true positive query-training descriptor matches using the kernels of $K_A$, $K_B$, $K_C$ and $K_{org}$. $K_A$ may use a single (4×6) k-means tree trained on the entire training set. $K_B$ may is obtained, in this example, as defined in $$K_B(x_i, x_j) = K_B^L(x_i, x_j) = \frac{1}{B}\sum_{b=1}^{B} K_\Delta^L(\Phi^b(x_i), \Phi^b(x_j))$$

using 1,000 trees trained on % bootstrapped samples of the training set. $K_C$ is, in this example, the conditional kernel as defined in $$K_C(x_i, x_j) = \frac{K_B^L(x_i, x_j)}{K_B^{L-1}(x_i, x_j)}.$$

In this example, $K_{org}$ is the inner product kernel that use the original descriptors. Graph 180A compares the performance of all kernels and graph 180B shows the performance for (6×4) and (6×3) trees. As seen in the graphs 180A and 180B, $K_C$ performs closes to the $K_{org}$.

Figure 18:
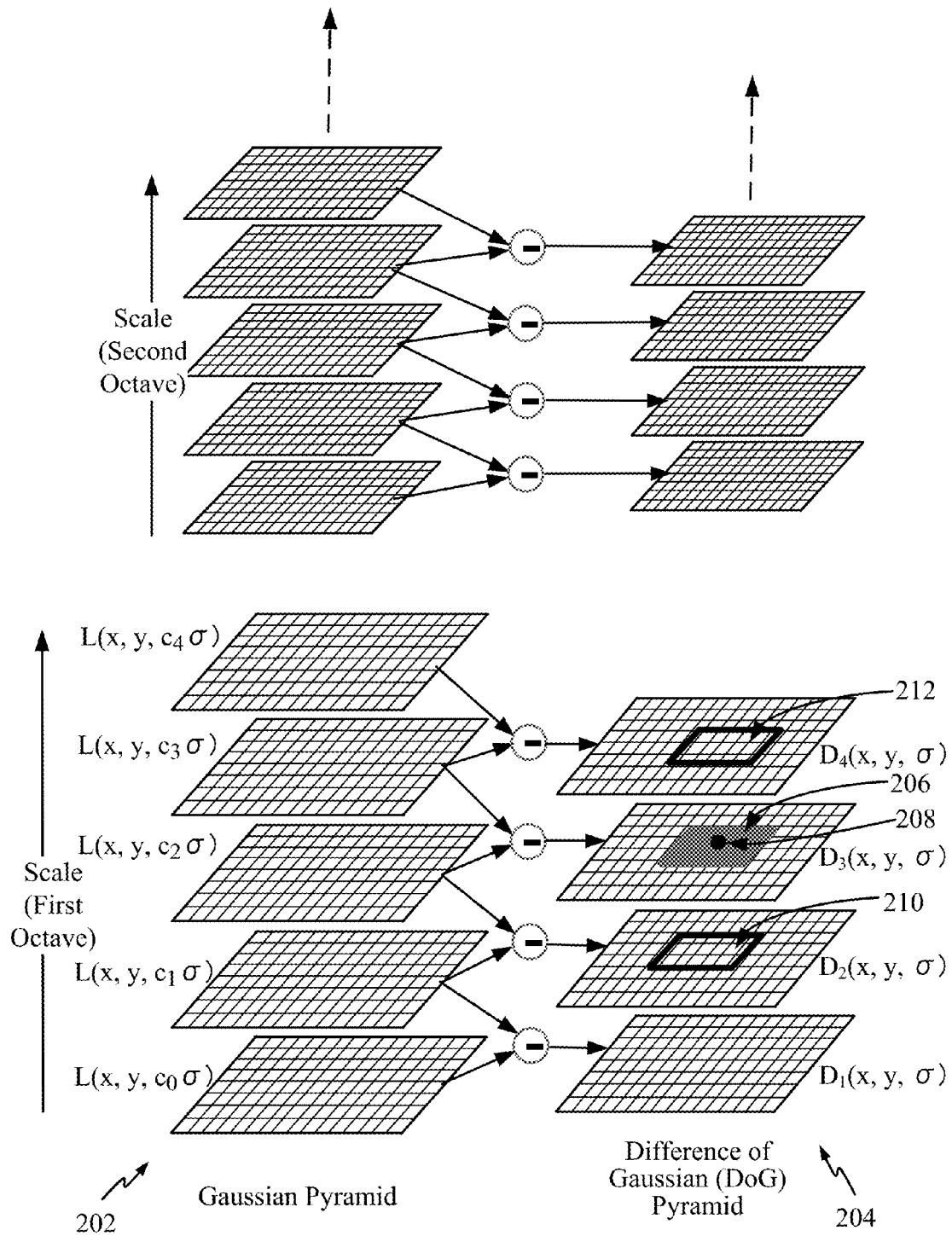
FIG. 18 is a diagram illustrating a difference of Gaussian (DoG) pyramid 204 that has been determined for use in keypoint detection for feature descriptor extraction.

FIG. 18 is a diagram illustrating a difference of Gaussian (DoG) pyramid 204 that has been determined for use in feature descriptor extraction. While described below as being performed by the feature extraction unit 18 of FIG. 1A, the feature matching unit 36 of FIG. 1A may perform the following feature extraction in a manner substantially similar to that described below with respect to the feature extraction unit 18. Accordingly, the techniques should not be limited in this respect.

The feature extraction unit 18 of FIG. 1A may construct the DoG pyramid 204 by computing the difference of any two consecutive Gaussian-blurred images in the Gaussian pyramid 202. The input image I(x,y), which is shown as the image data 26 in the example of FIG. 1A, is gradually Gaussian blurred to construct the Gaussian pyramid 202. Gaussian blurring generally involves convolving the original image I(x, y) with the Gaussian blur function G(x, y, cσ) at scale cσ such that the Gaussian blurred function L(x, y, cσ) is defined as L(x, y, cσ)=G(x, y, cσ)*I(x, y). Here, G is a Gaussian kernel, cσ denotes the standard deviation of the Gaussian function that is used for blurring the image I(x, y). As c, is varied ($c_0<c_1<c_2<c_3<c_4$), the standard deviation cσ varies and a gradual blurring is obtained. Sigma σ is the base scale variable (essentially the width of the Gaussian kernel). When the initial image I(x, y) is incrementally convolved with Gaussians G to produce the blurred images L, the blurred images L are separated by the constant factor c in the scale space.

In the DoG space or pyramid 204, D(x, y, a)=L(x, y, $c_n$σ)−L(x, y, $c_{n-1}$σ). A DoG image D(x, y, σ) is the difference between two adjacent Gaussian blurred images L at scales $c_n$σ and $c_{n-1}$σ. The scale of the D(x, y, σ) lies somewhere between $c_n$σ and $c_{n-1}$σ. As the number of Gaussian-blurred images L increase and the approximation provided for the Gaussian pyramid 202 approaches a continuous space, the two scales also approach into one scale. The convolved images L may be grouped by octave, where an octave corresponds to a doubling of the value of the standard deviation a. Moreover, the values of the multipliers k (e.g., $c_0<c_1<c_2<c_3<c_4$), are selected such that a fixed number of convolved images L are obtained per octave. Then, the DoG images D may be obtained from adjacent Gaussian-blurred images L per octave. After each octave, the Gaussian image is down-sampled by a factor of two and then the process is repeated.

The feature extraction unit 18 may then use the DoG pyramid 204 to identify keypoints for the image I(x, y). In performing keypoint detection, the feature extraction unit 18 may determine whether the local region or patch around a particular sample point or pixel in the image is a potentially interesting patch (geometrically speaking) Generally, the feature extraction unit 18 identifies local maxima and/or local minima in the DoG space 204 and uses the locations of these maxima and minima as keypoint locations in the DoG space 204. In the example illustrated in FIG. 18, the feature extraction unit 18 identifies a keypoint 208 within a patch 206. Finding the local maxima and minima (also known as local extrema detection) may be achieved by comparing each pixel (e.g., the pixel for the keypoint 208) in the DoG space 204 to its eight neighboring pixels at the same scale and to the nine neighboring pixels (in adjacent patches 210 and 212) in each of the neighboring scales on the two sides, for a total of 26 pixels (9×2+8=26). If the pixel value for the keypoint 206 is a maximum or a minimum among all 26 compared pixels in the patches 206, 210, and 208, the feature extraction unit 18 selects this as a keypoint. The feature extraction unit 18 may further process the keypoints such that their location is identified more accurately. The feature extraction unit 18 may, in some instances, discard some of the keypoints, such as the low contrast key points and edge key points.

Figure 19:
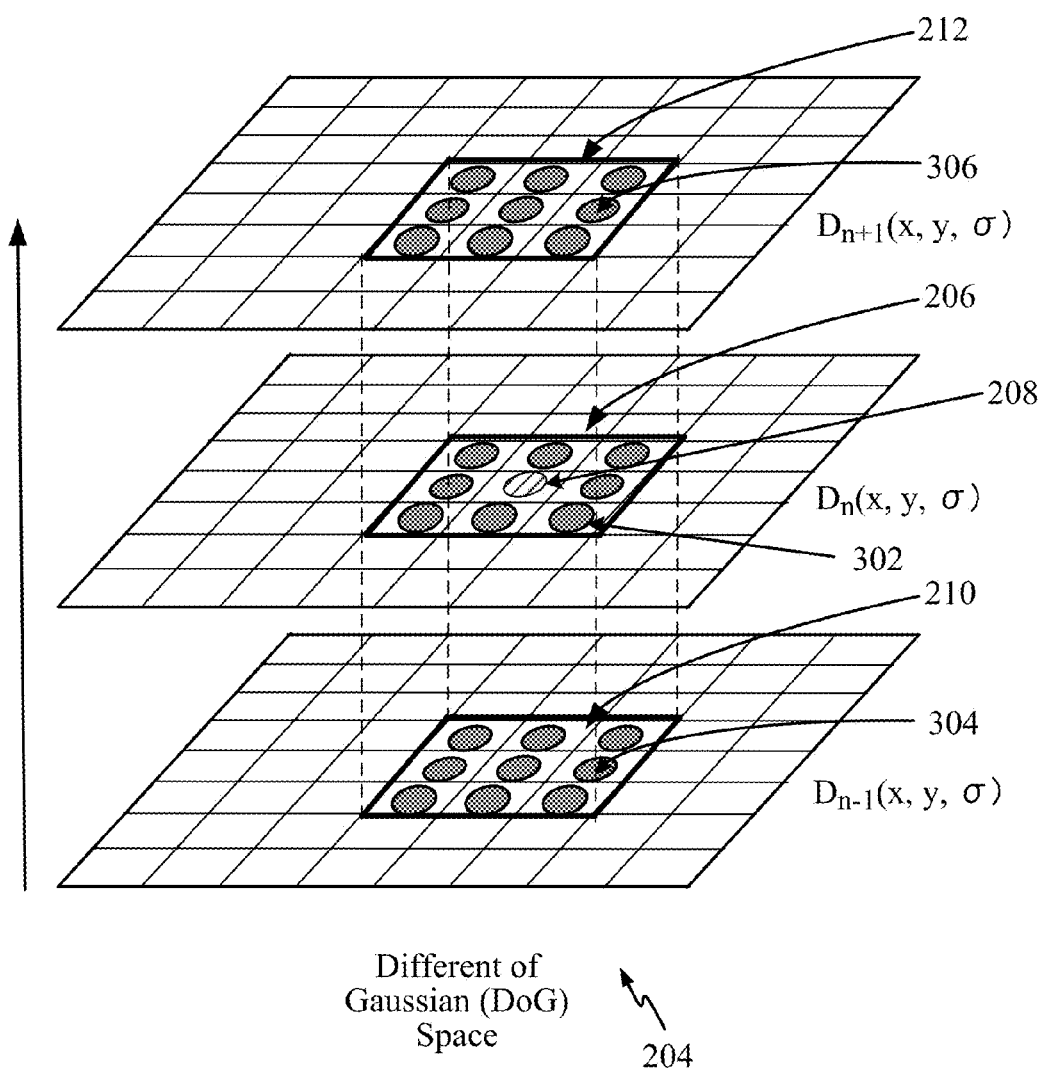
FIG. 19 is a diagram illustrating detection of a keypoint in more detail.

FIG. 19 is a diagram illustrating detection of a keypoint in more detail. While described below as being performed by the feature extraction unit 18 of FIG. 1A, the feature matching unit 36 of FIG. 1A may perform the following feature extraction in a manner substantially similar to that described below with respect to the feature extraction unit 18. Accordingly, the techniques should not be limited in this respect.

In the example of FIG. 19, each of the patches 206, 210, and 212 include a 3×3 pixel region. The feature extraction unit 18 first compares a pixel of interest (e.g., the keypoint 208) to its eight neighboring pixels 302 at the same scale (e.g., the patch 206) and to the nine neighboring pixels 304 and 306 in the adjacent patches 210 and 212 in each of the neighboring scales on the two sides of the keypoint 208.

The feature extraction unit 18 may assign each keypoint one or more orientations, or directions, based on the directions of the local image gradient. By assigning a consistent orientation to each keypoint based on local image properties, the feature extraction unit 18 may represent the keypoint descriptor relative to this orientation and therefore achieve invariance to image rotation. The feature extraction unit 18 then calculates magnitude and direction for every pixel in the neighboring region around the keypoint 208 in the Gaussian-blurred image L and/or at the keypoint scale. The magnitude of the gradient for the keypoint 208 located at (x, y) may be represented as m(x, y) and the orientation or direction of the gradient for the keypoint at (x, y) may be represented as F(x, y).

The feature extraction unit 18 then uses the scale of the keypoint to select the Gaussian smoothed image, L, with the closest scale to the scale of the keypoint 208, so that all computations are performed in a scale-invariant manner. For each image sample, L(x, y), at this scale, the feature extraction unit 18 computes the gradient magnitude, m(x, y), and orientation, F(x, y), using pixel differences. For example the magnitude m(x,y) may be computed in accordance with the following equation:

$$m(x, y) = \sqrt{(L(x+1, y) - L(x-1, y))^2 + (L(x, y+1) - L(x, y-1))^2}.$$

The feature extraction unit 18 may calculate the direction or orientation Γ(x, y) in accordance with the following equation:

$$\Gamma(x, y) = \arctan\left[\frac{(L(x, y+1)L(x, y-1)}{(L(x+1, y) - L(x-1, y)}\right].$$

In the above equation, L(x, y) represents a sample of the Gaussian-blurred image L(x, y, σ), at scale σ which is also the scale of the keypoint.

The feature extraction unit 18 may consistently calculate the gradients for the keypoint either for the plane in the Gaussian pyramid that lies above, at a higher scale, than the plane of the keypoint in the DoG space or in a plane of the Gaussian pyramid that lies below, at a lower scale, than the keypoint. Either way, for each keypoint, the feature extraction unit 18 calculates the gradients at the same scale in a rectangular area (e.g., patch) surrounding the keypoint. Moreover, the frequency of an image signal is reflected in the scale of the Gaussian-blurred image. Yet, SIFT and other algorithm, such as a compressed histogram of gradients (CHoG) algorithm, simply use gradient values at all pixels in the patch (e.g., rectangular area). A patch is defined around the keypoint; sub-blocks are defined within the block; samples are defined within the sub-blocks and this structure remains the same for all keypoints even when the scales of the keypoints are different. Therefore, while the frequency of an image signal changes with successive application of Gaussian smoothing filters in the same octave, the keypoints identified at different scales may be sampled with the same number of samples irrespective of the change in the frequency of the image signal, which is represented by the scale.

To characterize a keypoint orientation, the feature extraction unit 18 may generate a gradient orientation histogram by using, for example, Compressed Histogram of Gradients (CHoG). The contribution of each neighboring pixel may be weighted by the gradient magnitude and a Gaussian window. Peaks in the histogram correspond to dominant orientations. The feature extraction unit 18 may measure all the properties of the keypoint relative to the keypoint orientation, this provides invariance to rotation.

In one example, the feature extraction unit 18 computes the distribution of the Gaussian-weighted gradients for each block, where each block is two sub-blocks by two sub-blocks for a total of four sub-blocks. To compute the distribution of the Gaussian-weighted gradients, the feature extraction unit 18 forms an orientation histogram with several bins with each bin covering a part of the area around the keypoint. For example, the orientation histogram may have 36 bins, each bin covering 10 degrees of the 360 degree range of orientations. Alternatively, the histogram may have eight bins, each covering 45 degrees of the 360 degree range. It should be clear that the histogram coding techniques described herein may be applicable to histograms of any number of bins.

While described above with respect to SIFT and CHoG scale spaces, the techniques may be performed with respect to any type of feature descriptors extracted in the scale space, such as Daisy, gradient location and orientation histogram (GLOH) and speeded up robust features (SURF). Accordingly, the techniques should not be limited in this respect to SIFT or CHoG scale spaces.

Figure 20:
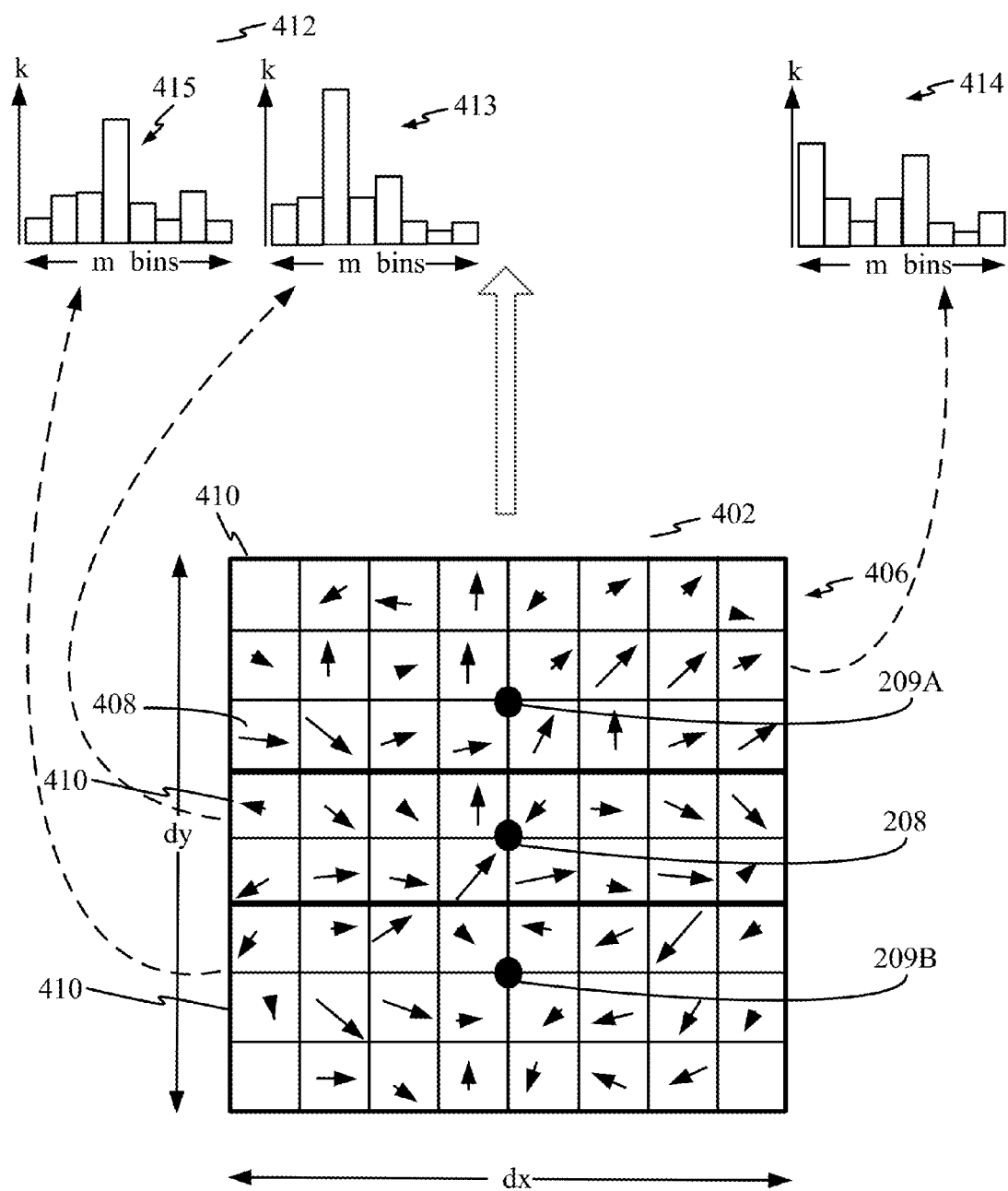
FIG. 20 is a diagram illustrating the process by which a feature extraction unit determines a gradient distribution and an orientation histogram.

FIG. 20 is a diagram illustrating the process by which a feature extraction unit, such as the feature extraction unit 18 of FIG. 1A, determines a gradient distribution and an orientation histogram. While described below as being performed by the feature extraction unit 18 of FIG. 1A, the feature matching unit 36 of FIG. 1A may perform the following feature extraction in a manner substantially similar to that described below with respect to the feature extraction unit 18. Accordingly, the techniques should not be limited in this respect.

Here, a two-dimensional gradient distribution (dx, dy) (e.g., a block 406) is converted to a one-dimensional distribution (e.g., histogram 414). The keypoint 208 is located at a center of the patch 406 (also called a cell or region) that surrounds the keypoint 208. The gradients that are pre-computed for each level of the pyramid are shown as small arrows at each sample location 408. As shown, regions of the samples 408 form sub-blocks 410, which may also be referred to as bins 410. The feature extraction unit 18 may employ a Gaussian weighting function to assign a weight to each of the samples 408 within the sub-blocks or the bins 410. The weight assigned to each of the samples 408 by the Gaussian weighting function falls off smoothly from centroids 209A, 209B and keypoint 208 (which is also a centroid) of the bins 410. The purpose of the Gaussian weighting function is to avoid sudden changes in the descriptor with small changes in position of the window and to give less emphasis to gradients that are far from the center of the descriptor. The feature extraction unit 18 determines an array of orientation histograms 412 with eight orientations in each bin of the histogram resulting in a dimensional feature descriptor. For example, the orientation histograms 413 may correspond to the gradient distribution for the sub-block 410.

In some instances, the feature extraction unit 18 may use other types of quantization bin constellations (e.g., with different Voronoi cell structures) to obtain gradient distributions. These other types of bin constellations may likewise employ a form of soft binning, where soft binning refers to overlapping bins, such as those defined when a so-called DAISY configuration is employed. In the example of FIG. 20, the three soft bins are defined, however, as many as nine or more may be used with centroids generally positioned in a circular configuration around the keypoint 208. That is, the bin centers or the centroids 208, 209A, 209B, As used herein, a histogram is a mapping ki that counts the number of observations, sample, or occurrences (e.g., gradients) that fall into various disjoint categories known as bins. The graph of a histogram is merely one way to represent a histogram. Thus, if k is the total number of observations, samples, or occurrences and m is the total number of bins, the frequencies in histogram ki satisfy the following condition expressed as equation:

$$n = \sum_{i=1}^{m} k_i,$$

where Σ is the summation operator.

The feature extraction unit 18 may weight each sample added to the histograms 412 by its gradient magnitude defined by the Gaussian-weighted function with a standard deviation that is 1.5 times the scale of the keypoint. Peaks in the resulting orientation histogram 414 correspond to dominant directions of local gradients. The feature extraction unit 18 then detects the highest peak in the histogram and then any other local peak that is within a certain percentage, such as 80%, of the highest peak (which it may also use to also create a keypoint with that orientation). Therefore, for locations with multiple peaks of similar magnitude, the feature extraction unit 18 extracts multiple keypoints created at the same location and scale but different orientations.

The feature extraction unit 18 then extracts the histogram of gradients. In this manner, the feature extraction unit 18 may extract a descriptor for each keypoint, where such descriptor may be characterized by a location (x, y), a scale, an orientation, and a descriptor of the histogram of the Gaussian-weighted gradients with respect to the location, scale and orientation. In this way, an image may be characterized by one or more keypoint descriptors (also referred to as image descriptors).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored to either transitory or non-transitory computer-readable mediums.

Various examples have been described. These and other examples are within the scope of the following claims.

The invention claimed is:

1. A method comprising:
   applying, by a device, a partitioning algorithm to a first subset of target feature descriptors to determine a first classifying data structure to be used when performing a visual search with respect to a query feature descriptor; and
   applying, by the device, the partitioning algorithm to a second subset of the target feature descriptors to determine a second classifying data structure to be used when performing the visual search with respect to the same query feature descriptor.

2. The method of claim 1, wherein the partitioning algorithm comprises a k-means clustering algorithm.

3. The method of claim 1, wherein applying the partitioning algorithm to the first subset of the target feature descriptors comprises applying the partition algorithm to a first subset of multi-resolution target feature descriptors, each of the multi-resolution target feature descriptors having two or more target feature descriptors extracted from the same patch with the patch being processed at different scale space resolution before extraction.

4. The method of claim 1, wherein applying the partitioning algorithm to the second subset of the target feature descriptors comprises applying the partition algorithm to a second subset of multi-resolution target feature descriptors, each of the multi-resolution target feature descriptors having two or more target feature descriptors extracted from the same patch with the patch being processed at different scale space resolution before extraction.

5. The method of claim 1,
   wherein applying the partitioning algorithm to the first subset of the target feature descriptors comprises applying the partition algorithm to a first subset of multi-resolution target feature descriptors, each of the multi-resolution target feature descriptors having two or more target feature descriptors extracted from the same patch with the patch being processed at different scale space resolution before extraction, and
   wherein applying the partitioning algorithm to the second subset of the target feature descriptors comprises applying the partition algorithm to a second subset of multi-resolution target feature descriptors, each of the multi-resolution target feature descriptors having two or more target feature descriptors extracted from the same patch with the patch being processed at different scale space resolution before extraction.

6. The method of claim 1, further comprising installing the first classifying data structure and the second classifying data structure in a visual search device.

7. The method of claim 1, further comprising performing a visual search to identify an object described by one or more query feature descriptors using the first classifying data structure and the second classifying data structure.

8. A device comprising:
   one or more processors configured to apply a partitioning algorithm to a first subset of target feature descriptors to determine a first classifying data structure to be used when performing a visual search with respect to a query feature descriptor, and apply the partitioning algorithm to a second subset of the target feature descriptors to determine a second classifying data structure to be used when performing the visual search with respect to the same query feature descriptor.

9. The device of claim 8, wherein the partitioning algorithm comprises a k-means clustering algorithm.

10. The device of claim 8, wherein the one or more processors are further configured to, when applying the partitioning algorithm to the first subset of the target feature descriptors, apply the partition algorithm to a first subset of multi-resolution target feature descriptors, each of the multi-resolution target feature descriptors having two or more target feature descriptors extracted from the same patch with the patch being processed at different scale space resolution before extraction.

11. The device of claim 8, wherein the one or more processors are further configured to, when applying the partitioning algorithm to the second subset of the target feature descriptors, apply the partition algorithm to a second subset of multi-resolution target feature descriptors, each of the multi-resolution target feature descriptors having two or more target feature descriptors extracted from the same patch with the patch being processed at different scale space resolution before extraction.

12. The device of claim 8,
wherein the one or more processors are further configured to, when applying the partitioning algorithm to the first subset of the target feature descriptors, apply the partition algorithm to a first subset of multi-resolution target feature descriptors, each of the multi-resolution target feature descriptors having two or more target feature descriptors extracted from the same patch with the patch being processed at different scale space resolution before extraction, and
wherein the one or more processors are further configured to, when applying the partitioning algorithm to the second subset of the target feature descriptors, apply the partition algorithm to a second subset of multi-resolution target feature descriptors, each of the multi-resolution target feature descriptors having two or more target feature descriptors extracted from the same patch with the patch being processed at different scale space resolution before extraction.

13. The device of claim 8, wherein the one or more processors are further configured to install the first classifying data structure and the second classifying data structure in a visual search device.

14. The device of claim 8, wherein the one or more processors are further configured to perform a visual search to identify an object described by one or more query feature descriptors using the first classifying data structure and the second classifying data structure.

15. A device comprising:
means for applying a partitioning algorithm to a first subset of target feature descriptors to determine a first classifying data structure to be used when performing a visual search with respect to a query feature descriptor; and
means for applying the partitioning algorithm to a second subset of the target feature descriptors to determine a second classifying data structure to be used when performing the visual search with respect to the same query feature descriptor.

16. The device of claim 15, wherein the partitioning algorithm comprises a k-means clustering algorithm.

17. The device of claim 15, wherein the means for applying the partitioning algorithm to the first subset of the target feature descriptors comprises means for applying the partition algorithm to a first subset of multi-resolution target feature descriptors, each of the multi-resolution target feature descriptors having two or more target feature descriptors extracted from the same patch with the patch being processed at different scale space resolution before extraction.

18. The device of claim 15, wherein the means for applying the partitioning algorithm to the second subset of the target feature descriptors comprises means for applying the partition algorithm to a second subset of multi-resolution target feature descriptors, each of the multi-resolution target feature descriptors having two or more target feature descriptors extracted from the same patch with the patch being processed at different scale space resolution before extraction.

19. The device of claim 15,
wherein the means for applying the partitioning algorithm to the first subset of the target feature descriptors comprises means for applying the partition algorithm to a first subset of multi-resolution target feature descriptors, each of the multi-resolution target feature descriptors having two or more target feature descriptors extracted from the same patch with the patch being processed at different scale space resolution before extraction, and
wherein the means for applying the partitioning algorithm to the second subset of the target feature descriptors comprises means for applying the partition algorithm to a second subset of multi-resolution target feature descriptors, each of the multi-resolution target feature descriptors having two or more target feature descriptors extracted from the same patch with the patch being processed at different scale space resolution before extraction.

20. The device of claim 15, further comprising means for installing the first classifying data structure and the second classifying data structure in a visual search device.

21. The device of claim 15, further comprising means for performing a visual search to identify an object described by one or more query feature descriptors using the first classifying data structure and the second classifying data structure.

22. A non-transitory computer-readable storage medium having stored thereon instructions that, when executed, cause one or more processors to:
apply a partitioning algorithm to a first subset of target feature descriptors to determine a first classifying data structure to be used when performing a visual search with respect to a query feature descriptor; and
apply the partitioning algorithm to a second subset of the target feature descriptors to determine a second classifying data structure to be used when performing the visual search with respect to the same query feature descriptor.

23. A method comprising:
traversing, by a device, at least a portion of a first classifying data structure and a second classifying data structure based on a query feature descriptor to determine a first representation of the query feature descriptor and a second representation of the same query feature descriptor; and
performing, by the device, a visual search based on the first representation of the query feature descriptor and a second representation of the same query feature descriptor.

24. The method of claim 23,
wherein the first classifying data structure is determined by, at least in part, applying a partitioning algorithm to a first subset of target feature descriptors, and
wherein the second classifying data structure is determined by, at least in part, applying the partitioning algorithm to a second subset of the target feature descriptors.

25. The method of claim 23,
wherein the first classifying data structure comprises a first multi-resolution tree data structure that includes a first portion for classifying feature descriptors extracted at a first scale space resolution and a second portion for classifying feature descriptors extracted at a second scale space resolution, and wherein the second classifying data structure comprises a second multi-resolution tree data structure that includes a first portion for classifying the feature descriptors extracted at the first scale space resolution and a second portion for classifying the feature descriptors extracted at the second scale space resolution.

26. The method of claim 23, wherein the query feature descriptor comprises a multi-resolution query feature descriptor that includes 1) a first feature descriptor extracted from a patch of a query image, the patch being processed at a first scale space resolution prior to extracting the first feature descriptor, and 2) a second feature descriptor extracted from the same patch of the query image, the patch being processed at a second scale space resolution prior to extracting the second feature descriptor.

27. The method of claim 23, wherein performing the visual search comprises applying a normalized bagging kernel to the first representation of the query feature descriptor and the second representation of the same query feature descriptor to determine a normalized similarity between the first and second representations of the query feature descriptors and representation of target feature descriptors determined through application of the first and second classification data structure to the target feature descriptors.

28. The method of claim 27, wherein applying the normalized bagging kernel comprises applying a combination of a plurality of normalized bagging kernels to the multi-resolution histogram representation of the multi-resolution query feature descriptor and the multi-resolution target histogram representations to determine a combination of normalized similarities between the multi-resolution histogram representation of the multi-resolution query feature descriptor and the multi-resolution target histogram representations.

29. The method of claim 28, wherein applying the combination of the plurality of normalized bagging kernels comprises applying the combination of the plurality of normalized bagging kernels to provide an estimation of a variable based on data that has similar characteristics to visual data.

30. The method of claim 27,
wherein the first representation of the query feature descriptor comprises a first multi-resolution histogram,
wherein the second representation of the query feature descriptor comprises a second multi-resolution histogram.

31. The method of claim 23,
wherein the first representation of the query feature descriptor comprises a first multi-resolution histogram,
wherein the second representation of the query feature descriptor comprises a second multi-resolution histogram.

32. The method of claim 23, wherein performing the visual search comprises performing the visual search based on the first representation of the query feature descriptor and a second representation of the same query feature descriptor to identify identification data, the identification data classifying one or more objects of a query image from which the query feature descriptor was extracted.

33. The method of claim 32, further comprising transmitting the identification data to a client device that provided either the query image or the query feature descriptor for use in performing the visual search.

34. A device comprising:
one or more processors configured to traverse at least a portion of a first classifying data structure and a second classifying data structure based on a query feature descriptor to determine a first representation of the query feature descriptor and a second representation of the same query feature descriptor, and perform a visual search based on the first representation of the query feature descriptor and a second representation of the same query feature descriptor.

35. The device of claim 34,
wherein the first classifying data structure is determined by, at least in part, applying a partitioning algorithm to a first subset of target feature descriptors, and
wherein the second classifying data structure is determined by, at least in part, applying the partitioning algorithm to a second subset of the target feature descriptors.

36. The device of claim 34,
wherein the first classifying data structure comprises a first multi-resolution tree data structure that includes a first portion for classifying feature descriptors extracted at a first scale space resolution and a second portion for classifying feature descriptors extracted at a second scale space resolution, and
wherein the second classifying data structure comprises a second multi-resolution tree data structure that includes a first portion for classifying the feature descriptors extracted at the first scale space resolution and a second portion for classifying the feature descriptors extracted at the second scale space resolution.

37. The device of claim 34, wherein the query feature descriptor comprises a multi-resolution query feature descriptor that includes 1) a first feature descriptor extracted from a patch of a query image, the patch being processed at a first scale space resolution prior to extracting the first feature descriptor, and 2) a second feature descriptor extracted from the same patch of the query image, the patch being processed at a second scale space resolution prior to extracting the second feature descriptor.

38. The device of claim 34, wherein the one or more processors are further configured to, when performing the visual search, apply a normalized bagging kernel to the first representation of the query feature descriptor and the second representation of the same query feature descriptor to determine a normalized similarity between the first and second representations of the query feature descriptors and representation of target feature descriptors determined through application of the first and second classification data structure to the target feature descriptors.

39. The device of claim 38, wherein the one or more processors are further configured to, when applying the normalized bagging kernel, apply a combination of a plurality of normalized bagging kernels to the multi-resolution histogram representation of the multi-resolution query feature descriptor and the multi-resolution target histogram representations to determine a combination of normalized similarities between the multi-resolution histogram representation of the multi-resolution query feature descriptor and the multi-resolution target histogram representations.

40. The method of claim 39, wherein the one or more processors are further configured to, when applying a combination of the plurality the normalized bagging kernel, apply the combination of the plurality of normalized bagging kernels to provide an estimation of a variable based on data that has similar characteristics to visual data.

41. The device of claim 38,
wherein the first representation of the query feature descriptor comprises a first multi-resolution histogram, wherein the second representation of the query feature descriptor comprises a second multi-resolution histogram.

42. The device of claim 34,
wherein the first representation of the query feature descriptor comprises a first multi-resolution histogram,
wherein the second representation of the query feature descriptor comprises a second multi-resolution histogram.

43. The device of claim 34, wherein the one or more processors are further configured to, when performing the visual search, perform the visual search based on the first representation of the query feature descriptor and a second representation of the same query feature descriptor to identify identification data, the identification data classifying one or more objects of a query image from which the query feature descriptor was extracted.

44. The device of claim 43, wherein the one or more processors are further configured to transmit the identification data to a client device that provided either the query image or the query feature descriptor for use in performing the visual search.

45. A device comprising:
means for traversing at least a portion of a first classifying data structure and a second classifying data structure based on a query feature descriptor to determine a first representation of the query feature descriptor and a second representation of the same query feature descriptor; and
means for performing a visual search based on the first representation of the query feature descriptor and a second representation of the same query feature descriptor.

46. The device of claim 45,
wherein the first classifying data structure is determined by, at least in part, applying a partitioning algorithm to a first subset of target feature descriptors, and
wherein the second classifying data structure is determined by, at least in part, applying the partitioning algorithm to a second subset of the target feature descriptors.

47. The device of claim 45,
wherein the first classifying data structure comprises a first multi-resolution tree data structure that includes a first portion for classifying feature descriptors extracted at a first scale space resolution and a second portion for classifying feature descriptors extracted at a second scale space resolution, and
wherein the second classifying data structure comprises a second multi-resolution tree data structure that includes a first portion for classifying the feature descriptors extracted at the first scale space resolution and a second portion for classifying the feature descriptors extracted at the second scale space resolution.

48. The device of claim 45, wherein the query feature descriptor comprises a multi-resolution query feature descriptor that includes 1) a first feature descriptor extracted from a patch of a query image, the patch being processed at a first scale space resolution prior to extracting the first feature descriptor, and 2) a second feature descriptor extracted from the same patch of the query image, the patch being processed at a second scale space resolution prior to extracting the second feature descriptor.

49. The device of claim 45, wherein the means for performing the visual search comprises means for applying a normalized bagging kernel to the first representation of the query feature descriptor and the second representation of the same query feature descriptor to determine a normalized similarity between the first and second representations of the query feature descriptors and representation of target feature descriptors determined through application of the first and second classification data structure to the target feature descriptors.

50. The device of claim 49, wherein the means for applying the normalized bagging kernel comprises means for applying a combination of a plurality of normalized bagging kernels to the multi-resolution histogram representation of the multi-resolution query feature descriptor and the multi-resolution target histogram representations to determine a combination of normalized similarities between the multi-resolution histogram representation of the multi-resolution query feature descriptor and the multi-resolution target histogram representations.

51. The device of claim 50, wherein the means for applying the combination of the plurality of normalized bagging kernels comprises means for applying the combination of the plurality of normalized bagging kernels to provide an estimation of a variable based on data that has similar characteristics to visual data.

52. The device of claim 49,
wherein the first representation of the query feature descriptor comprises a first multi-resolution histogram,
wherein the second representation of the query feature descriptor comprises a second multi-resolution histogram.

53. The device of claim 45,
wherein the first representation of the query feature descriptor comprises a first multi-resolution histogram,
wherein the second representation of the query feature descriptor comprises a second multi-resolution histogram.

54. The device of claim 45, wherein the means for performing the visual search comprises means for performing the visual search based on the first representation of the query feature descriptor and a second representation of the same query feature descriptor to identify identification data, the identification data classifying one or more objects of a query image from which the query feature descriptor was extracted.

55. The device of claim 54, further comprising means for transmitting the identification data to a client device that provided either the query image or the query feature descriptor for use in performing the visual search.

56. A non-transitory computer-readable storage medium having stored thereon instructions that, when executed, cause one or more processors to:
traverse at least a portion of a first classifying data structure and a second classifying data structure based on a query feature descriptor to determine a first representation of the query feature descriptor and a second representation of the same query feature descriptor; and
perform a visual search based on the first representation of the query feature descriptor and a second representation of the same query feature descriptor.

* * * * *